United States Patent [19]

Watanabe

[11] Patent Number: 4,739,156

[45] Date of Patent: Apr. 19, 1988

[54] RECYCLE TYPE TRANSACTION APPARATUS

[75] Inventor: Yoshihiro Watanabe, Fujisawa, Japan

[73] Assignee: Kabushiki Kaisha Toshiba, Kawasaki, Japan

[21] Appl. No.: 868,106

[22] Filed: May 29, 1986

[30] Foreign Application Priority Data

May 31, 1985 [JP] Japan ........................ 60-118148

[51] Int. Cl.⁴ ........................ G06F 15/30
[52] U.S. Cl. ........................ 235/379
[58] Field of Search ........................ 235/379

[56] References Cited

U.S. PATENT DOCUMENTS 4,501,380 4/1988 Uchida ........................ 235/379

FOREIGN PATENT DOCUMENTS 0024704 8/1980 European Pat. Off. .

*Primary Examiner*—Harold Pitts
*Attorney, Agent, or Firm*—Finnegan, Henderson, Farabow, Garrett & Dunner

[57] ABSTRACT

A recycle type transaction apparatus comprising a note pocket section to accommodate the deposit notes received on the basis of their denomination and a note dispensing section to dispense the notes in the note pocket section as dispensable notes. A bundled notes receiving section is provided for receiving the notes as a bundle from the outside.

9 Claims, 69 Drawing Sheets

FIG. 14A
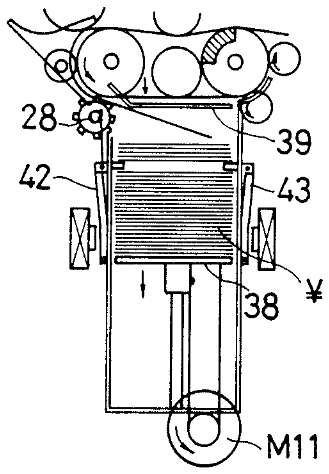
FIG. 14B
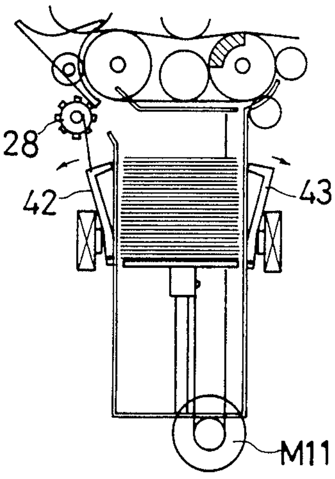
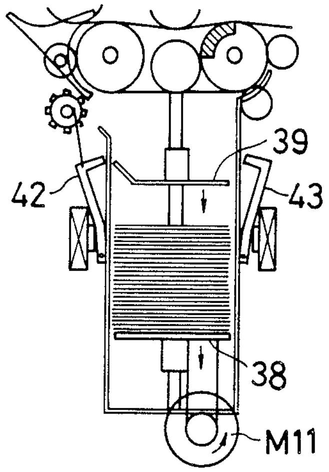
FIG. 14C

F I G. 20A
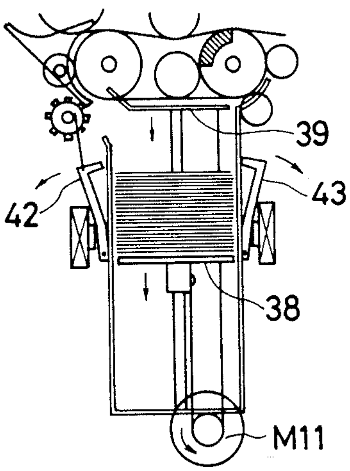
F I G. 20B
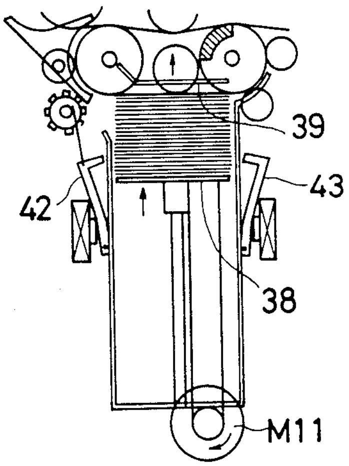
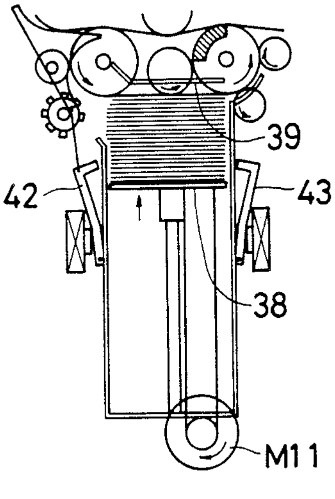
F I G. 20C

FIG. 20D
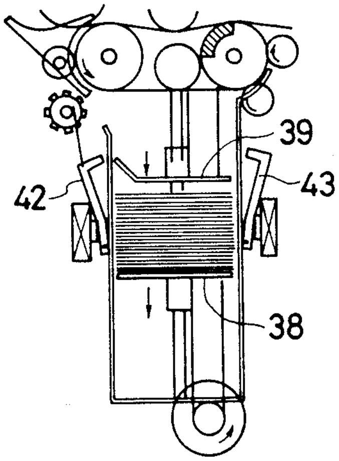
FIG. 20E
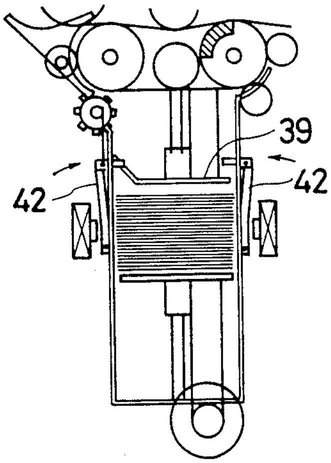
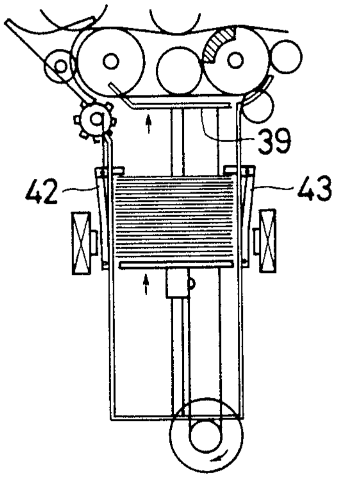
FIG. 20F

F I G. 30

| | | | |
|---|---|---|---|
| MEMORY SECTION | TOTAL MEMORY AREA | DEPOSIT | NUMBER OF ¥ 1,000 NOTES |
| | | | NUMBER OF ¥ 10,000 NOTES |
| | | | NUMBER OF ¥ 5,000 NOTES |
| | | SUPPLEMENT | NUMBER OF ¥ 1,000 NOTES |
| | | | NUMBER OF ¥ 10,000 NOTES |
| | | LOAD | NUMBER OF ¥ 1,000 NOTES |
| | | | NUMBER OF ¥ 10,000 NOTES |
| | | DISPENSING | NUMBER OF ¥ 1,000 NOTES |
| | | | NUMBER OF ¥ 10,000 NOTES |
| | | PARTIAL SUCK-UP | NUMBER OF ¥ 1,000 NOTES |
| | | | NUMBER OF ¥ 10,000 NOTES |
| | | CHECK | NUMBER OF ¥ 1,000 NOTES |
| | | | NUMBER OF ¥ 10,000 NOTES |
| | | | NUMBER OF ¥ 5,000 NOTES |
| | | | RECOVERY |
| | CURRENT AMOUNT MEMORY | NUMBER OF NOTES STORED IN ¥ 1,000 NOTE STORING POCKET | |
| | | NUMBER OF NOTES STORED IN ¥ 10,000 NOTE STORING POCKET | |
| | | NUMBER OF MEDIA STORED IN REJECTED MEDIA HOLDING POCKET | |
| | | TRANSACTION APPARATUS | NUMBER OF ¥ 1,000 NOTES |
| | | | NUMBER OF ¥ 10,000 NOTES |
| | | | NUMBER OF ¥ 5,000 NOTES |
| | RELEVANT TRANSACTION MEMORY | DEPOSIT | NUMBER OF ¥ 1,000 NOTES<br>NUMBER OF ¥ 10,000 NOTES<br>NUMBER OF ¥ 5,000 NOTES |
| | | SUPPLEMENT | NUMBER OF ¥ 1,000 NOTES<br>NUMBER OF ¥ 10,000 NOTES |
| | | LOAD<br>DISPENSING<br>PARTIAL SUCK-UP | NUMBER OF ¥ 1,000 NOTES<br>NUMBER OF ¥ 10,000 NOTES<br>NUMBER OF ¥ 1,000 NOTES<br>NUMBER OF ¥ 10,000 NOTES<br>NUMBER OF ¥ 1,000 NOTES<br>NUMBER OF ¥ 10,000 NOTES |
| | OTHERS | | |

RECYCLE TYPE TRANSACTION APPARATUS

BACKGROUND OF THE INVENTION

The present invention relates to an automatic transaction apparatus which is installed in banks or the like and, more particularly, to a recycle type transaction apparatus which can recycle deposit bills or bank notes as well as dispensing bank notes.

A large number of automatic transaction apparatuses called ATM (Automatic Teller Machines) are used in banks or the like, and automation and high processing speed of business affairs at the tellers' windows have been accomplished. However, the ATM cannot be used on bank holidays, resulting in deterioration of service to the customers. Therefore, measures to improve it have been studied. As a measure to solve this problem, it is proposed to use the automated corner in a self-service manner. In the conventional ATM, the deposit operation and dispensing operation are executed by separate units; thus, more and more bank note is stacked into the deposit unit and, conversely, cash is dispensed from the dispenser unit. Therefore, it is necessary to frequently take out bank notes from the deposit unit to supplement the supply of bank notes in the dispenser unit, and this reduces the efficiency of the automated process. To improve operating efficiency, a recycle type transaction apparatus, which can cyclically use bank notes by recycling the deposited bank notes as dispensable bank notes has been developed.

This recycle type transaction apparatus has the following problems.

Namely, in the case of the deposit transaction, the transaction is generally performed by use of the bankbook; therefore, the deposit process time is governed by the time necessary to update the bankbook or the like. Thus, the processing time after depressing the acknowledge button, after the note has been put into the deposit unit, until the completion of the transaction is short; i.e., its processing speed is high. However, in the case of the dispensing transaction, it takes a fairly long time until the note is dispensed after the start of the note dispensing operation because the transaction is generally performed using only the personal identification (ID) card. Particularly, in the case of using the deposited notes as dispensable notes, all the notes are obverted and the bank notes are dispensed, so that it takes a long time to dispense them.

On the other hand, since the various denominations are first discriminated in the deposit process, when note jamming occurs, the clerk must labor for some time to eliminate the jam. This is because, since the clerk doesn't know the number of deposited notes, he needs to pay careful attention so as not to forget removing the notes at various locations inside the ATM.

Further, in the recycling of the notes, for large denomination notes of ten thousand yen and five thousand yen, deposit and dispensing are well balanced and fund efficiency is very good. However, notes of one thousand yen are dispensed in most cases, so that a deposit/dispensing supply imbalance is more likely to occur.

SUMMARY OF THE INVENTION

It is the object of the present invention to provide a recycle type transaction apparatus which can recycle bank notes by utilizing as simple a structure as possible, and can also supplement the supply of notes from outside.

According to the invention, a recycle type transaction apparatus comprises: a note pocket section to accommodate the deposit notes received, on the basis of denomination; a note dispenser section to dispense the notes in the note pocket section as dispensable notes; and a bundled note receiving section to receive the notes as bundled notes, from outside.

Further, according to the invention, there is provided a recycle type transaction apparatus comprising: a note pocket section to accommodate the deposit notes received, on the basis of denomination; a note dispenser section to dispense the notes in the note pocket section as dispensable notes; a note discriminating section to discriminate between notes of various denominations; a note deposit/dispenser section to deposit and dispense the notes; a note bundle conveyance section to convey the bundled notes conveyed from the outside to the note deposit/dispenser section; a note feeding section to feed, one by one, the notes of the note bundles conveyed to the note deposit/dispenser section to the note discriminating section; and a note conveyance section to convey the notes, whose denominations were discriminated by the note discriminating section, to the note pocket section.

BRIEF EXPLANATION OF THE DRAWINGS

FIGS. 10A-1 to 10J are flowcharts for explaining the depositing operation;

FIGS. 14A to 14E are operational diagrams of the cash pocket in the storing operation;

FIGS. 20A to 20F are operational diagrams of the note pocket in the dispensing operation;

FIG. 30 is a diagram showing the content stored in a memory section;

DETAILED DESCRIPTION OF THE PREFERRED EMBODIMENT

Figure 1:
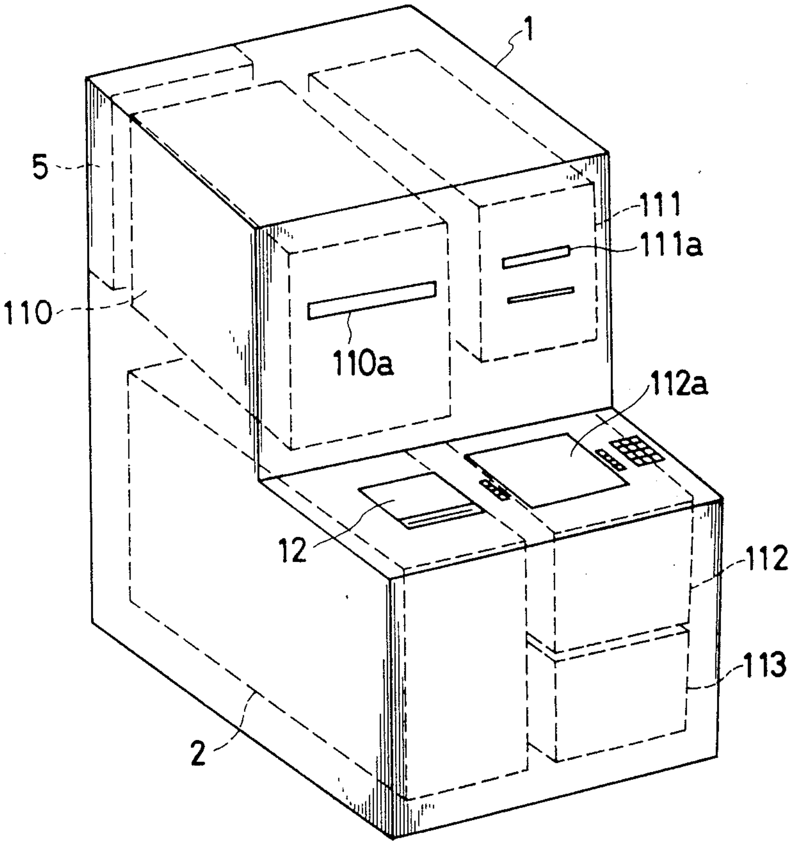
FIG. 1 is a perspective view of an automatic transaction machine using a transaction apparatus according to an embodiment of the present invention.

According to an ATM 1 shown in FIG. 1, a recycle type transaction apparatus 2 of the invention is provided in ATM 1. ATM 1 is also provided with a bankbook receiving unit 110, an ID card receiving unit 111, a CRT display unit 112, and a control/power source unit 113. A bankbook is put into and taken out of bankbook receiving unit 110 through a bankbook entrance/extraction port 110*a*. An ID card is put into and taken out of ID card receiving unit 111 through an ID card entrance/extraction port 111*a*. CRT display unit 112 allows a CRT display 112*a* to display predetermined instructions.

Figure 2:
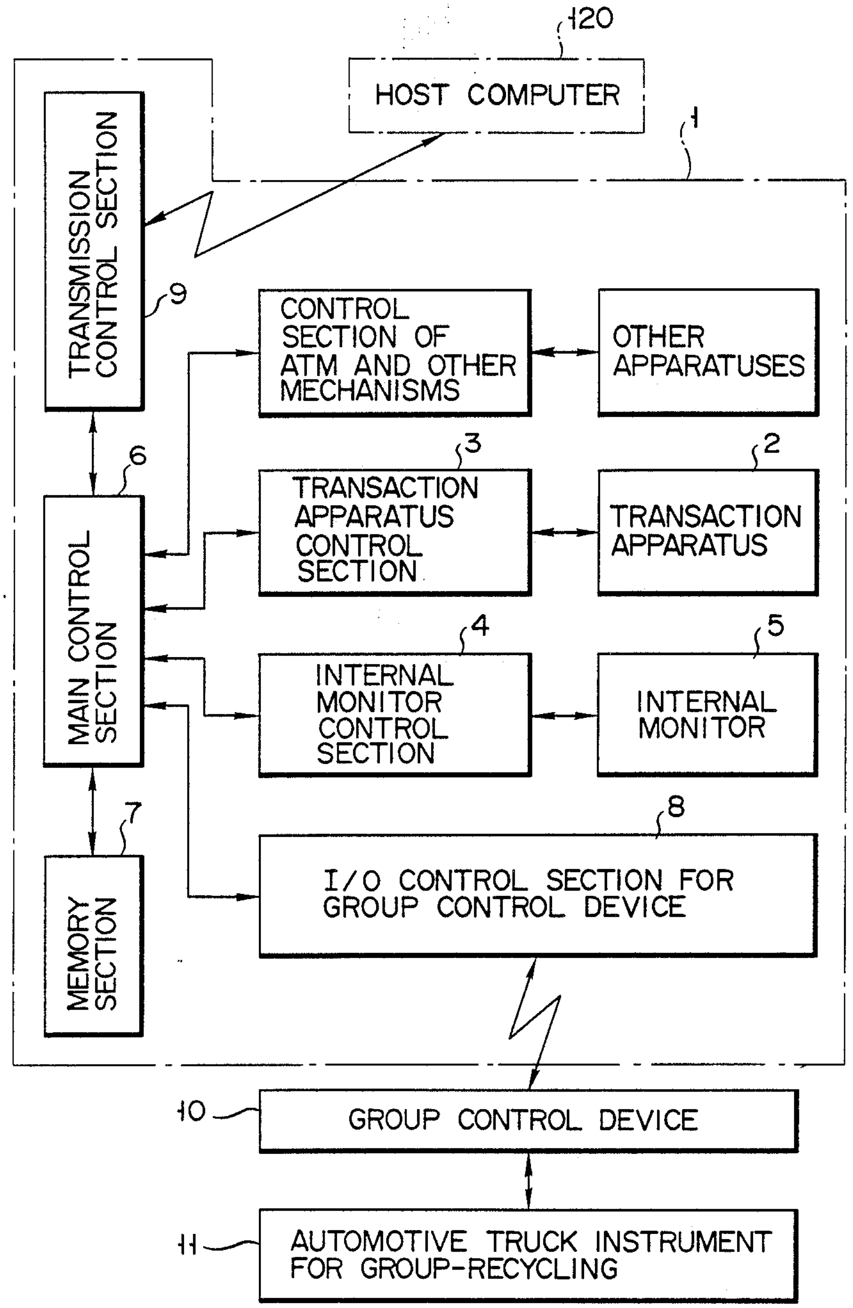
FIG. 2 is a circuit block diagram of the automatic transaction machine of FIG. 1.

FIG. 2 shows a circuit block diagram of ATM 1 and its peripheral devices. In this diagram, a main control section 6, constituted by a computer, is provided. Transaction apparatus 2 is connected to main control section 6 through a transaction apparatus control section 3 to control this transaction apparatus. An internal monitor 5 is connected to main control section 6, through an internal monitor control section 4. Further, a memory section 7, an input/output control section for group control device 8, and a transmission control section 9 are also connected to main control section 6. Input/output control section 8 is connected to an automotive truck instrument for group-recycling 11 through a group control device 10. Automotive truck instrument 11 has a movable truck for a plurality of ATMs which are installed in the bank and serves as a notes interfacing instrument to feed and supplement the notes among the ATMs. Such a note interfacing instrument has been disclosed in Japanese patent application No. 97815/1984.

Transmission control section 9 is connected to a host computer 120 installed in the head office or the like, of the bank, so that communication can be performed therebetween.

Figure 3:
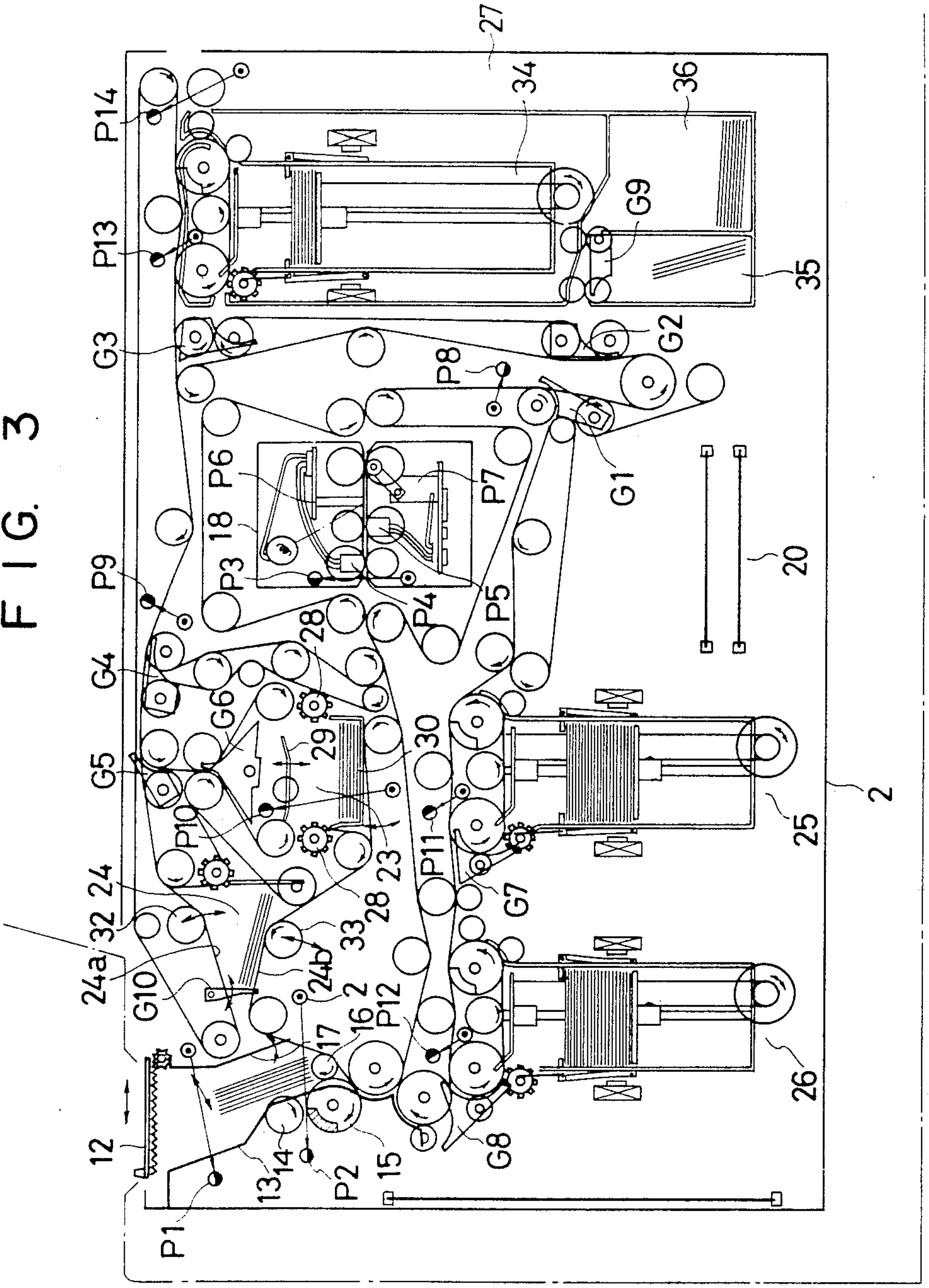
FIG. 3 is a diagram schematically showing the internal constitution of the transaction apparatus.

According to transaction apparatus 2 shown in FIG. 3, a note entrance/extraction door 12 is opened and closed by a motor M1, shown in the diagram. A deposit/ dispensable note hopper 13, to store the notes which are collectively inserted, is provided below door 12. To sequentially feed the notes, one by one, to the lower extraction port of hopper 13, an eccentric rubber roller 14 is provided over a note feeding roller 15, having a rubber chip at a part of its periphery. A gate roller 16, which rotates in the direction opposite to that of roller 15, is provided at the side of roller 15.

A backing-up plate 17 is provided so as to press the note bundle inserted into hopper 13 onto note feeding roller 15 and rubber roller 14 at an almost constant pressure, by a spring force; i.e., the lower portion of backing-up plate 17 is attached by a hinge, so that it can be opened. When the note is conveyed to hopper 13, backing-up plate 17 is opened by a magnet, thereby forming a note entrance port.

A note discriminating section 18 is provided at substantially the center of the transaction apparatus housing. Magnetic sensors P4 and P5, to detect the magnetic printed pattern of the bank note, are arranged in note discriminating section 18 so as to face each other. Further, a contact type image sensor P6, to optically read the pattern printed on the surface of the note through a SELFOC lens 19, and a thickness detector P7, to detect a thickness of note, are also provided. Thickness detector P7 is constituted by a potentiometer type thickness detector to detect the thickness, due to a change in angle of rotation, of an arm which supports a detecting roller.

Note discriminating section 18 supplies a detection signal to a control unit 20 (for note discriminating section 18) arranged below section 18. Control unit 20 processes a signal which is emitted from each sensor of note discriminating section 18, and discriminates the denomination, true or false, proper or improper (discrimination to see if the note is suitable for dispensing), and front side or back side of the note. Then, control unit 20 transfers the signal indicative of the result of the discrimination to control section 3. The apparatuses disclosed in U.S. Pat. Nos. 4,464,786 and 4,352,988, respectively, can be used as note discriminating section 18, and control unit 20.

A first gate G1, arranged in the note path provided near the middle position between note discriminating section 18 and control unit 20, serves to selectively form the note supply path and note conveyance path. First gate G1 is driven by a rotary solenoid S2. A second gate G2 is provided to switch the conveyance path from a ten thousand yen note pocket 25 and a thousand yen note pocket 26 to a mixed note pocket 27, and vice versa. Second gate G2 is driven by a rotary solenoid S3. First gate G1 operates in response to a signal which is generated when the note passes through a sensor P8. Second gate G2 operates after the expiration of a predetermined delay time from the detection of the note by sensor P8; i.e., the operation timings of first and second gates G1 and G2 are determined by sensor P8.

In addition to first and second gates G1 and G2, various kinds of gates G3 to G9, and sensors are also arranged, and these gates will be described later. High speed distributing capability is required for gates G5 to G7. Gates G5 to G7 operate in response to the detection of the edge of the note and self-maintain their operations as they are, and form the conveyance path of the note in the same direction, unless they receive a command to run the next note in the opposite direction.

A temporary holding section G3 is provided adjacent to note discriminating section 18. Temporary holding section 23 guides the note on the right and left sides, through operation of gate G6, thereby reversing the back side of the note to align all of the notes to the front side. Beat wheels 28 are arranged in both entrance ports of temporary holding section 23. Beat wheels 28 have a plurality of flexible projections and function to beat down the rear edge of the note which is conveyed, and prevent the collision with the front edge of the next note to be conveyed, and thereby to prevent jamming. Such jam preventing beat wheels are arranged throughout the holding section provided in each section. A vertically movable press plate 29, having an idler roller *29a*, is attached over temporary holding section 23. A vertically movable bottom plate 30 is attached to the bottom of temporary holding section 23. Upper press plate 29 and bottom plate 30 are vertically moved by one DC gear motor M4. However, upper press plate 29 is pressed and suspended by a spring against a link of the vertical moving mechanism so as to absorb the thickness of the stacked notes ¥. Bottom plate 30 is formed like a saw tooth. When this bottom plate descends, the nest construction is kept together with a conveyor belt, so as to pass through the conveyor belt.

A rejected medium holding section 24 is arranged adjacent to temporary holding section 23. Holding section 24 is formed by the space between an upper belt *24a* and a lower belt *24b*. Upper belt *24a* is vertically rotated by a roller 32 and lower belt *24b* is vertically rotated by a roller 33, as explained later.

Ten thousand yen note pocket 25 and thousand yen note pocket 26 are arranged below holding sections 23 and 24. The operation of note pockets 25 and 26 will be explained later. A detachable batch storing section 27, attached behind transaction apparatus 2, is divided into a loaded/checked note holding pocket 34, a recovery pocket 35, and a rejected medium pocket 36.

FIG. 3 shows the electrical connection of various components of transaction apparatus 2 shown in FIG. 2. Referring now to FIG. 3, a check start detector P3, magnetic pattern (obverse of the note) detector P4, magnetic pattern (reverse of the note) detector P5, optical pattern (obverse of the note) detector P6, and thickness detector P7 are connected to control unit 20. Motor M1, to open and close the note entrance/extraction door to a conveyance main motor M12, is connected to a motor driver MD. A switch S1, to open the deposit/ dispensable note backing-up plate to a switch S17 to open the batch storing pocket holding claw, and an electromagnetic clutch C1 are connected to a magnet driver MGD. A note entrance/extraction door close detector SW1 to batch storing pocket set detector SW25 are connected to a switch interface SWI. A note entrance/extraction door height detector P1, to a note insertion detector P14 from the outside of the apparatus, is connected to a photosensor interface PHI. Control unit 20 is connected to control section 3. Motor driver MTD, magnet driver MGD, switch interface SWI, and photosensor interface PHI are connected to control section 3 through an interface I/O.

Figure 4:
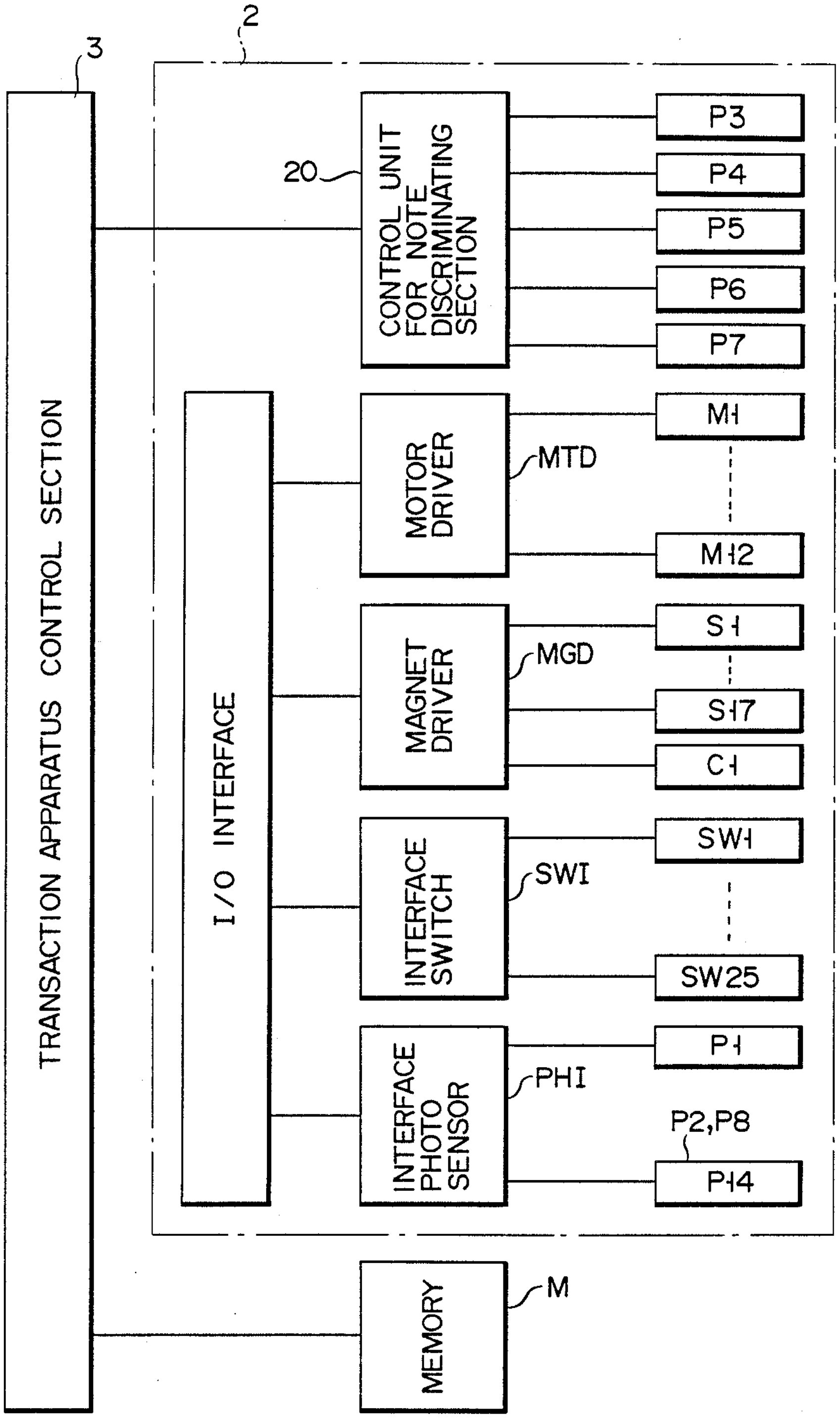
FIG. 4 is a circuit block diagram of the transaction apparatus.
Figure 5:
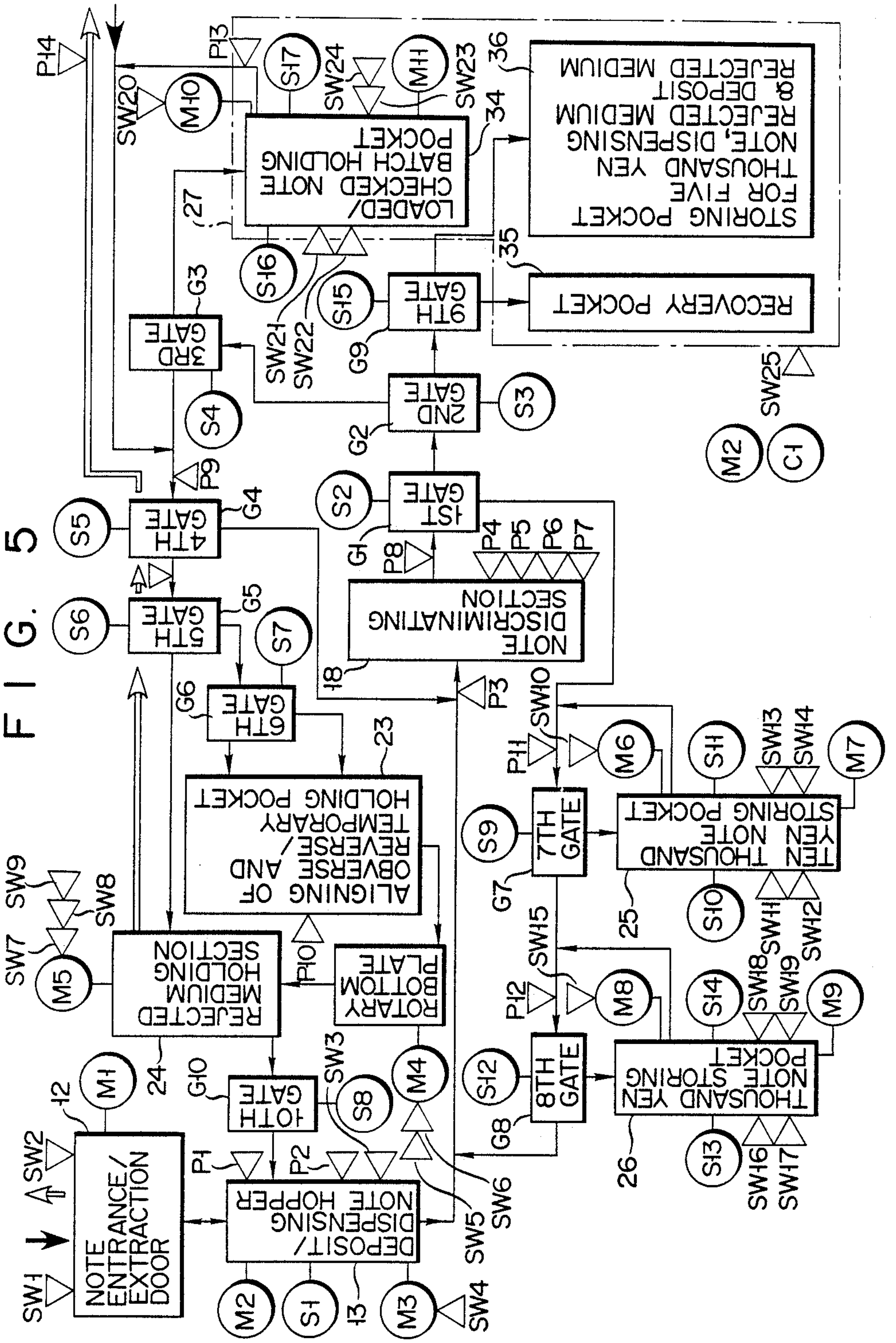
FIG. 5 is a mechanical circuit diagram of the transaction apparatus of FIG. 3.

FIG. 5 is a mechanical circuit diagram showing the conveyance state of the note when the transaction apparatus shown in FIGS. 3 and 4 is operated. The functions of the respective components shown in FIG. 5 are summarized in the following Table.

| TYPE | SYMBOL | ARTICLE NAME | SUMMARY OF FUNCTION AND OPERATION |
|---|---|---|---|
| MOTOR | M1 | DC motor | Opening/closing of the note entrance/extraction door - forward/reverse rotation |
| | M2 | DC motor | Upward/downward movement of the backing-up plate of the deposit/dispensable note hopper - forward/reverse rotation |
| | M3 | Stepping motor | Rotation of the feeding and conveyance rollers of the deposit/dispensable note port - forward rotation |
| | M4 | DC motor | Upward/downward movement of the bottom plate and press plate of the deposited note temporary holding section - forward/reverse rotation |
| | M5 | DC motor | Upward/downward movement of the upper and lower belts of the rejected medium holding section of the deposited note - forward/reverse rotation |
| | M6 | Stepping motor | Rotation of the feeding and conveyance rollers of the ten thousand yen note storing pocket - forward rotation |
| | M7 | DC motor | Upward/downward movement of the backing-up plate and press plate of the ten thousand yen note storing pocket - forward rotation |
| | M8 | Stepping motor | Rotation of the feeding and conveyance rollers of the thousand yen note storing pocket - forward rotation |
| | M9 | DC motor | Upward/downward movement of the backing-up plate and press plate of thousand yen note storing pocket - forward/ reverse rotation |
| | M10 | Stepping | Rotation of the feeding and conveyance rollers of the batch storing pocket - forward rotation |
| | M11 | DC motor | Upward/downward movement of the backing-up plate and press plate of the batch storing pocket - forward/reverse rotation |
| | M12 | AC reversible motor | Forward/reverse rotation of the main conveyance motor |

-continued

| TYPE | SYMBOL | ARTICLE NAME | SUMMARY OF FUNCTION AND OPERATION |
|---|---|---|---|
| SOLE-NOID | S1 | Plunger solenoid | Rejection and retry of the proper note via the opening of the note deposit/dispending port backing-up plate |
| | S2 | Rotary solenoid | For the first gate G1 |
| | S3 | Rotary solenoid | For the second gate G2 |
| | S4 | Plunger solenoid | For the third gate G3; can operate at a low speed |
| | S5 | Plunger solenoid | For the fourth gate G4; can operate at a low speed |
| | S6 | Rotary solenoid | For the fifth gate G5 |
| | S7 | Rotary solenoid | For the sixth gate G6 |
| | S8 | Plunger solenoid | For the tenth gate G10; lock using the link |
| | S9 | Rotary solenoid | For the seventh gate G7 |
| | S10 | Flapper solenoid | To release the holding claw of the ten thousand yen note storing pocket |
| | S11 | Flapper solenoid | To release the holding claw of the ten thousand yen note storing pocket |
| | S12 | Rotary solenoid | For the eighth gate G8 |
| | S13 | Flapper solenoid | To release the holding claw of the thousand yen note storing pocket |
| | S14 | Flapper solenoid | To release the holding claw of the thousand yen note storing pocket |
| | S15 | Plunger solenoid | For the ninth gate G9; can operate at a low speed |
| | S16 | Flapper solenoid | To release the holding claw of the batch storing pocket |
| | S17 | Flapper solenoid | To release the holding claw of the batch storing pocket |
| SWITCH | SW1 | Contactless switch | Detection of the closing of the note entrance/extraction door |
| | SW2 | Contactless switch | Detection of the opening of the note entrance/extraction door |
| | SW3 | Contactless switch | Detection of the upper stop position of the backing-up plate of the deposit/dispensable note hopper |
| | SW4 | Photo-interrupter | Detection of the stop positions of the deposit/dispensable note port feeding and conveyance motors |
| | SW5 | Contactless switch | Detection of the upper stop positions of the bottom plate and press plate of the deposited note temporary storing pocket |
| | SW6 | Contactless switch | Detection of the lower stop positions of the bottom plate and press plate of the deposited note temporary storing pocket |
| | SW7 | Photo-interrupter | Detection of the upper stop-positions of the upper and lower belts of the rejected medium holding section of the deposited note |
| | SW8 | Photo-interrupter | Detection of the middle stop positions of the upper and lower belts of the rejected medium holding section of the deposited note |
| | SW9 | Photo-interrupter | Detection of the lower stop positions of the upper and lower belts of the rejected medium holding section of the deposited note |
| | SW10 | Photo-interrupter | Detection of the stop positions of the feeding and conveyance motors of the ten thousand yen note storing pocket |
| | SW11 | Micro switch | Detection of the emptiness of the ten thousand yen note storing pocket |
| | SW12 | Contactless switch | Detection of the fullness of the ten thousand yen note storing pocket |
| | SW13 | Contactless switch | Detection of the position of the conveyance note guide of the press plate of the ten thousand yen note storing pocket |
| | SW14 | Contactless switch | Detection of the pressing position of the press plate of the ten thousand yen note storing pocket |
| | SW15 | Photo-interrupter | Detection of the stop positions of the feeding and conveyance motors of the thousand yen note storing pocket |
| | SW16 | Microswitch | Detection of the emptiness of the thousand yen note storing pocket |
| | SW17 | Contactless switch | Detection of the fullness of the thousand yen note storing pocket |
| | SW18 | Contactless switch | Detection of the position of the conveyance note guide of the press plate of the thousand yen note storing pocket |
| | SW19 | Contactless switch | Detection of the pressing position of the press plate of the thousand yen note storing pocket |
| | SW20 | Photo-interrupter | Detection of the stop positions of the feeding and conveyance motors of the batch storing pocket |

-continued

| TYPE | SYMBOL | ARTICLE NAME | SUMMARY OF FUNCTION AND OPERATION |
|---|---|---|---|
| | SW21 | Microswitch | Detection of the emptiness of the batch storing pocket |
| | SW22 | Contactless switch | Detection of the fullness of the batch storing pocket |
| | SW23 | Contactless switch | Detection of the position of the conveyance note guide of the press plate of the batch storing pocket |
| | SW24 | Contactless switch | Detection of the pressing position of the press plate of the batch storing pocket |
| | SW25 | Contactless switch | Detection of the set of the batch storing pocket |
| SENSOR | P1 | Photo-sensor | Detection of the height of the note in the deposit/dispensing port (Detection of the improper note) |
| | P2 | Photo-sensor | Detection of the remaining note in the deposit/dispensing port |
| | P3 | Photo-sensor | Detection of the timing of the discriminating section (Reference for the start of the shift control) |
| | P4 | Magnetic sensor | Detection of the printed pattern on the note |
| | P5 | Magnetic sensor | Detection of the printed pattern on the note (Obverse) |
| | P6 | Contact type image sensor | Detection of the dirt, color, and pattern of the note (Reverse) |
| | P7 | Poten-tiometer | Detection of the thickness of the note (Obverse) |
| | P8 | Photo-sensor | Timings for the first and second gates |
| | P9 | Photo-sensor | Timings for the fourth, fifth, and sixth gates |
| | P10 | Photo-sensor | Detection of the remaining note in the temporary holding section of the deposited note |
| | P11 | Photo-sensor | Timing for the seventh gate(Counting of the number of dispensed ten thousand yen notes) |
| | P12 | Photo-sensor | Timing for the eighth gate (Counting of the number of dispensed thousand yen notes) |
| | P13 | Photo-sensor | Counting of the number of dispensed notes for loading into the batch storing pocket |
| | P14 | Photo-sensor | Detection of the insertion of the note from the outside of the apparatus |
| CLUTCH | C1 | Electro-magnetic clutch | For switching of the conveyance speed (reduction to 1/10) |
| | C2 | Electro-magnetic clutch | For switching of the conveyance speed |

Figure 6:
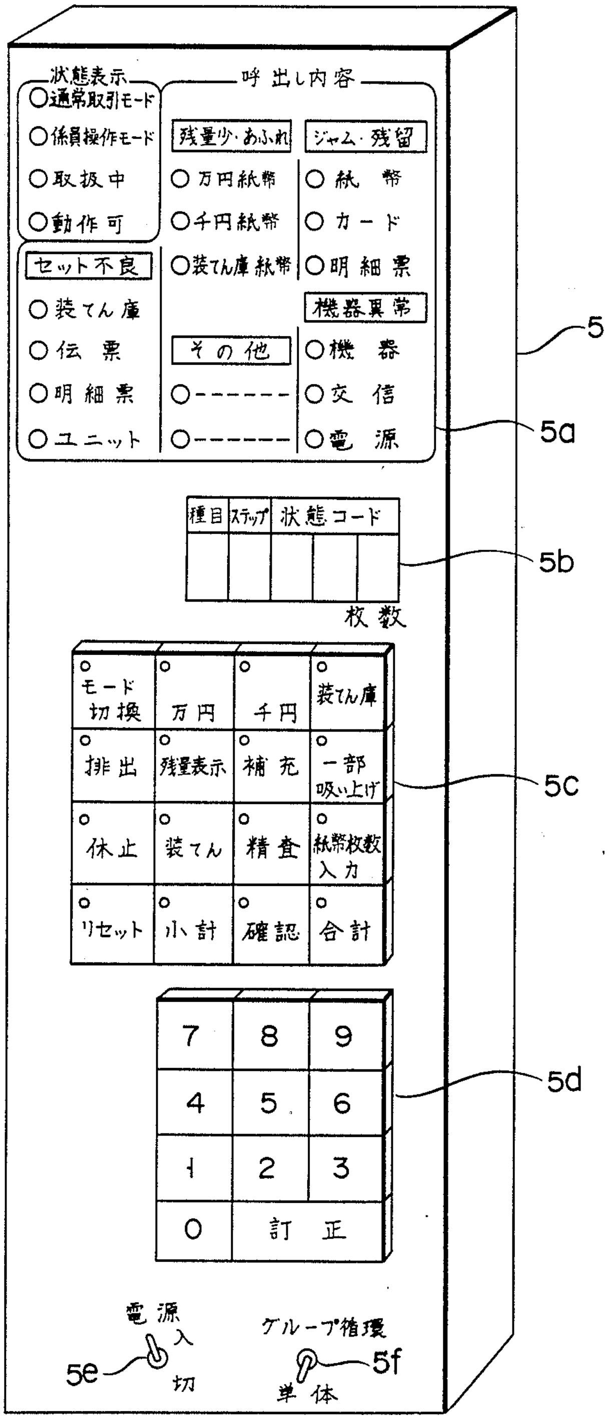
FIG. 6 is a perspective view of an internal monitor.

Internal monitor 5, shown in FIG. 6 and provided on the rear surface in the housing of transaction apparatus 2, can be operated by the clerk; i.e., internal monitor 5 is provided with: a display panel 5*a*, including light emitting diodes (LED) which are respectively provided in correspondence to the contents of the state display and calling; a 7-segment display panel 5*b*; a keyboard 5*c*; and a ten-key 5*d*. Further, a power switch 5*e* and a group-to-single exchanging switch 5*f* are provided. 7-segment display panel 5*b* displays numerals of five digits; i.e., display panel 5*b* displays the code indicative of the transaction denomination selected and the operating step number of the machine by one digit, respectively, and the error code by numerals of three digits when an error occurs in the operation of the machine. Keyboard 5*c* includes the keys to input various kinds of data and processing instructions or to operate the display of the amount of storing notes, or the like. Exchanging switch 5*f* is used to exchange the transaction control mode with respect to whether a plurality of ATMs are controlled as a group or as a single machine.

Figure 7:
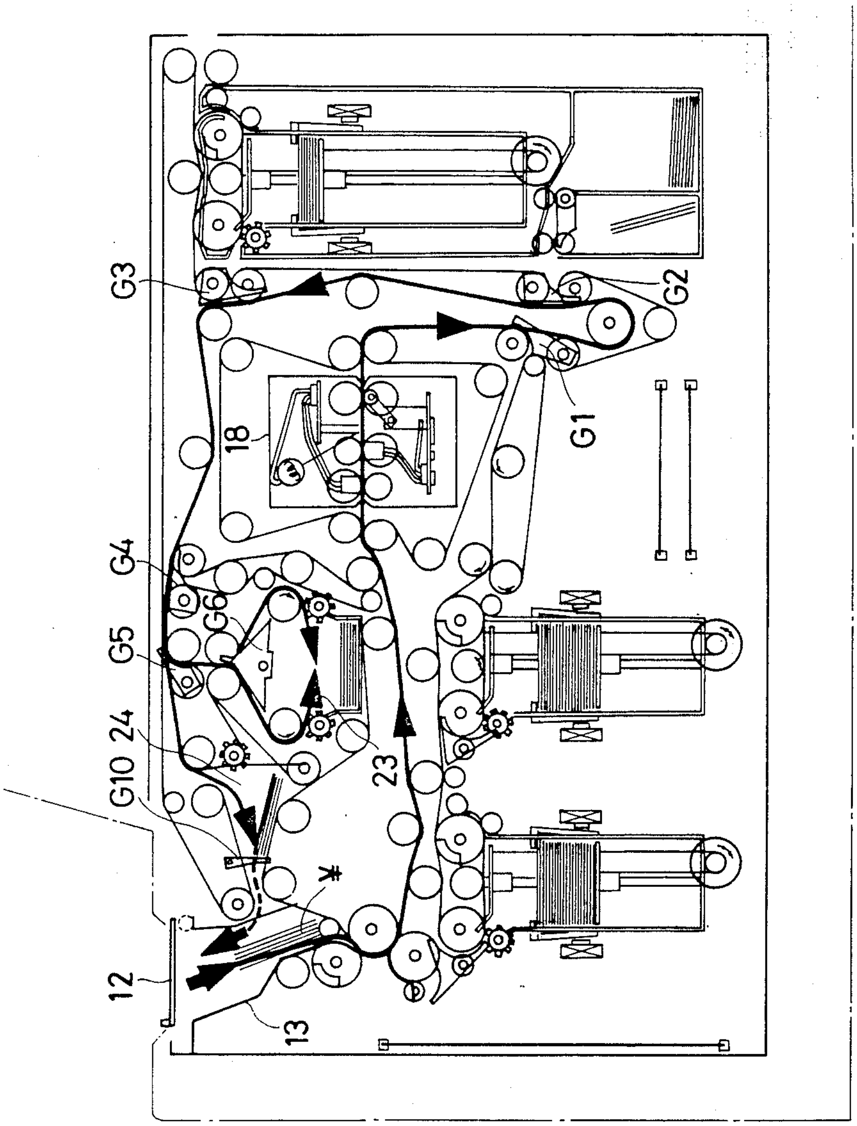
FIG. 7 is a diagram showing a schematic internal structure of the transaction apparatus showing the flow of the note in the depositing operation.

FIG. 7 shows the flow of the note in the deposit operation. This deposit operation will be described with reference to flowcharts of FIGS. 10A to 10J. When the button corresponding to the deposit display is pressed in accordance with the guidance of CRT display 112*a*, motor M1 rotates forwardly to open note entrance/extraction door 12. When door 12 has completely opened, note entrance/extraction door opening switch SW2 is turned on and motor M1 stops. In this state, when the depositor inserts the note ¥ into deposit/dispensable note hopper 13, through the deposit/dispensable note port and thereafter manually closes door 12, detector SW1, to detect the closure of door 12, is turned on. Then, photosensor P2, to detect whether the note has been inserted or not, detects the "dark state", namely, the state resulting from the note having been inserted. Next, a check is made to see if photosensor P1, to detect the height of the note ¥ in the deposit/dispensable note port, has detected darkness or not. Photosensor P1 is provided to detect whether the note ¥ has been inserted in the correct positional state or not; therefore, it is arranged at the position which is slightly higher than the lateral width of the note ¥ and lower than the longitudinal length of the note. In the case where the note ¥ has been inserted in the longitudinal direction, photo sensor P1 detects the resulting darkness, namely, that the insertion direction of the note is wrong. In this case, the instruction "Insert the note again." is displayed on CRT display 112*a*. At this time, to enable the note to be inserted again, door 12 is once more opened. When the note ¥ is correctly inserted, motor M2 to drive backing-up plate 17 of hopper 13, forwardly rotates. When motor M2 is forwardly rotating, the one-way clutch connected to motor M2 is in the released state, so that the note ¥ is continuously pressed to the side of the conveyance roller due to the spring force in this state. At this time, when main motor M12, to drive the main conveyance path rotates, the main conveyance path moves at a low speed. When electromagnetic clutch C1 is energized and the main conveyance path moves at a high speed, motor M3, for fetching the note ¥ forwardly rotates. In association with the rotation of motor M3, rubber roller 14, feeding roller 15 and gate roller 16 rotate, so that the note ¥ is conveyed one by one to the main conveyance path. When each note ¥ advances to discriminating section 18, the denomination, true/false, and front/back sides of the note ¥ are discriminated by note discriminating section 18 in the well-known manner set forth in the specification of the foregoing U.S. Patent. The note $\phi$ ejected out of note discriminating section 18, is led downward by first gate G1 and further conveyed upward by the rollers and then moved to gate G5 through gates G2, G3, and G4. When the ejected note ¥ is determined to be a proper (i.e., authorized) note ¥ as the result of the action note ¥ discriminating section 18, the amount of note ¥ is sequentially added into the transaction deposit memory, and gate G5 is then switched to the side of temporary holding section 23. This switching is performed by operation of rotary solenoid S6. One rotary solenoid S6 is made operative after a predetermined delay time from the time when the front edge of the note has been detected by photosensor P9. As the result of the discrimination of the front/back sides of the note ¥, which is led to temporary holding section 23, when the front side (i.e., obverse) is determined, gate G6 is inclined to the right, so that the note ¥ is led to the left-hand path. Conversely, when the back side (i.e., reverse) of the note ¥ is decided, gate G6 is inclined to the left, so that the note ¥ is led to the right-hand path. Although gate G6 is driven by solenoid S7, solenoid S7 is made operative after a delay time which is slightly longer than the operation delay time of solenoid S6, from the time when the front edge of the note had been detected by photosensor P9. Any note ¥ ejected from gate G6 is held in temporary holding section 23.

When it is determined that the ejected note is not a proper (i.e., authorized) note, as the result of the discrimination by note discriminating section 18, gate G5 is switched to the rejected side. This switching is performed by deenergizing rotary solenoid S6. Rotary solenoid S6 is deenergized after a predetermined delay time from the time when the front edge of the note has been detected by photosensor P9. The note ¥ led to the rejected side is stacked into rejected medium holding section 24.

As described above, the notes ¥ are distributed into temporary holding section 23 or rejected medium holding section 24. All the notes ¥ at deposit/dispensable note hopper 13 are sent out and photosensor P2 then detects the "bright" state. Thereafter, motor M2 reversely rotates to elevate backing-up plate 17 of hopper 13. When backing-up plate 17 reaches the upper stop position, switch SW3 detects this and motor M2 is stopped in response to this detection.

Note feeding motor M3 is stopped when detector (photointerrupter) SW4, for detecting the stop position of the pulse motor to drive feeding roller 14, detects the stop position. At this time, electromagnetic clutch C1 is turned off and main motor M12 is further switched off to stop the driving of the main conveyance path.

Thereafter, a check is made to see if any rejected medium exists or not. If NO, the number of notes is stored into transaction deposit memories a, b, and c for each denomination, respectively. The instruction of "The deposit amount is○○ ¥ yen. Press the "○" button if it is correct, or press the "×" button if it is wrong." is displayed on CRT display 112a. When the "○" button is pressed, the note is collectively conveyed to deposit/dispensable note hopper 13 from temporary holding section 23. The operation of temporary holding section 23 at this time will then be described with reference to FIGS. 8A to 8D.

Figure 8A:
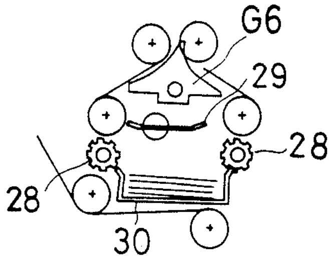
FIGS. 8A to 8D are schematic structural diagrams of a temporary holding section in the note bundle ejecting operation.
Figure 8B:
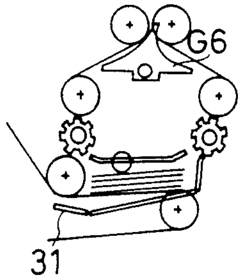
Figure 8C:
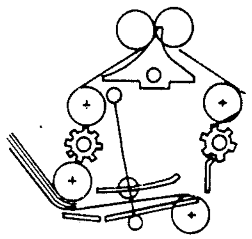
Figure 8D:
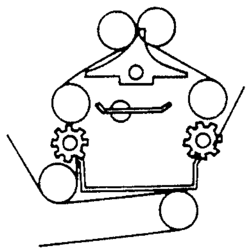
Figure 9A:
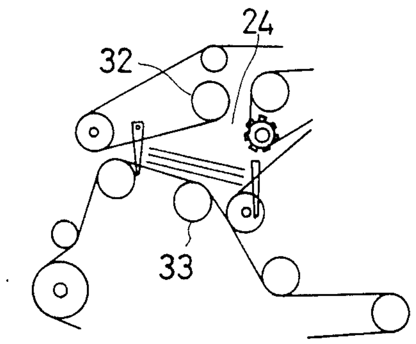
FIG. 9 is a schematic structural diagram consisting of 9A–9C, of a rejected medium holding section in the ejecting operation of the rejected medium.
Figure 9B:
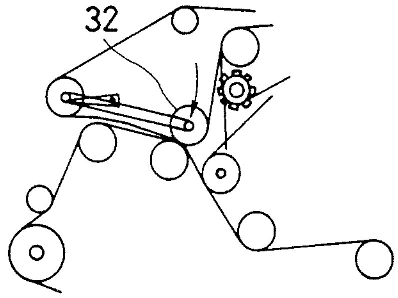
Figure 9C:
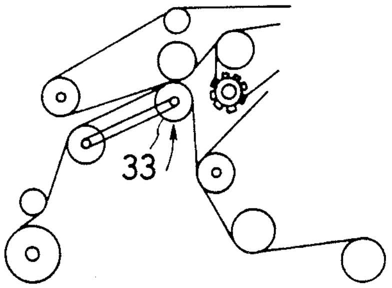
Figures 1, 10A:
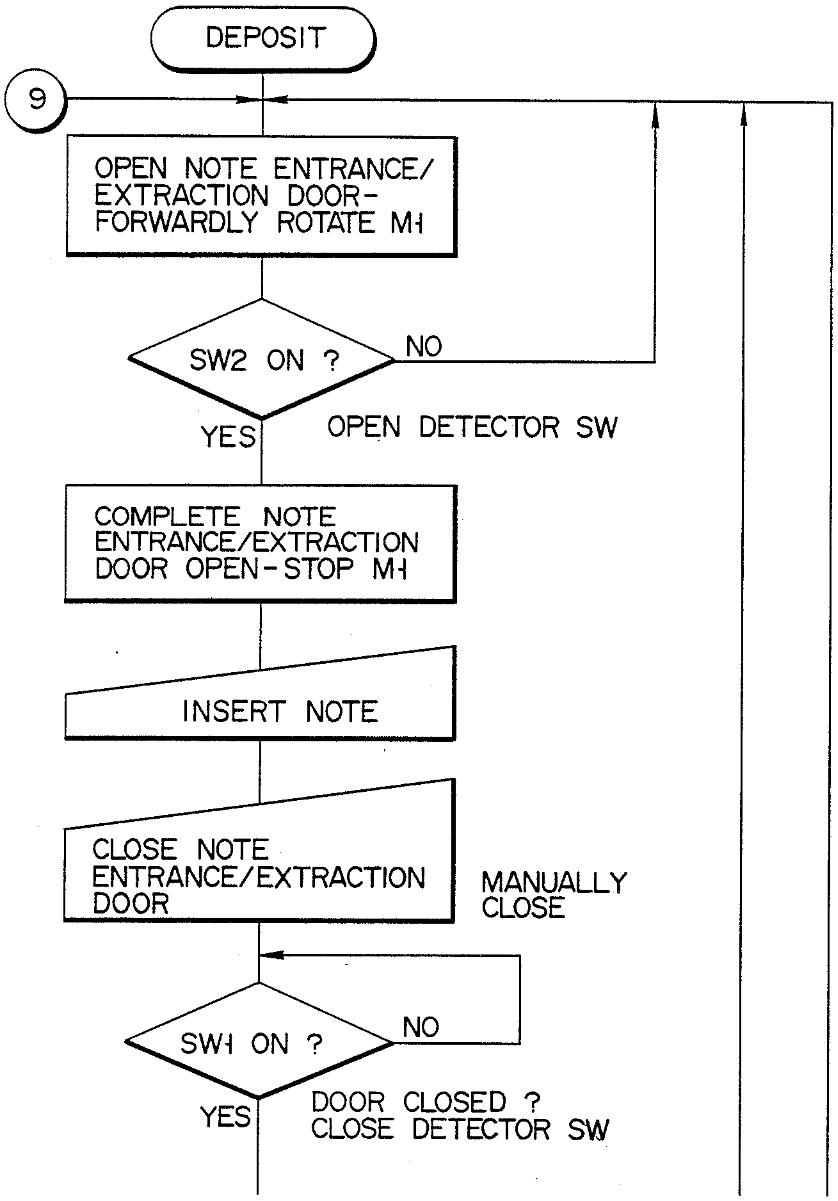
Figures 2, 10A:
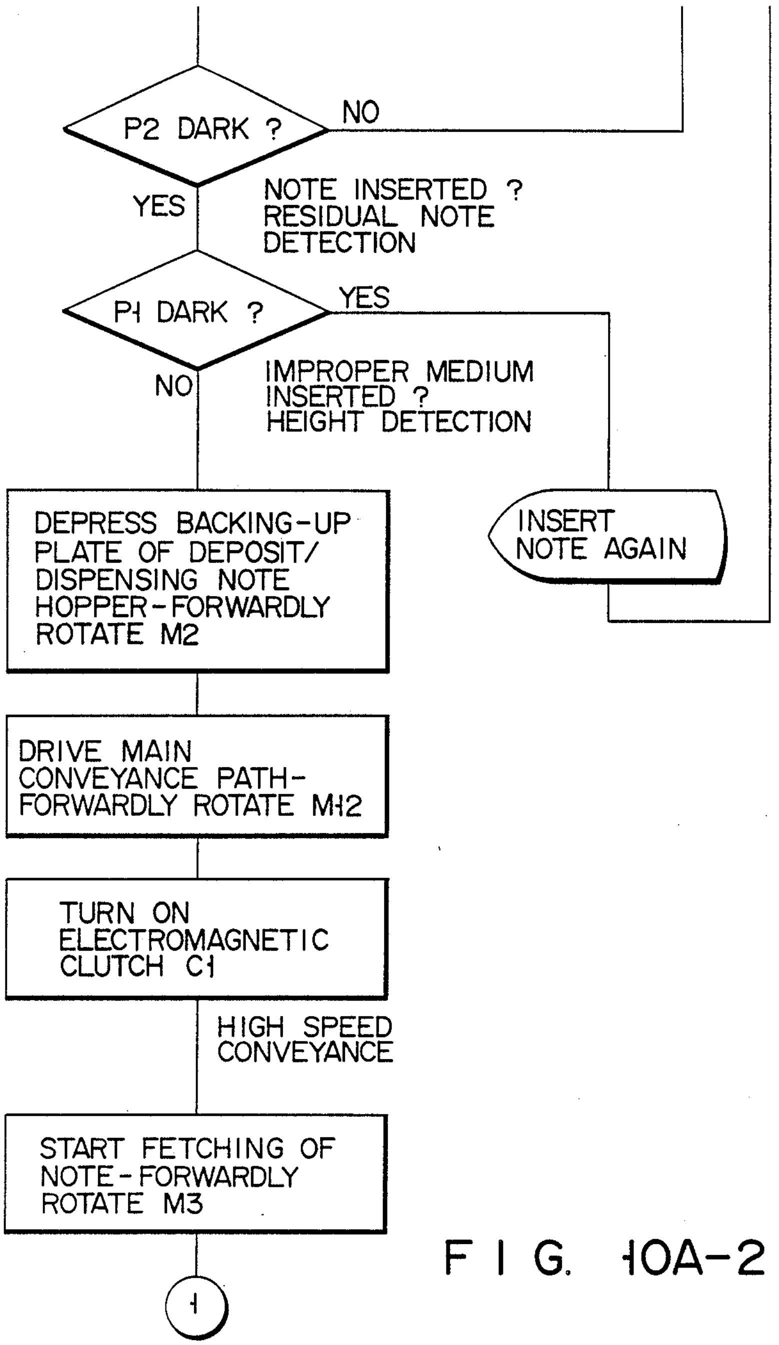
Figures 1, 10B:
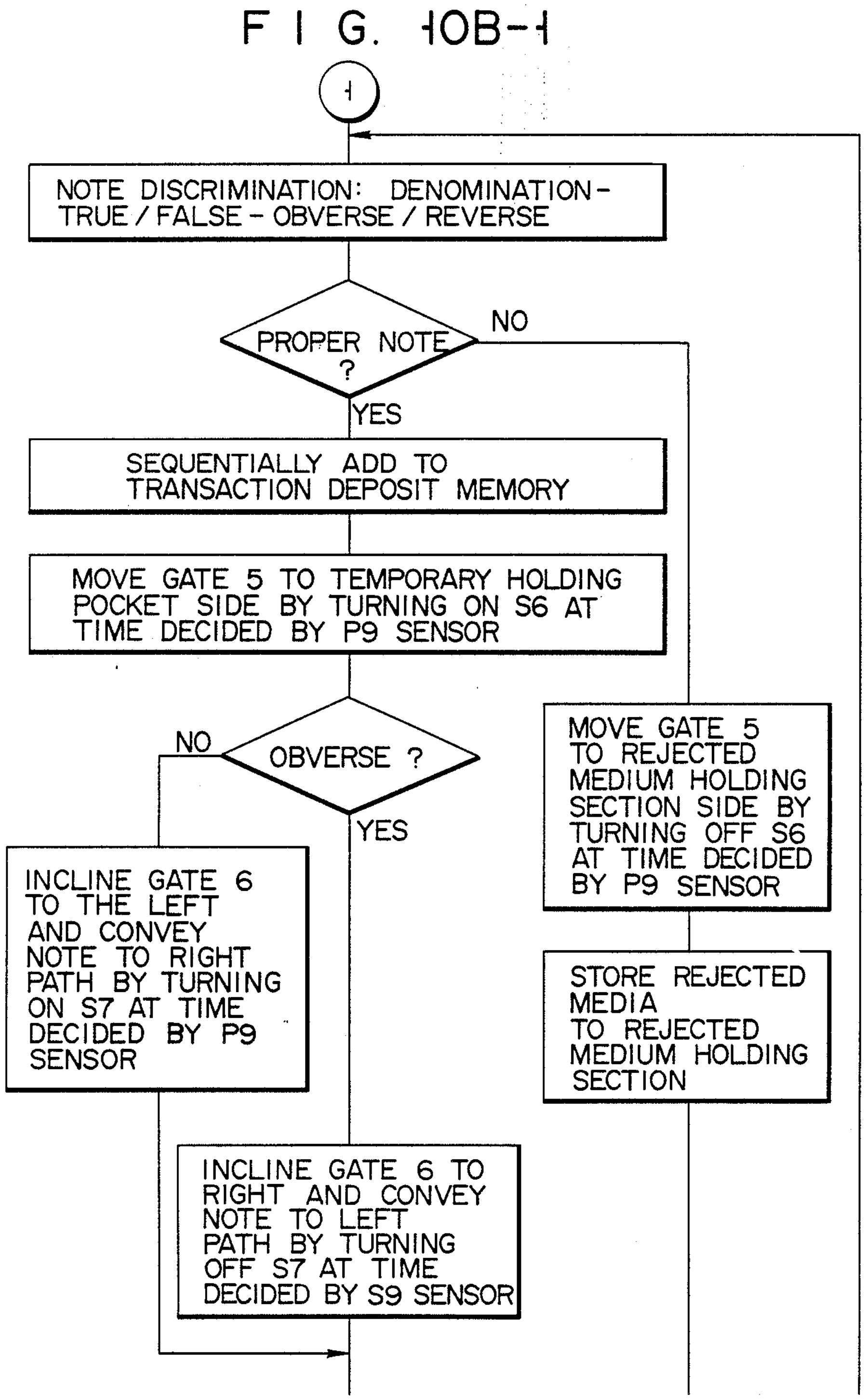
Figures 2, 10B:
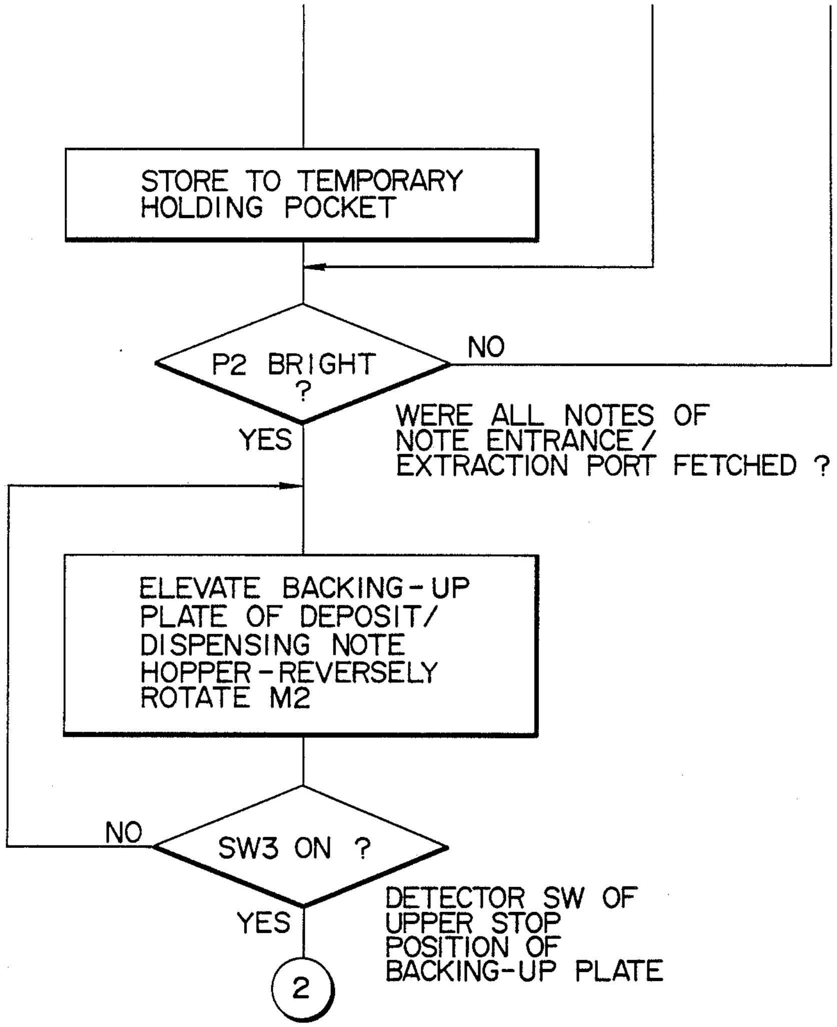
Figures 1, 10C:
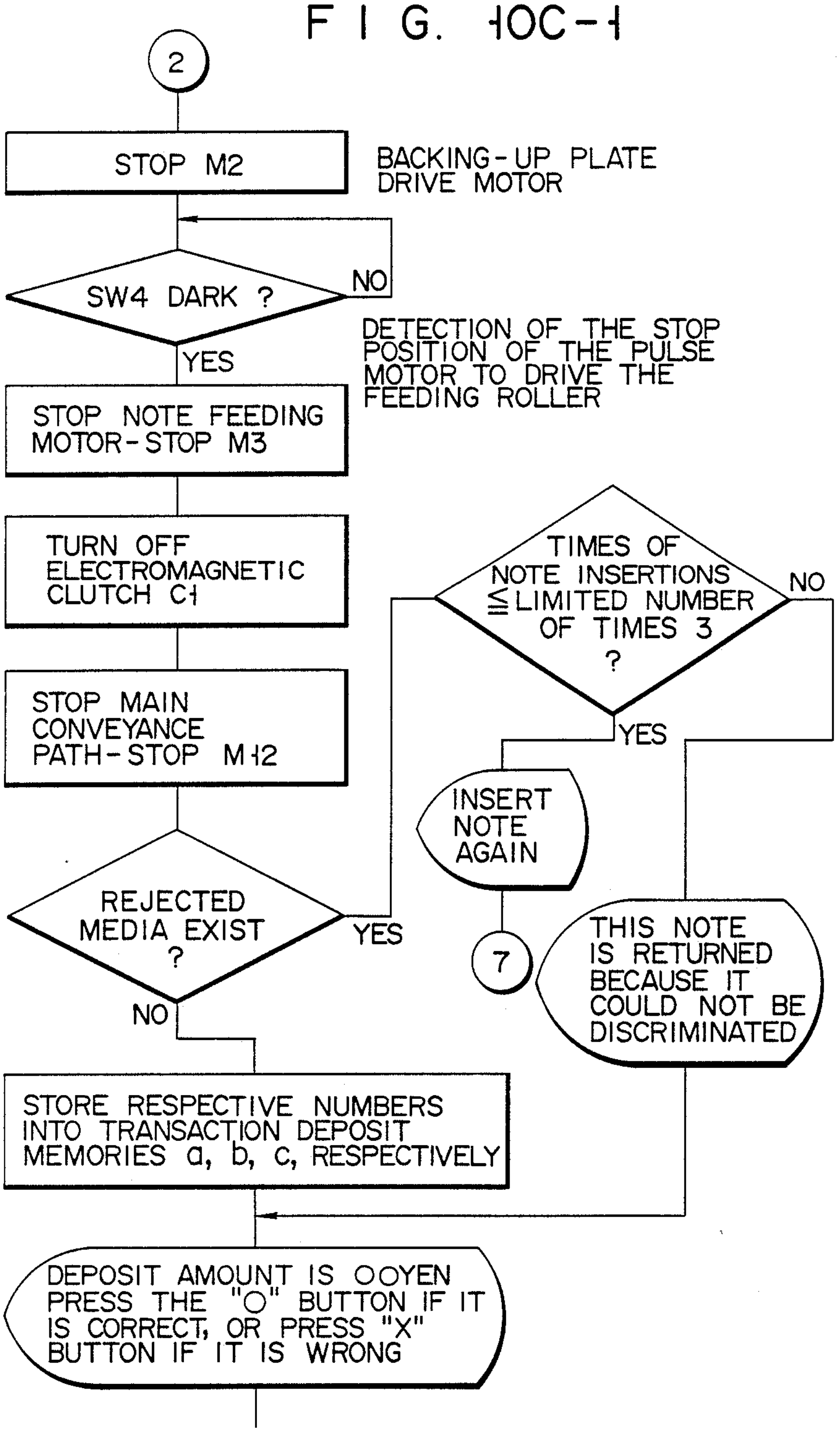
Figures 2, 10C:
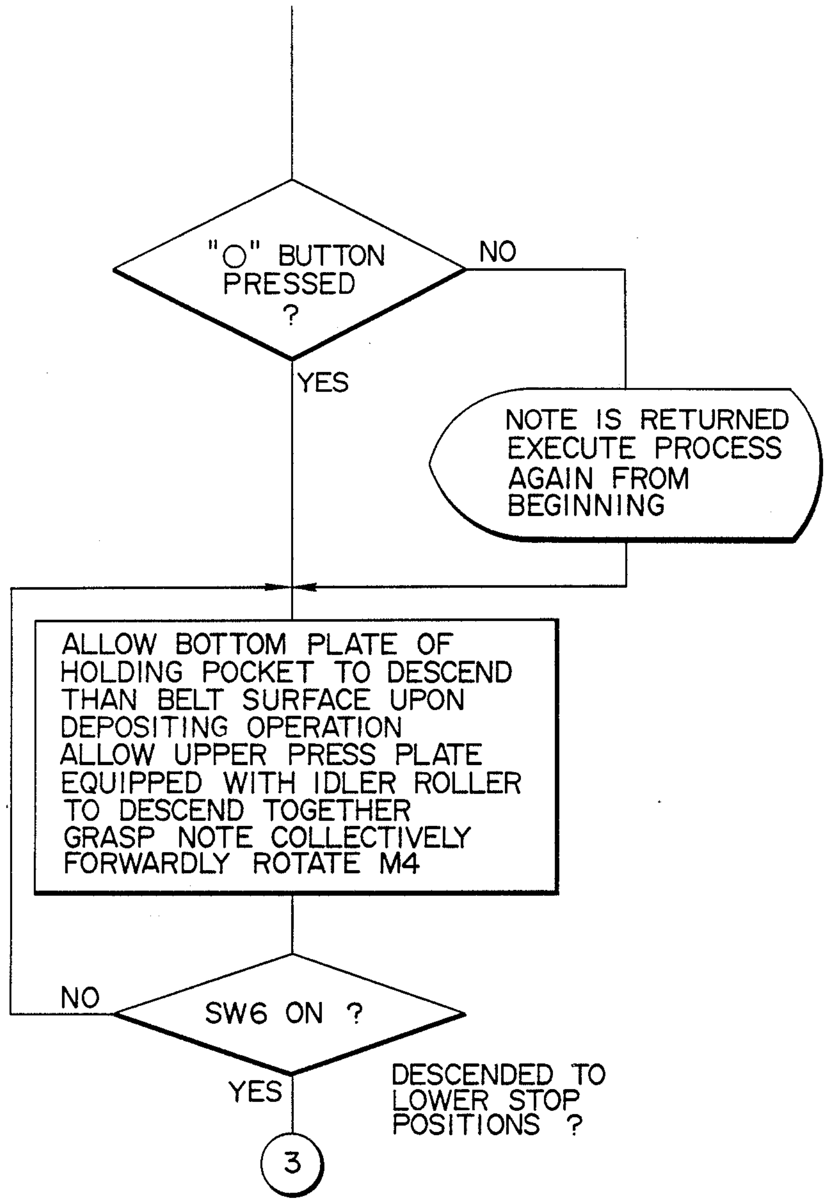
Figure 10D:
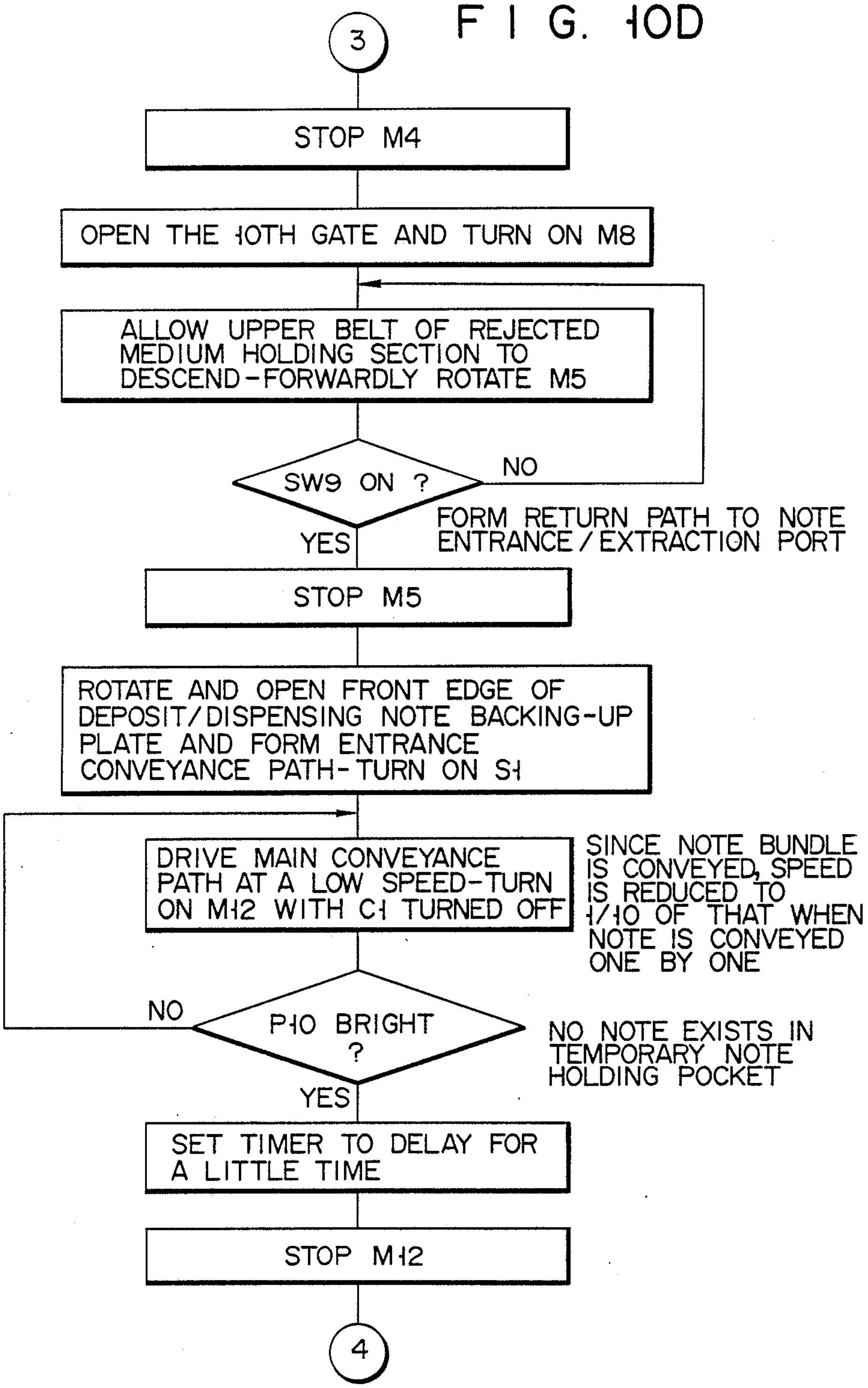

FIG. 8A shows the state in which a bundle of notes is stored in the storing pocket. Upper press plate 29 descends from this state. When upper press plate 29 presses the note bundle onto bottom plate 30, bottom plate 30 descends. Since bottom plate 30 and the conveyor belt have nest construction, bottom plate 30 passes through the conveyor belt and moves to a position below this belt. At the same time, a front side plate 31 of bottom plate 30 rotates and is inclined ahead, thereby forming the conveyance path. Upper press plate 29 stops on the way to the bottom plate due to the spring force proportionate to the thickness of the note bundle. As the note is sequentially conveyed in contact with the conveyor belt, upper press plate 29 descends so as to press the note ¥ onto the conveyor belt. When upper press plate 29 reaches the lower stop position and detector SW6 is turned on, motor M4 is stopped as shown in the flow of FIG. 10D. To open gate G10 at this time, solenoid S8 is turned on. Next, motor M5 forwardly rotates to allow the upper belt of rejected medium holding section 24 to descend; i.e., due to the forward rotation of motor M5, roller 32 descends as shown in FIG. 9B from the position of FIG. 9A. Thus, the upper belt moves toward the lower belt with the note bundle pressed in the holding section. When the upper and lower belts of the rejected medium holding section reach the lower stop position, switch SW9 is turned on and motor M5 is stopped. At this time, the return path to the deposit/dispensable note port is formed by the upper and lower belts. Conversely, as shown in FIG. 9C, roller 33 ascends, and the lower belt is elevated to push up the upper belt. When roller 33 stops at the upper stop position, the conveyance path to the back is formed.

Figure 12:
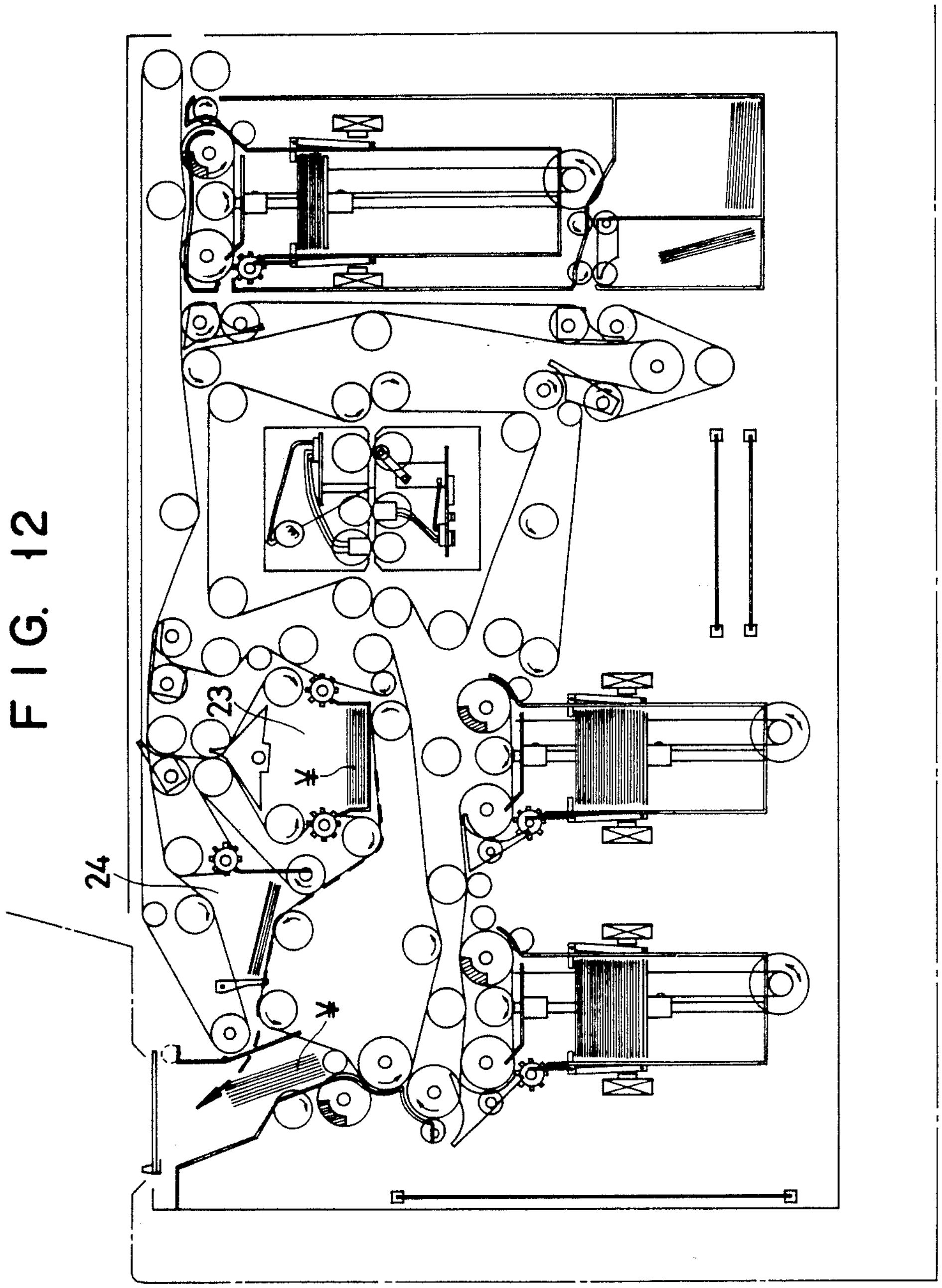
FIG. 12 is a schematic structural diagram of the transaction apparatus, showing the conveyance flow of the note bundle from the temporary holding section to the deposit/dispensing note hopper.
Figure 13:
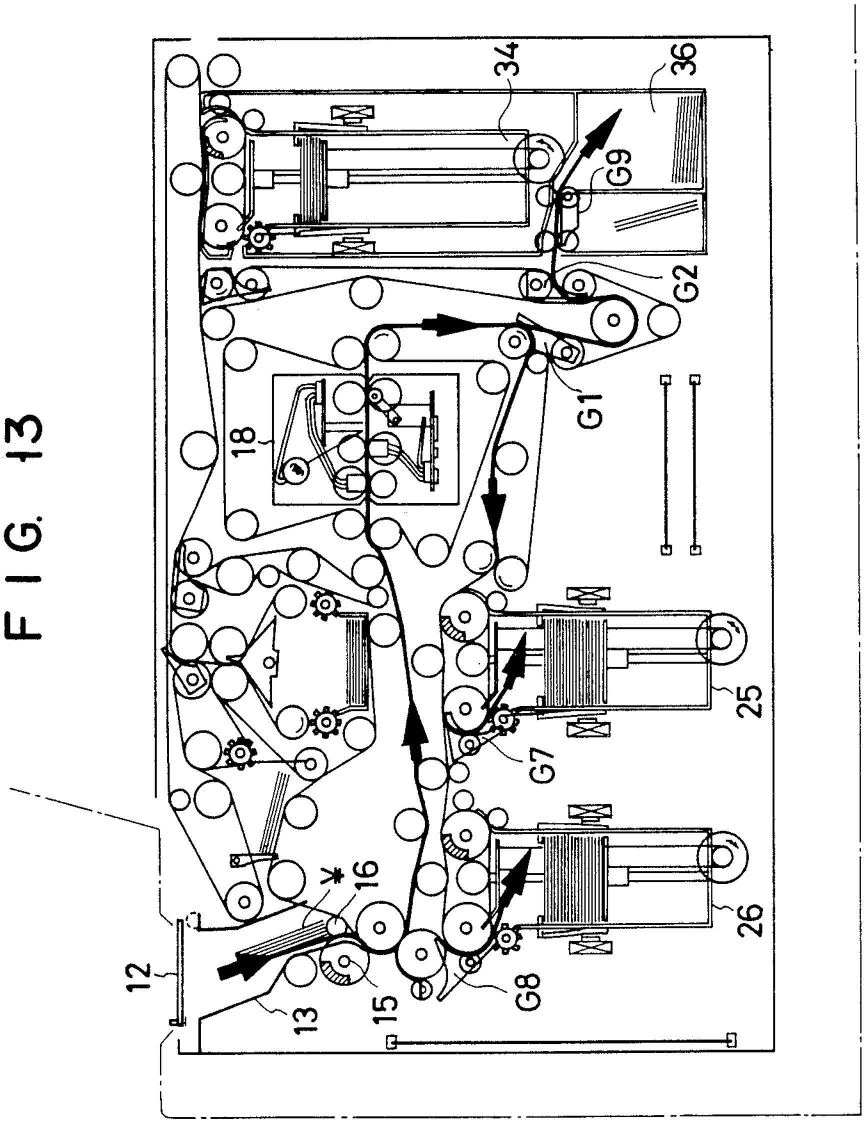
FIG. 13 is a schematic structural diagram of the transaction apparatus, showing the flow of the note in the storing operation.

When solenoid S1 is energized, backing-up plate 17 of hopper 13 is rotated and then opened to form the entrance conveyance path to hopper 13. At this time, to drive the main conveyance path at a low speed, main motor M2 is turned on in the state where clutch C1 is OFF. This is because it is intended to convey the note as a bundle. Therefore, the conveyance speed is reduced to 1/10 of that used when conveying the notes one by one. FIG. 12 shows the conveyance path for the note bundle in this case. While the note bundle is being conveyed, photosensor P10 detects any remaining notes in temporary holding section 23. When no note remains therein, a timer is set in response to the detection output of photosensor P10, and motor M12 is stopped after expiration of a period of time set by this timer.

Figure 10E:
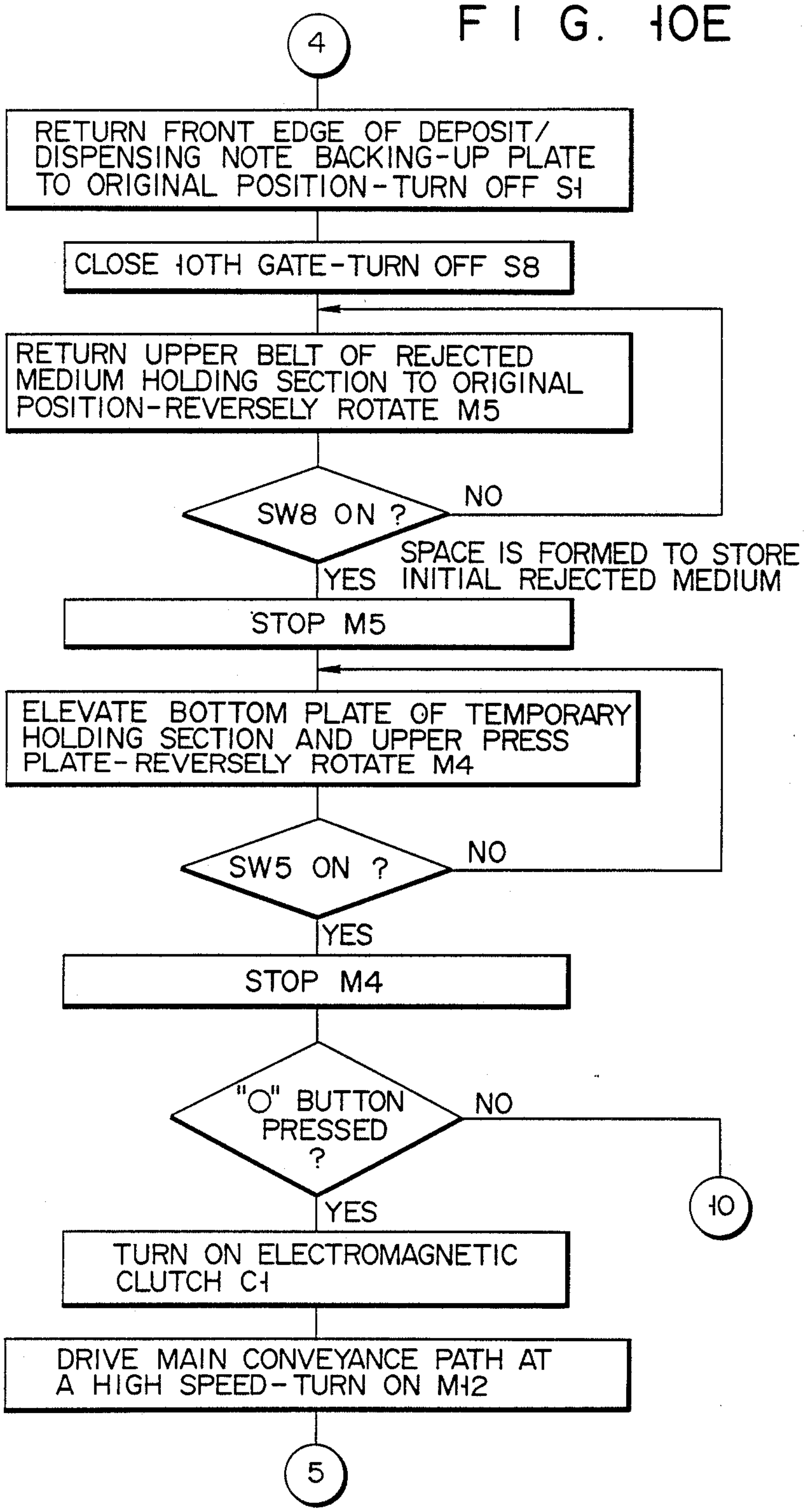
Figures 1, 10F:
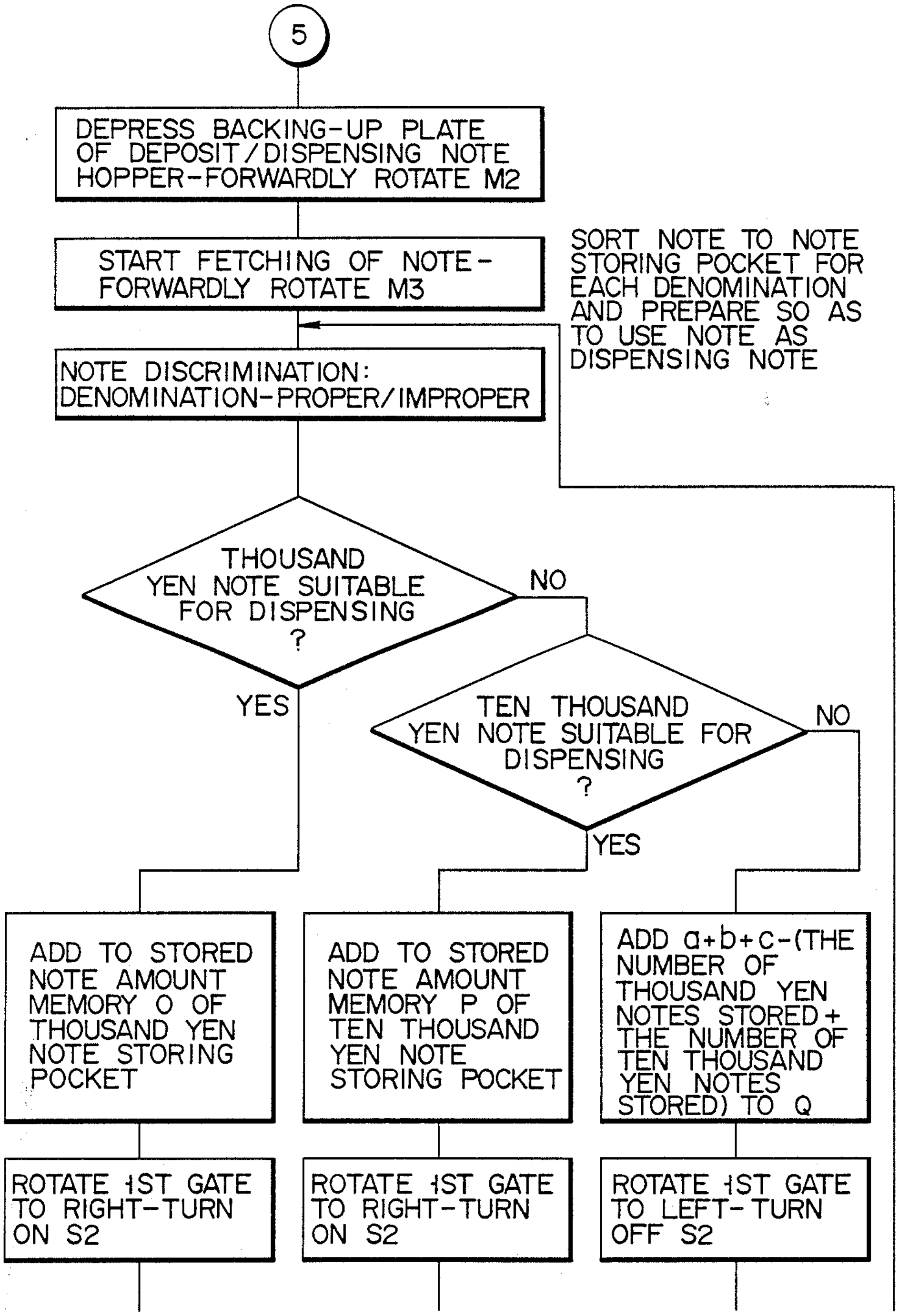
Figures 2, 10F:
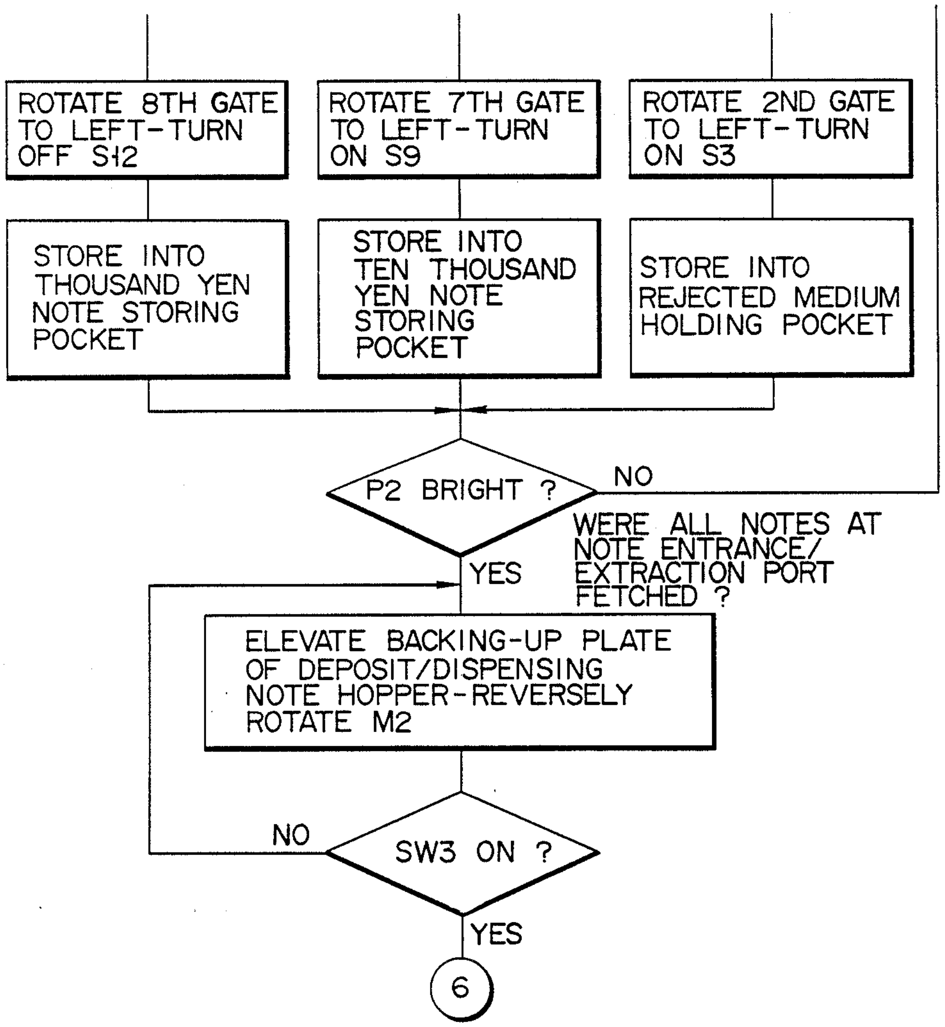
Figure 10G:
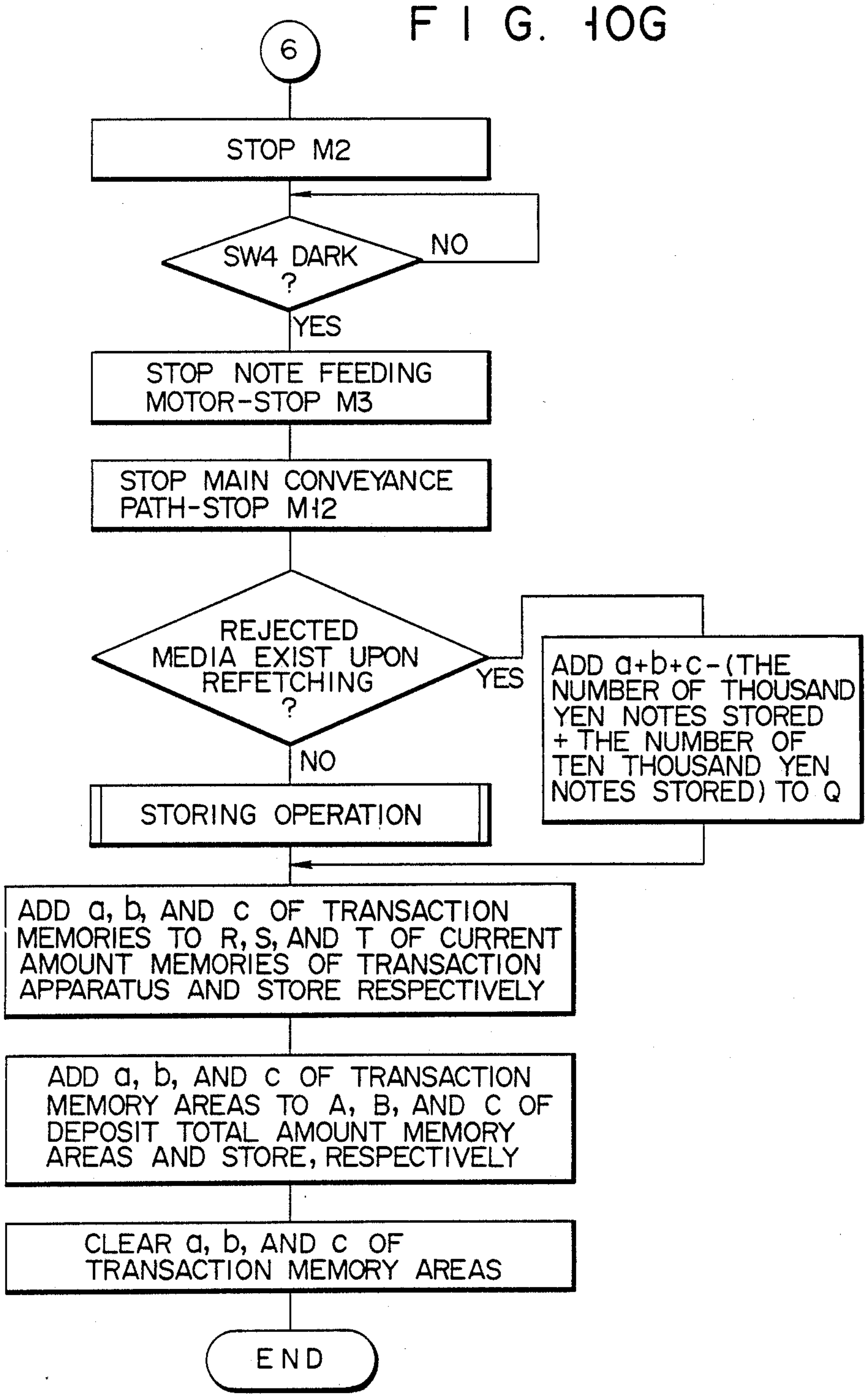
Figure 10H:
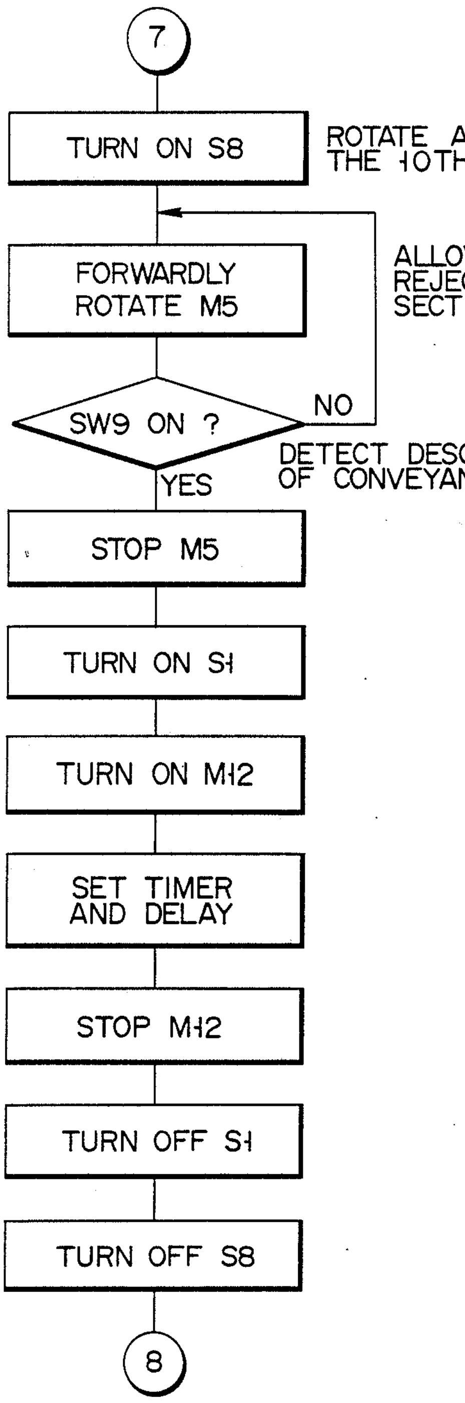
Figure 10I:
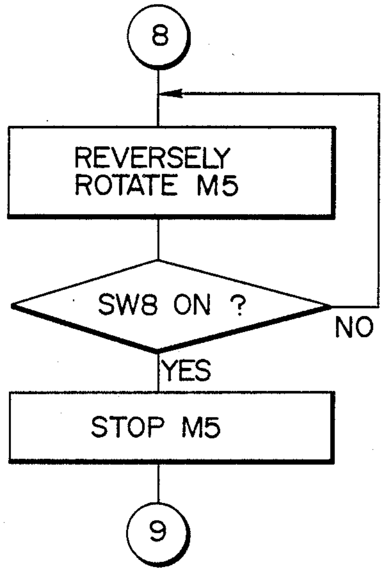

After motor M12 is stopped, solenoid S1 is turned off as shown in the flowchart of FIG. 10E, and the front edge of backing-up plate 17 is returned to its original position. In addition, solenoid S8 is turned off and gate G10 is closed. Further, motor M15 is reversely rotated so that the upper belt of rejected medium holding section 24 is returned to its original position. When detector SW8 is turned on in the recovery operation of rejected medium holding section 24, motor M5 is stopped. At this time, the rejected medium holding space is formed between the upper and lower belts.

Conversely, motor M4 is reversely rotated to elevate upper press plate 29 and bottom plate 30 of temporary holding section 23 to their initial positions. When upper press plate 29 and bottom plate 30 reach their upper stop positions, photointerrupter SW4 is turned on and motor M5 is stopped. Thereafter, the operation to discriminate the dispensable note is executed along the path shown in FIGS. 14A to 14E. Prior to describing this discriminating operation, the operation in the case where some rejected media are present, will first be described, with reference again to the flowchart of FIG. 10C.

When a rejected medium is present, a check is made to see if the number of checking times totals three or not. In this discriminating step, when a rejected medium is present, it is repeatedly discriminated and the number of discrimination times is limited to three. In the case of this limited number being 3 or less, the instruction of "Insert the note again." is displayed and the apparatus operates in accordance with the flowchart of FIG. 10H; i.e., solenoid S8 is energized and gate G10 is opened. Motor M5 is forwardly rotated and upper belt 24*a* of rejected medium holding section 24 descends. When upper belt 24*a* reaches the lower stop position, photointerrupter SW9 is turned on and motor M5 is stopped. Solenoid S1 is turned on, so that the front edge portion of backing-up plate 17 is bent to form the storing space for the note. In this state, the rejected medium can be conveyed. Since main motor M2 is driven, the rejected medium is returned to hopper 13 at a low speed. At this time, the timer is set and motor M12 is stopped after a predetermined time. In this case, the timer executes the function in place of the residual note sensor to detect any remaining notes in holding section 24. After completion of the return of the rejected note, solenoid S1 is turned off and backing-up plate 17 is returned to its initial position. Further, solenoid S1 is turned off and gate G10 is closed. Motor M5 is reversely rotated in the flow of FIG. 10I to again form the storing space, by elevating upper belt 24*a* of holding section 24. When upper belt 24*a* reaches the middle stop position, photointerrupter SW8 is turned on and motor M5 is stopped in response to this turn-on. Thereafter, the processing routine is returned to the flow of FIG. 10A. Note entrance/extraction door 12 is opened and the returned note is inserted again by the depositor and the note is again discriminated in accordance with the foregoing flow. When the rediscrimination of the note is executed more than the limit of three times, the message "This note is returned because it could not be discriminated." is displayed as shown in the flow of FIG. 10C and the preparation to discriminate the dispensable note described before is executed. This preparation is completed by the stopping of motor M4 in the flow of FIG. lOE.

Next, the process to discriminate the dispensable note is executed. First, a check is made to see if the "○" button has been pressed or not. If YES, electromagnetic clutch C1 is turned on and main motor M12 is further activated to drive the main conveyance path at a high speed. At this time, motor M2 is forwardly rotated to depress backing-up plate 17 of hopper 13. The note ¥ is pressed onto feeding roller 15 by backing-up plate 17. Since motor M3 to rotate feeding roller 15 is forwardly driven, the notes ¥ are fed, one by one, to the main conveyance path. As shown in FIG. 14, this note is conveyed to note discriminating section 18 by the main conveyance path, and its denomination, and proper/improper status are discriminated. By this discriminating step, the note is checked to see if it is proper for dispensing or not; i.e., a note corrected by an adhesive transparent tape or the like, and a dirty and damaged note are determined to be improper for dispensing, in this discriminating step, and are processed. When a thousand yen note which was determined, via this discriminating step, to be proper for dispensing is sequentially fed, the thousand yen note is sequentially added into a stored note amount memory O, corresponding to thousand yen note storing pocket 26. At this time, gate G1 is rotated to the right, so that the note is conveyed into pocket 26. The rotation of gate G1 is accomplished by turning on solenoid S2. When the thousand yen note is conveyed into pocket 26 through the conveyance path and photosensor P12 detects the passage of said yen note, solenoid S12 is turned off and gate G8 is rotated to the left and the path to pocket 26 is formed. Thus, the thousand yen note is sequentially stored in pocket 26.

When the note conveyed is not a thousand yen note but a ten thousand yen note, the ten thousand yen note is sequentially added into a stored note amount memory P corresponding to ten thousand yen note storing pocket 25. The ten thousand yen note is conveyed into pocket 25 through gate G1. At this time, when photosensor P11 detects the passage of the ten thousand yen note, solenoid S9 is turned on and gate G7 is rotated to the left and the path to pocket 25 is formed. Thus, the ten thousand yen note is sequentially stored in pocket 25.

In the case where a note is unsuitable for dispensing, the sum of the number of thousand yen notes stored and the number of ten thousand yen notes stored is subtracted from the total number of notes stored in transaction deposit memories a, b, and c and the resultant value is added to a memory Q. Next, solenoid S2 is turned off and gate G1 is rotated to the left. Further, solenoid S3 is turned on and gate G2 is rotated to the left. Thus, the note which was decided to be unsuitable for dispensing is led to rejected medium holding pocket 36, by gates G1 and G2, and stored in this pocket.

When all of the notes of hopper 13 are fully distributed into storing pockets 25, 26, and 36, in the manner as described above, and photosensor P2 detects the absence of any remaining note, motor M2 is reversely rotated to elevate backing-up plate 17 of hopper 13. When backing-up plate 17 reaches the upper stop position, contactless switch SW3 is turned on and motor M2 is stopped. At this time, when photosensor SW4 is OFF, i.e., when the stop positions of the feeding and conveyance motors of the note deposit/dispensing port are detected, motor M3 is stopped. Subsequently, motor M12 for the main conveyance path is stopped. A check is made to see if any rejected medium is present or not, upon the refeeding operation being performed. If NO, the storing operation is executed. If YES, the sum of the number of thousand yen notes stored and the number of ten thousand yen notes stored is subtracted from the total number of notes stored in transaction deposit memories a, b, and c and the resultant value is added to memory Q. Then, the storing operation starts. Although the storing operation is executed in accordance with the flow of FIG. 12, this storing operation will be explained later. After completion of the storing operation, the values of transaction deposit memories a, b, and c are added to the values of current balance memories R, S, and T of the transaction apparatus and stored, respectively. The values of transaction deposit memories a, b, and c are added to the values of total deposit amount memories A, B, and C and stored therein, respectively. Memories a, b, and c are cleared, and the discriminating processes of the deposit and dispensable notes are then completed.

Figure 11:
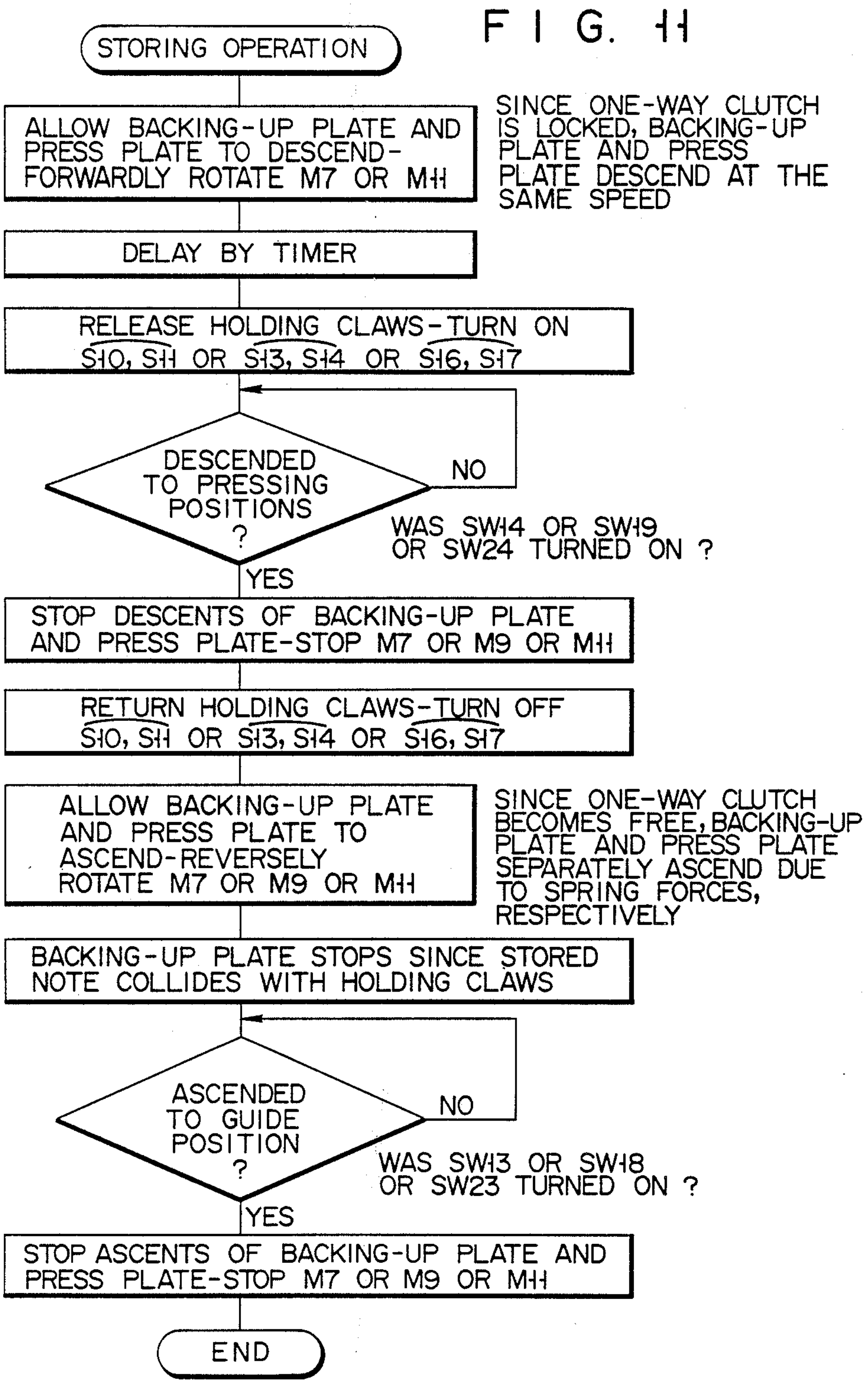
FIG. 11 is a flowchart for explaining the storing operation of a storing pocket.
Figure 15:
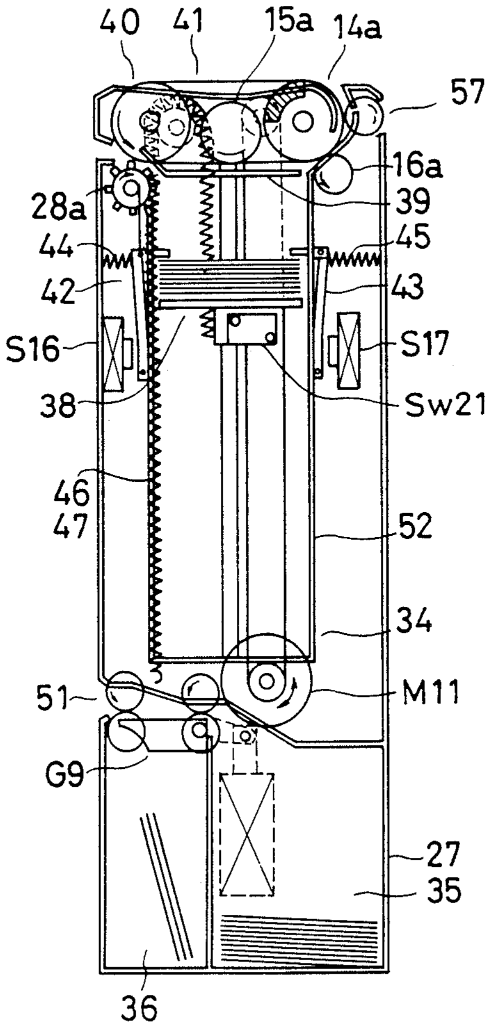
FIG. 15 is a schematic structural diagram of a side view of a batch storing section.
Figure 16:
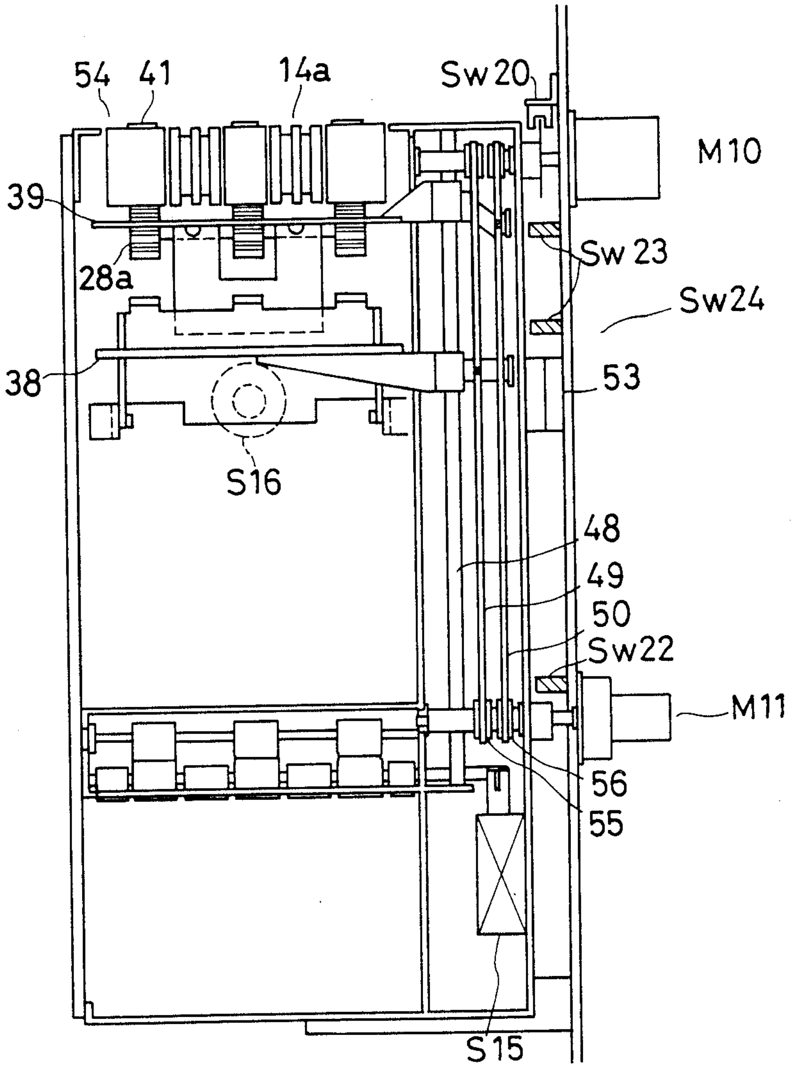
FIG. 16 is a schematic structural diagram of a plan view of the batch storing section.
Figure 17:
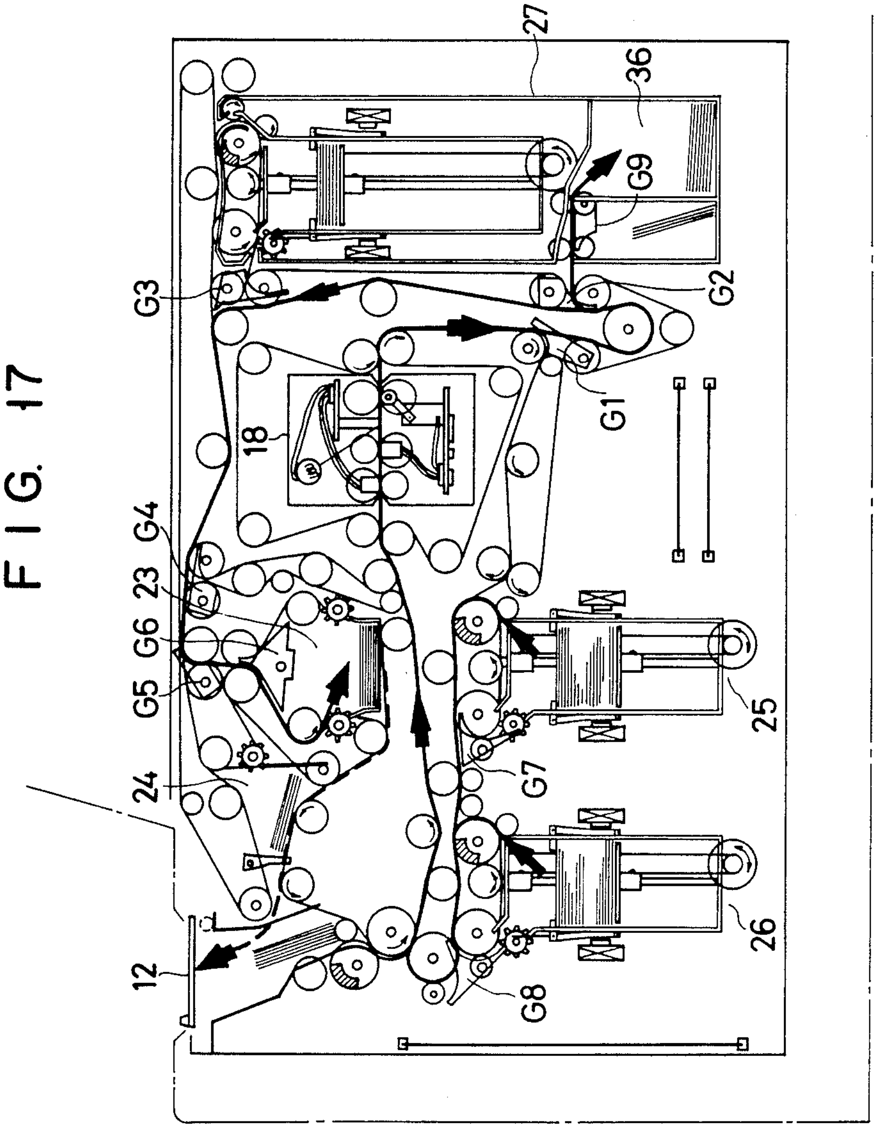
FIG. 17 is a schematic structural diagram of the transaction apparatus showing the flow of the note in the dispensing mode.

The storing operation will now be described in accordance with a subroutine of FIG. 11. Prior to describing it, however, the structures of thousand yen note storing pocket 26 and ten thousand yen note storing pocket 25 will be described. In this case, since pockets 26 and 25 have substantially the same structure as that of batch storing pocket 34 of batch storing section 27 shown in FIGS. 15 and 16, the structures of those storing pockets will be explained with reference to FIGS. 15 and 16.

A feeding roller 15*a* and a conveyance roller 16*a* are arranged over storing pocket 34. Rollers 14*a* and 15*a* are interconnected by an intermediate gear and rotated in a one-to-one correspondence relation and feed or convey a note via one rotation. Rollers 14*a* and 15*a* are detachably coupled to motor M1 by a universal coupling and driven by motor M10. An expansion belt 41 and an idler roller 54 are arranged coaxially with feeding roller 14*a* and can freely rotate independently of feeding roller 14*a*. An entrance side idler roller 40 is coupled to fetching shaft idler roller 54 through expansion belt 41. Driving power is applied to both rollers 40 and 54 from the main conveyance path belt, so that expansion belt 41 is driven and roller 40 is rotated. Three beat wheels 28*a* are provided so as to face entrance side idler roller 40. Beat wheels 28*a* have the same function as beat wheels 28 of temporary holding section 23. A backing-up plate 38 is vertically movably supported to a guide rod 48 through a linear ball bearing and always upwardly pressed by a spring 46. Further, backing-up plate 38 is coupled to a drive belt 49, and also to DC motor M11 equipped with a gear reducer, via a coupling detachable from a pulley 55, which has a one-way clutch. When motor M11 is rotated counterclockwise in FIG. 16, the one-way clutch is locked and backing-up plate 38 descends through pulley 55 and belt 49 against spring 46.

Conversely, when motor M11 rotates clockwise, the one-way clutch slips, so that backing-up plate 38 is upwardly pressed by the tensile force of spring 46. However, when motor M11 stops, backing-up plate 38 is stopped because it cannot be elevated by the tensile force of spring 46, due to the self-locking mechanism of the gear reducer.

Microswitch SW21, for emptiness detection, is attached to backing-up plate 38. An escape hole corresponding to the actuator of microswitch SW21 is formed in a press plate 39. Therefore, if no note is present when backing-plate 38 ascends to the highest position, the actuator enters the escape hole, so that the absence of a note can be detected.

Press plate 39 is vertically movably supported by guide roller 48 through another linear ball bearing independent of backing-up plate 38. Press plate 39 is always upwardly pressed by another spring 47 independent of backing-up plate 38 and further coupled to a drive belt 50. Press plate 39 is also coupled to DC motor M11, equipped with a gear reducer, through a coupling detachable from a pulley 56, which has a one-way clutch.

Press plate 39 operates substantially in the same manner as backing-up plate 38. When motor M11 rotates clockwise, the one-way clutch slips. When motor M11 rotates counterclockwise, the one-way clutch is locked. Therefore, by the counterclockwise rotation of DC motor M11, press plate 39 and backing-up plate 38 descend at the same speed while keeping the same interval therebetween. Conversely, when motor M11 rotates clockwise, the one-way clutches are unlocked so that backing-up plate 38 and press plate 39 are elevated within a range of the peripheral velocities of pulleys 55 and 56. At this time, backing-up plate 38 and press plate 39 can stop or slowly ascend, namely, they can perform independent operations, respectively, in accordance with the load condition.

Holding claws 42 and 43 are supported by magnets S16 and S17 and return springs 44 and 45, respectively. In FIG. 14, the arm edge of holding claw 42 on the left side in FIG. 14 abuts upon the rotary shaft of beat wheels 28*a*. Therefore, when solenoid S16 attracts holding claw 42, beat wheels 28*a* are also simultaneously rotated to the left and escape. Since the rotating force is not applied to beat wheels 28*a* from the external conveyance path at this escape position, beat wheels 28*a* do not rotate.

If the main conveyance path is driven even in the state in which feeding pulse motor M10 stops, expansion belt 41, entrance side idler roller 40, fetching shaft idler roller 54, beat wheels 28*a*, reverse roller 16*a*, and a feeding roller 57 rotate through the belt gear, so that the note can be conveyed. During conveyance of a note in this case, if a rubber chip of a feeding roller 14*a* is present on the conveyance path, there is the fear that it may become an obstacle. Therefore, in order to fetch the first note without skipping it, when a dispensable note is fetched, the rubber chip of feeding roller 14*a* needs to be always accurately stopped at an intermediate position between the conveyance path and the fetching surface. For this purpose, switch SW20 is provided to stop motor M10 when it detects the stop position on the basis of the notch position of the notched disk equipped with the fetching shaft.

Using the above structure for the storing pocket, the following advantages are obtained: namely, since two upper and lower plates can be vertically moved at an arbitrary distance therebetween by one motor, the note pocket can correspond to the amount of storage space required by the notes. Upon fetching, the storage height is mechanically set by the holding claw so that up to one hundred notes can be stored; therefore, the notes can be stored irrespective of the height of the bundle. Since the press plate is moved downward of the holding plate, even if the position of the note is slightly disarranged, it can be aligned and pushed into the pocket. Since the notes are elevated by the constant force of the spring and pressed to come into contact with the holding claw, even if the stacked note bundle loosens or softens during storage, the notes are pressed tightly against one another via the single storing operation. Thus, a large number of notes can be stored in a narrow space. The storing operations of storing pockets 25, 26, and 34 will now be commonly described in accordance with the flow of FIG. 11 and the steps of FIGS. 14A to 14E.

Figure 14D:
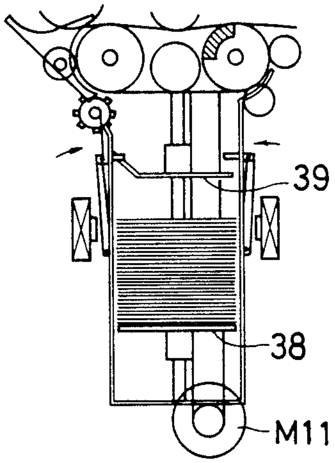
Figure 14E:
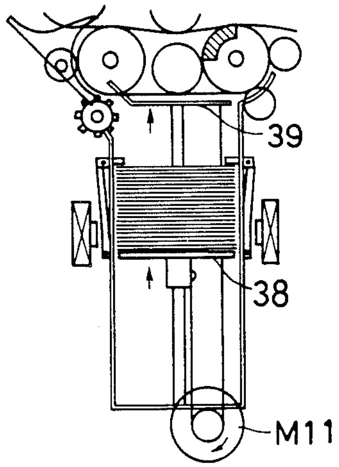

In FIG. 14A, when the note is fetched, solenoids S10, S11, S13, S14, S16, and S17 are in the OFF state and holding claws 42 and 43 are located in the storing pocket. In this state, the note bundle already stored is restricted by holding claws 42 and 43. In addition, the bottom for the note which is newly fetched is formed by holding claws 42 and 43 and the notes stored. The distance to this bottom position is set to a value suitable to store up to hundred notes and is also set in a manner to prevent the notes standing or being turned upside down. Namely, the distance is set so as to prevent the note turning out with front and back sides reversed or the note standing up, where it might choke the storing pocket. Thus, the fetched note progresses obliquely, as shown in FIG. 14A, and is sequentially stacked. When all of the dispensable notes are completely stacked onto holding claws 42 and 43 from deposit/dispensable note hopper 13, the fetching operation stops. At this time, motors M7, M9, and M11 forwardly rotate (counterclockwise), and backing-up plate 38 and press plate 39 descend. However, the direction of descent of plates 38 and 39 corresponds to the locking direction of the one-way clutches, so that backing-up plate 38 and press plate 39 both descend at the same speed. After the expiration of a predetermined period of time set by the timer, solenoids S10, S11, S13, S14, S16, and S17 are turned on and holding claws 42 and 43 are released (FIG. 14B). When backing-up plate 38 and press plate 39 descend to the pressing position shown in FIG. 14C, switches SW14, SW19, and SW24 are turned on. At this time, motors M7, M9, and M11 are stopped and further solenoids S10, S11, S13, S14, S16, and S17 are turned off, so that holding claws 42 and 43 again enter the storing pocket (FIG. 14D). Thereafter, motors M7, M9 and M11 are rotated reversely, i.e., clockwise in the diagram. In this reverse rotation, since the one-way clutches are released, backing-up plate 38 and press plate 39 are separately elevated by the spring force. Since press plate 39 and holding claws 42 and 43 have nest construction, press plate 39 passes through holding claws 42 and 43. However, the top portion of the note bundle placed on backing-up plate 38 then collides with the holding claws, and backing-up plate 38 then stops. At this time, the note is pressed by the elevating force of backing-up plate 38 and is densely stacked; i.e., the notes which are stored in the storing pocket are packed therein; consequently, a fairly large number of notes can be stored in a smaller space.

When press plate 39 reaches the conveyance note guide position, switches SW13, SW18, and SW23 are turned on. In response to the turn-on of these switches, motors M7, M9, and M11 are turned off to stop the elevation of backing-up plate 38 and press plate 39. In this manner, the storing operation is completed.

Figure 10J:
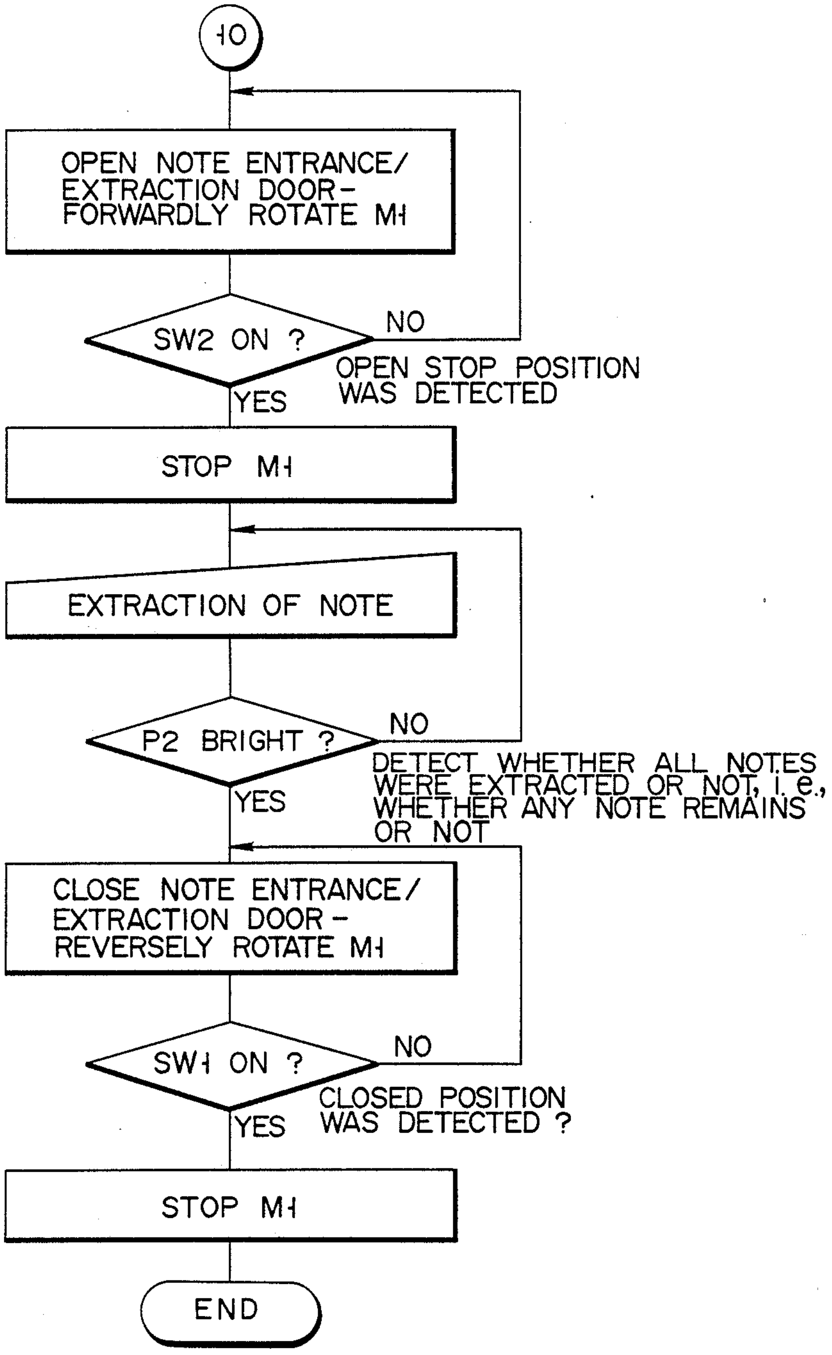

In the flow of FIG. 10E, when the "○" button is not pressed, the processing routine advances to the flow of FIG. 10J; namely, motor M1 is forwardly rotated to open note entrance/extraction door 12. When door 12 reaches the open stop position, switch SW2 is turned on and motor M1 stops. At this time, when the note is taken out of deposit/dispensable note hopper 13 by the depositor and no remaining note is present in this hopper, photosensor P2 is turned on and motor M1 is reversely rotated and door 12 is closed. When door 12 reaches the closed position, switch SW1 is turned on and motor M1 stops. Thus, the apparatus returns to the initial state and the next depositing operation can be executed.

The dispensing operation will now be described with reference to FIGS. 17, and 18A to 18C. When the button corresponding to the deposit process is pressed in accordance with the instruction displayed on CRT display 112*a* and an amount of dispensable notes is inputted by keys, main motor M12, which drives the main conveyance path, is forwardly rotated. The main conveyance path starts running at a low speed due to the forward rotation of only main motor M12. When electromagnetic clutch C1 is turned on, the main conveyance path is driven at a high speed. When ten thousand yen notes and thousand yen notes are designated as the denominations of the notes to be dispensed, ten thousand yen note storing pocket 25 is first selected and the ten thousand yen note dispensing operation starts. Then, thousand yen note storing pocket 26 is selected, and the thousand yen note dispensing operation starts. When the thousand yen note is designated as the note denomination for dispensing, thousand yen note storing pocket 26 is selected from the beginning and the one thousand yen note dispensing operation starts.

Figure 19A:
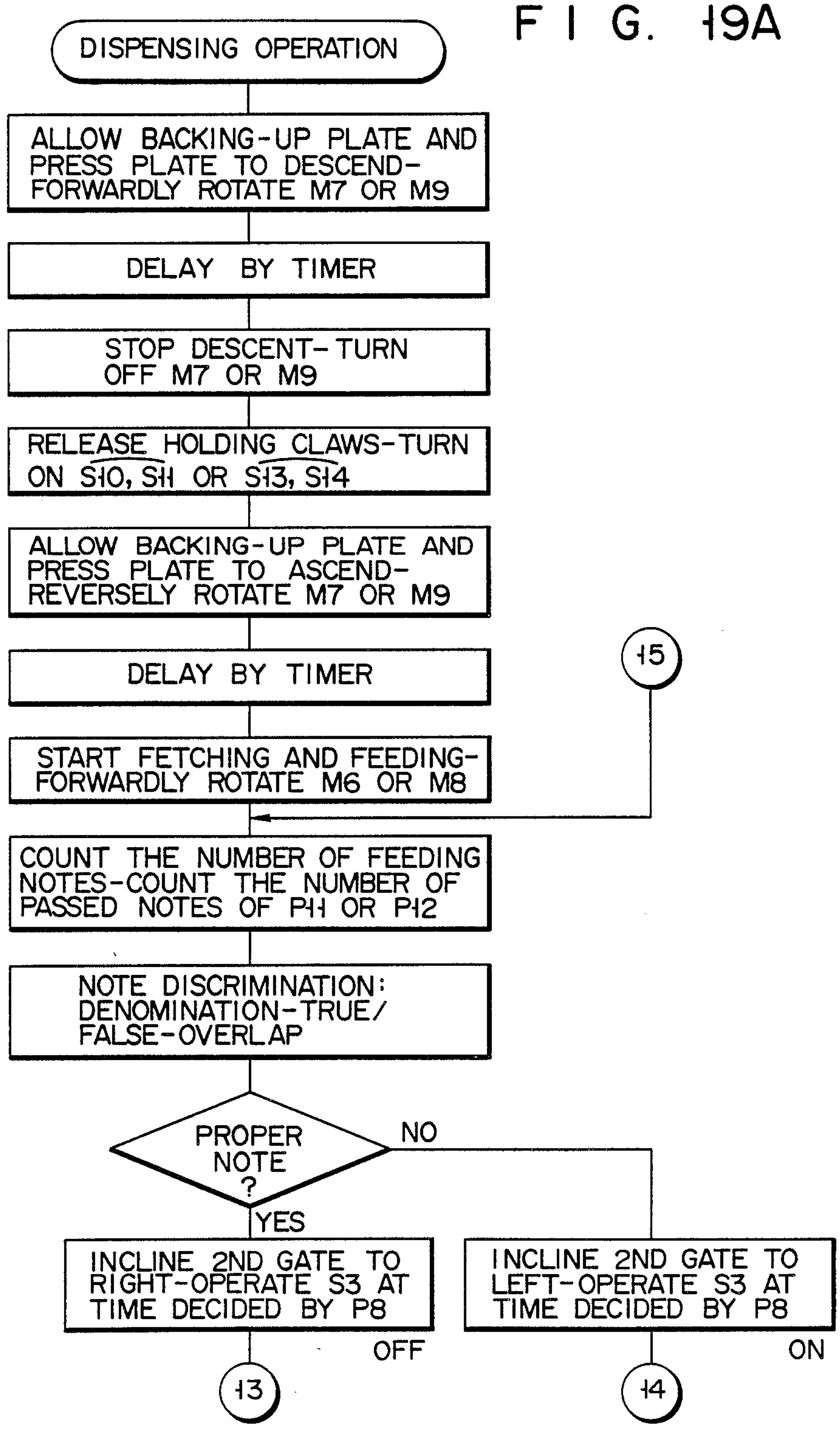
FIGS. 19A to 19C are diagrams showing a subroutine for the dispensing operation, in the dispensing mode.
Figure 19B:
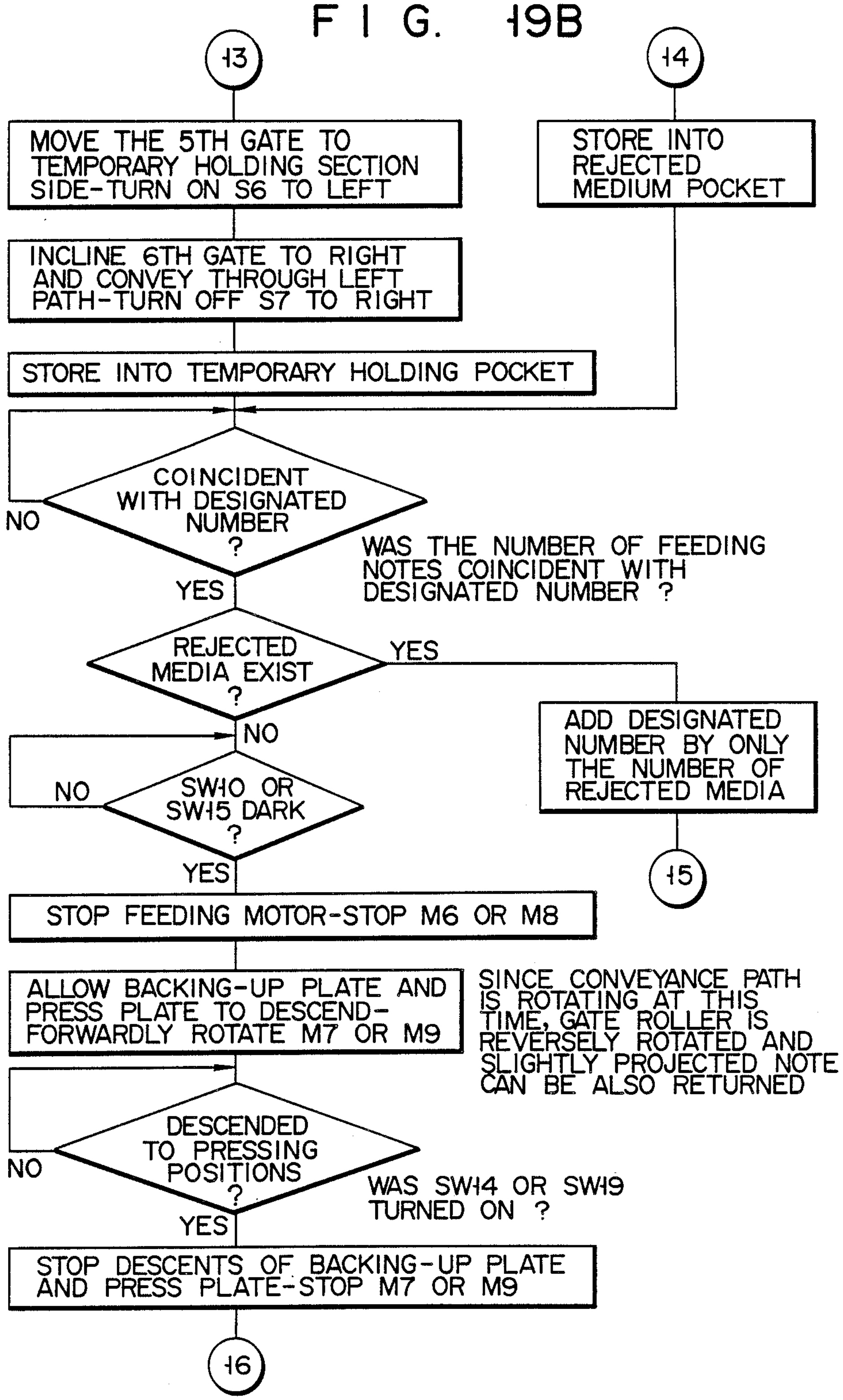
Figure 19C:
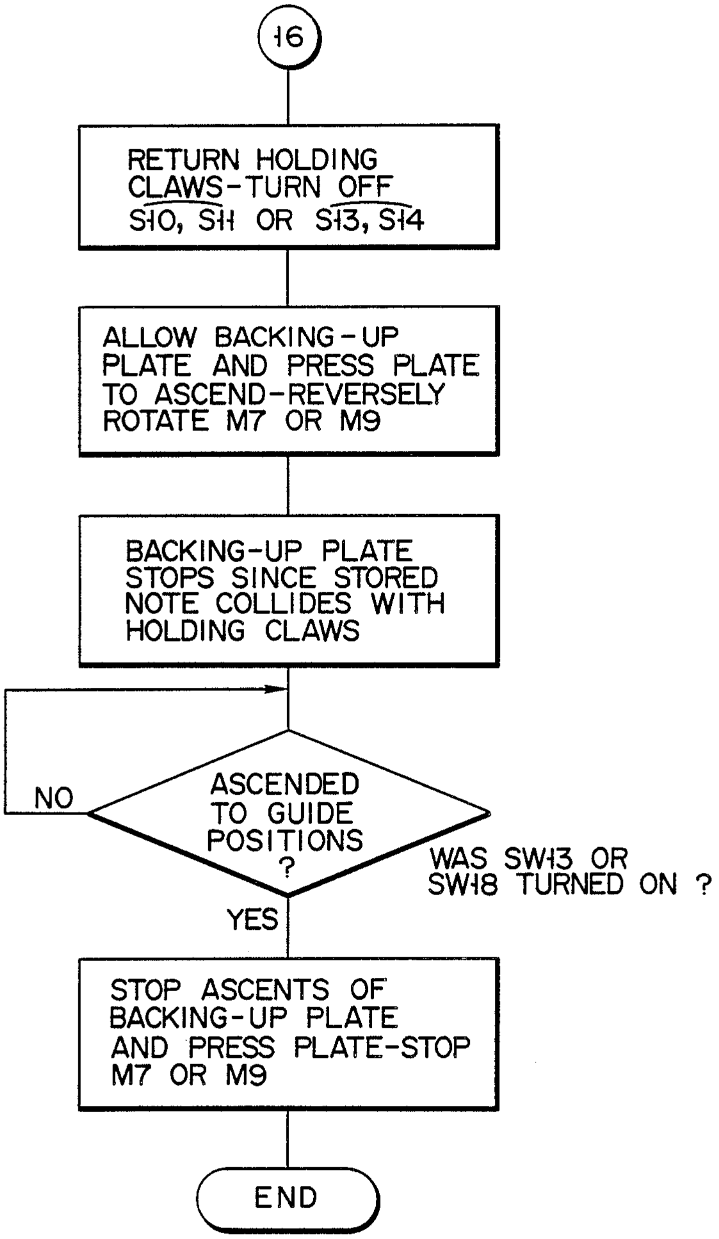

The dispensing operation is carried out in accordance with the flows of FIGS. 19A to 19C. First, as shown in FIG. 20A, motor M7 (M9) is forwardly rotated to allow backing-up plate 38 and press plate 39 to slightly descend. The pressing of the stored notes with holding claws 42 and 43, due to the pushing-up force of backing-up plate 38 is released, so that the holding claws can be easily removed from the stored note bundle. This descent amount is set by the timer. After the expiration of a predetermined period of time set by the timer, motor M7 (M9) is stopped and solenoids S10 and S11 (S13, S14) are turned on, so that holding claws 42 and 43 are released. In this state, motor M7 (M9) is reversely rotated and backing-up plate 38 and press plate 39 are elevated. When these plates ascend to predetermined positions, the timer starts operating and motor M6 (M8) is forwardly rotated to start the fetching and conveyance of the note. Feeding roller 14*a* rotates via the forward rotation of motor M6 (M8) and the notes are sent out one by one. At this time, photosensor P11 (P12) detects the passing of each note, and the number of notes passed is counted via this detection signal. The note extracted from storing pocket 25 (26) is conveyed to note discriminating section 18 via the main conveyance path. The denomination, true or false, and overlap of the conveyed notes are discriminated by note discriminating section 18. When the dispensable note is determined, by the above checks, to be the proper (authorized) note, gate G2 is inclined to the right and solenoid S3 is turned off to form the path to temporary holding section 23. If it is not the proper note, solenoid S3 is energized so that gate G2 is inclined to the left to lead the note, as a rejected medium, to rejected medium storing pocket 36. This gate switching timing is determined by photosensor P8 detecting the passing of the note. When the proper note is detected by photosensor P9, rotary solenoid S6 is energized to rotate to the left, thereby switching gate G5 to the side of the temporary holding section. Further, gate G6 is switched to the right due via the spring force and rotary solenoid S7 is deenergized to form the left path. In this state, the note is sequentially stored in temporary holding section 23. When the number of notes which are extracted from the storing pocket reaches the designated number, a check is made to see if rejected media are present or not. If YES, the number of rejected media is added to the designated number and the processing routine is then returned to the flow to count the number of conveying notes of FIG. 19A. If no rejected medium is present, a check is made to see if photosensor SW10 (SW15), which detects the stop position of the feeding motor, has detected the stop position or not (darkness detection). If YES, feeding motor M6 (M8) is stopped. In this state, the note conveying operation for the designated number of notes from the storing pocket is completed. However, upon completion of the note conveying operation, what is called a partial note projection occurs in the storing pocket; namely, after the last note has been conveyed, the next note is partially conveyed by feeding roller 14*a* and the front edge of this note projects between feeding roller 14*a* and reverse gate roller 16*a.* Such partial note projection can cause a malfunction in the next note dispensing operation if the projecting note is not correctly returned. To solve this note projection problem, backing-up plate 38 is allowed to descend in the state where the conveyor belt is continuously driven, even when feeding motor M6 (M8) is stopped after the predetermined number of notes were sent out. This way, when the note bundle has loosened, the projecting note is pulled back and returned to the storing pocket by reverse roller 16*a.* To eliminate the partial note projection, backing-up plate 38 and press plate 39 simultaneously start descending. However, since press plate 39 is located backward from the feeding roller surface by an amount of only $\alpha$, when backing-up plate 38 descends by the amount of only $\alpha$, looseness occurs in the note bundle by the amount of only $\alpha$. The partial note projection is eliminated by this looseness and the projecting note, namely, the one situated at the highest position is returned to its proper position via the descent of press plate 39.

As shown in FIG. 20D, backing-up plate 38 and press plate 39 descend via the forward rotation of motor M7 (M9) and when they descend to the pressing positions, switch SW14 (SW19) is turned on. Motor M7 (M9) is stopped in response to the detection of the pressing positions, and the descent of plates 38 and 39 is stopped. At the same time, solenoids S10 and S11 (S13, S14) are turned off and the holding claws are returned to the storing pocket (FIG. 20E). Motor M7 (M9) is again reversely rotated and plates 38 and 39 are elevated (FIG. 20F). When the stored note collides with the holding claws, backing-up plate 38 stops. When press plate 39 ascends to the guide position, switch SW13 (SW18) is turned on. Thus, motor M7 (M9), to elevate backing-up plate 38 and press plate 39, is stopped. In this manner, the note dispensing operation is completed.

In the above note dispensing operation, the stored note, pressed by backing-up plate 38, pushes plate 38 down slightly to reduce the pressure between the individual notes, and thereafter, the holding claws are removed from the stored note. Thus, the note is not damaged and it is also possible to reduce the magnetic force of the solenoid necessary for the removement of the holding claws from the notes. By continuously rotating motor M11 clockwise during the note fetching operation, the backing-up plate gradually ascends via the force of spring 46, in association with the feeding of the note. Therefore, the note can be stably fed without the detection of the pressure and complicated control. Further, even after the rotation of only the feeding roller has also stopped, looseness occurs in the pressed note bundle during the interval when the conveyance path is continuously driven and the reverse roller is continuously rotated. Thereafter, by depressing the note downwardly, with the press plate, partial note projection is corrected and the note is stored in the pocket. Further, after the press plate is pushed down by the holding claws, it is returned, so that the storing space for the next note deposited can be definitely formed.

Figure 18A:
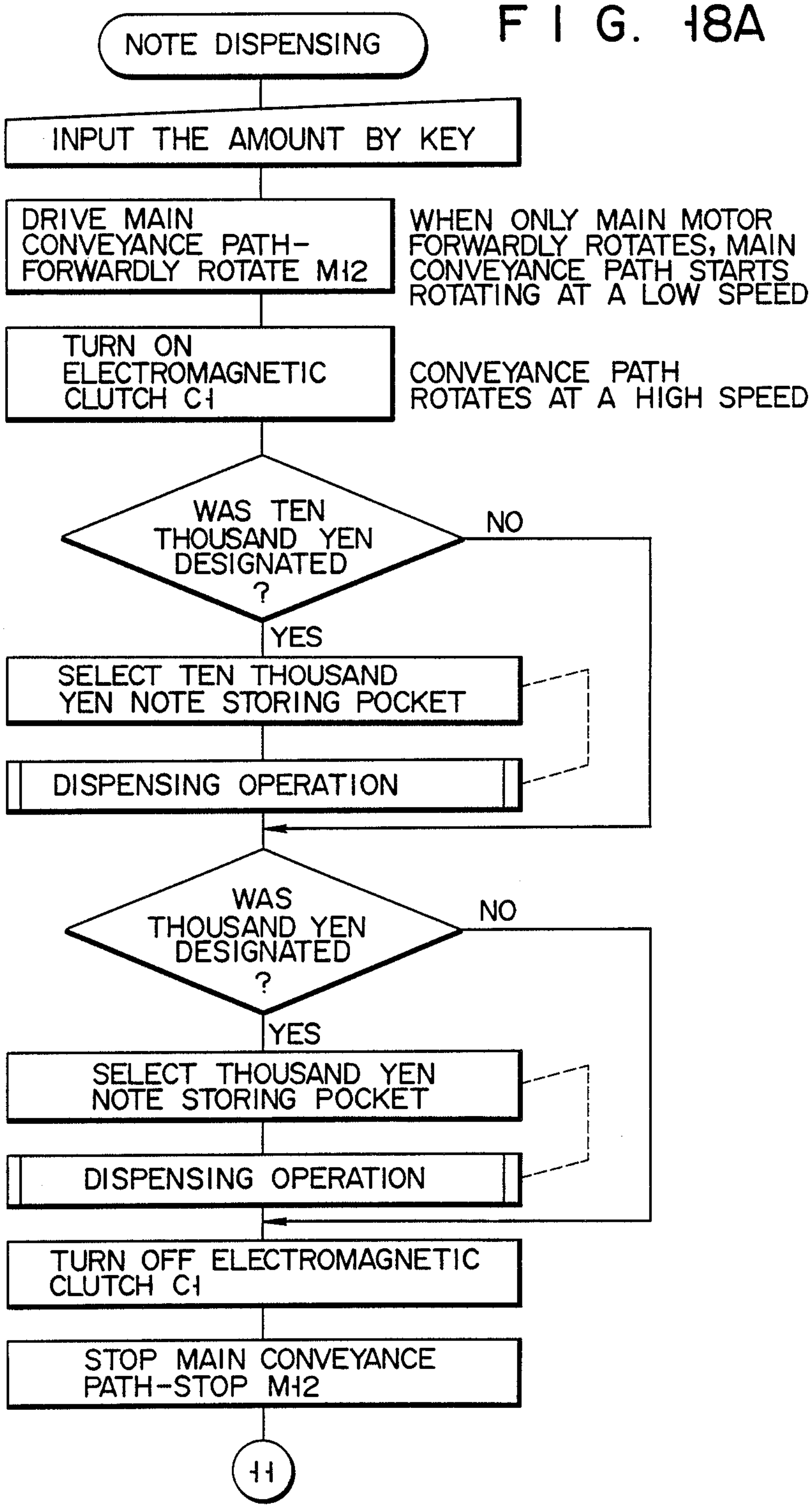
FIGS. 18A to 18C are flowcharts of the dispensing mode.
Figure 18B:
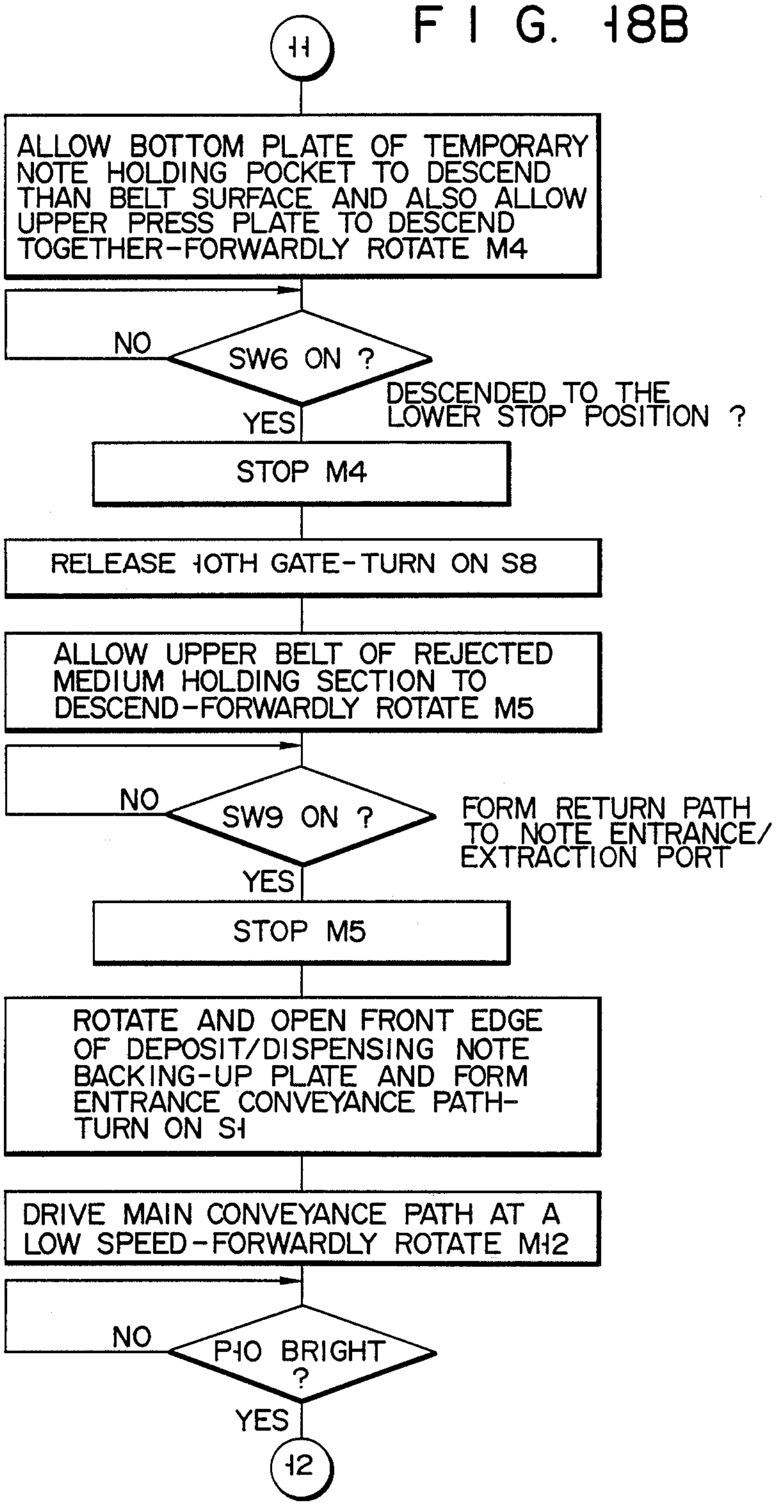
Figure 18C:
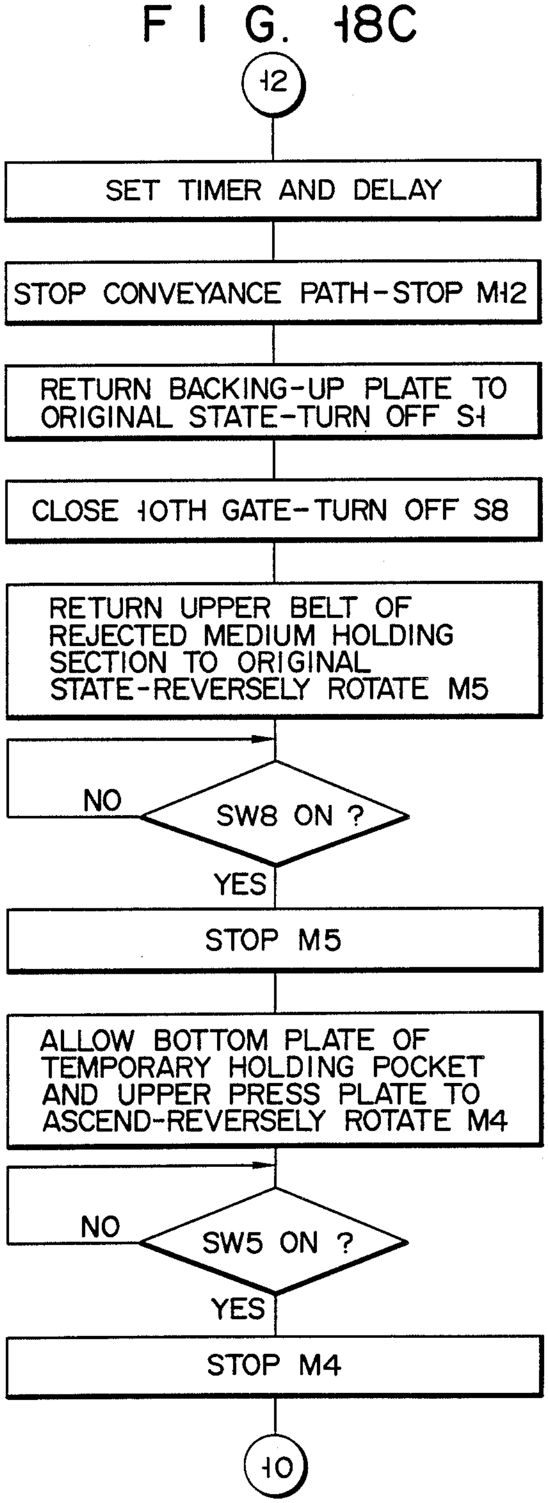

Upon completion of the note dispensing operation, electromagnetic clutch C1 is turned off and main motor M12 is also turned off, so that the main conveyance path stops. Thereafter, as shown in the flow of FIG. 18B, motor M4 is forwardly rotated and bottom plate 30 of temporary holding section 23 descends downward of the conveyor belt and at the same time, upper press plate 29 also descends. When bottom plate 30 and upper press plate 29 descend to their lower stop positions, switch SW6 is turned on and motor M4 is stopped. At this time, solenoid S8 is turned on and gate G10 is opened. Motor M5 is forwardly rotated and upper belt 24*a,* of rejected medium holding section 24, descends. When upper belt 24*a* reaches its lower stop position and switch SW9 is turned on, motor M5 stops. Solenoid S1 is turned on and the front edge of backing-up plate 17 rotates to open. In this state, when motor M12 is driven and the main conveyance path runs at a low speed, the note bundle in temporary holding section 23 is collectively conveyed and enters hopper 13 through rejected medium holding section 24. The conveyance steps in this case are shown in FIGS. 8A to 8D and 9A to 9C.

When photosensor P10, which detects any remaining notes in the temporary holding section, detects the "bright" state, i.e., the absence of any remaining note, motor M12 is stopped after the elapse of a period of time set by the timer, following the detection. In response to the stopping of motor M12, the main conveyance path stops running. Thereafter, solenoid S1 is turned off to return backing-up plate 17. Further, solenoid S8 is also turned off to close gate G10. In addition, motor M5 is reversely rotated to return upper belt 24*a,* of rejected medium holding section 24, to its original position. When upper belt 24*a* reaches its return position and switch SW8 is turned on, motor M5 stops. Similarly, motor M4 is reversely rotated to elevate bottom plate 30 of temporary holding section 23, together with upper press plate 29, to the return position. When bottom plate 30 and upper press plate 29 are detected by switch SW5, which detects the upper stop position, motor M5 stops. Thereafter, the processing routine is returned to the flow of FIG. 10J and the customer can remove the notes from hopper 13, and at the same time, the apparatus returns to the initial state.

Figure 21:
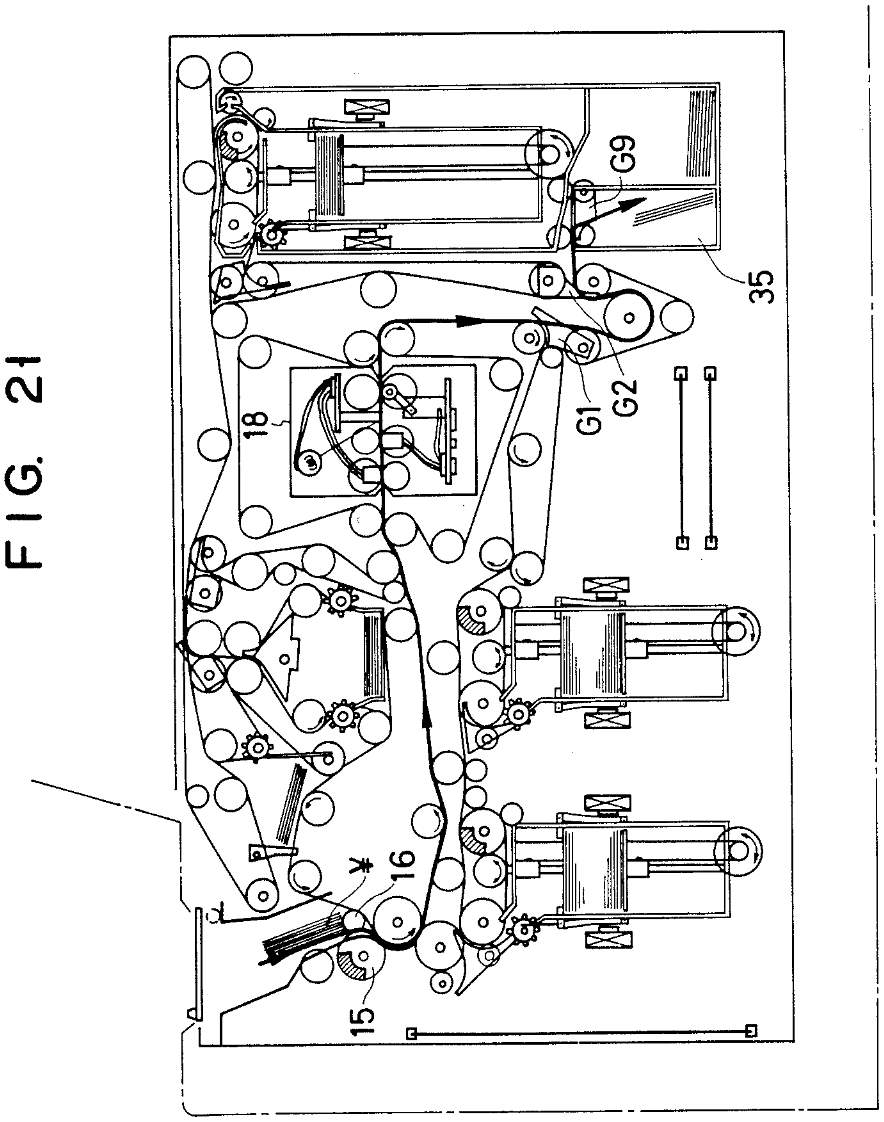
FIG. 21 is a schematic structural diagram of the transaction apparatus, showing the flow of the note in the collecting operation.

FIG. 21 shows the recovery route of a note which the customer forgot to take out; namely, the case where although the customer performs the note dispensing operation, he forgets to take out the dispensed note. Therefore, it is necessary to recover the note which the customer forgot to take out. In this recovery operation, if a note remains in deposit/dispensable note hopper 13 a predetermined period of time after note entrance/extraction door 12 has been opened, (to enable the dispensed note to be taken out), any note in hopper 13, which the customer forgot to take out, is conveyed into recovery pocket 35 by the main conveyance path. At this time, although the note passes through note discriminating section 18, it will be conveyed directly into recovery pocket 35 without being checked in note discriminating section 18. The amount of recovered notes is recorded, together with the account number or the like of the customer who forgot to take out the dispensed note, and used for future inquiry.

Figure 22:
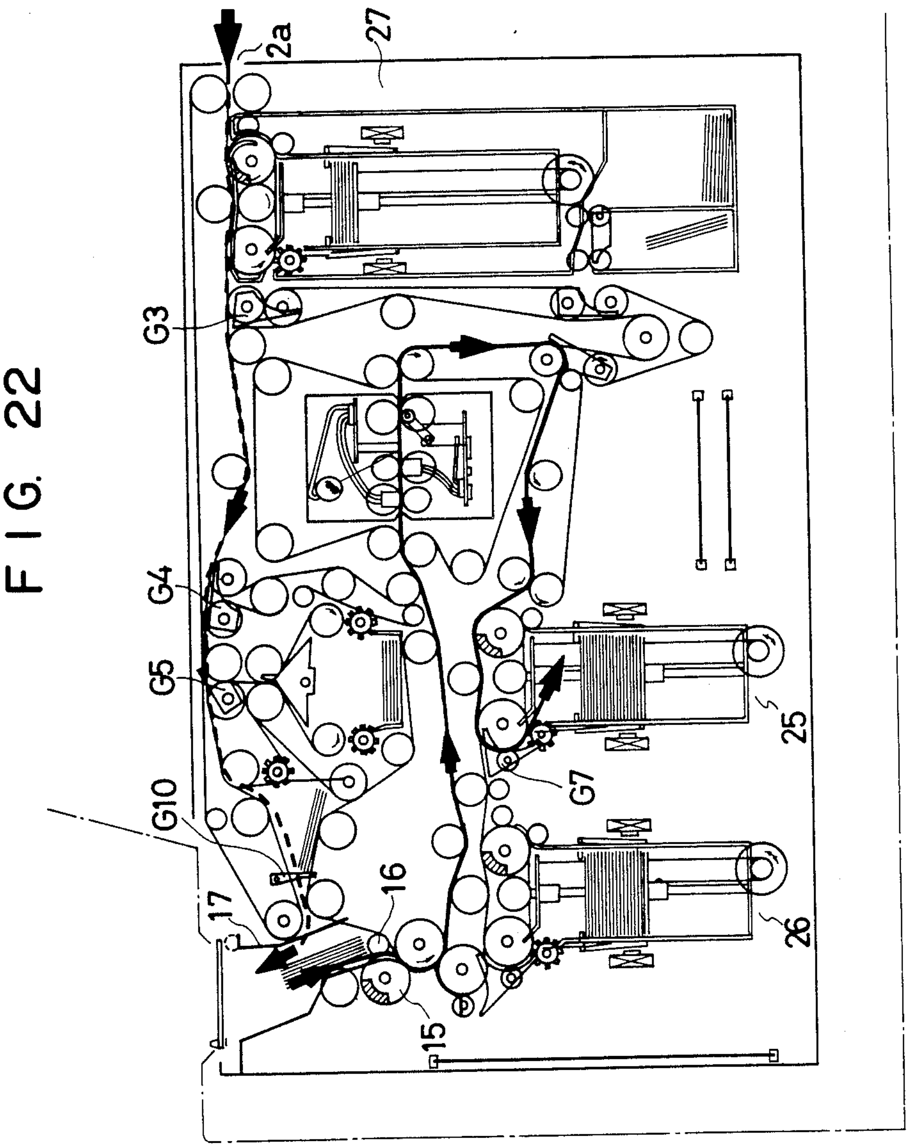
FIG. 22 is a schematic structural diagram of the transaction apparatus, showing the flow of the note in the external supplement mode.

The operation of the external supply route shown in FIG. 22 will now be described with reference to flowcharts of FIGS. 24A to 24F. In the case of supplying notes from outside, the rear door of ATM 1 is opened and keyboards 5*c* and 5*d* of internal monitor 5, shown in FIG. 6, are operated. First, a check is made to see if group-to-single exchanging switch 5*f* is in the single mode or not. If YES, the mode switching (exchanging between the ordinary transaction mode and the clerk operation mode) key of keyboard 5c has been pressed. The clerk operation mode lamp of display panel 5a lights up. Next, the supply key is pressed and thereafter the ten thousand yen note key or thousand yen note key is pressed to designate the denomination. The Number of Notes key is pressed and the number of supply notes is inputted by ten-key 5d. This number is displayed on segment display panel 5b. When the denomination and the number of supply notes are correct, the acknowledge key is pressed. At this time, a check is made to see if the storing pocket of the designated denomination is full or not. If it is full, all input data is cleared and the processing routine is returned to the supply key depression flow. If it is not full, a check is made to see if the number of supply notes lies above the minimum quantity per one supply (e.g., 100 notes), or not. If it is less than the minimum quantity, the supply pinch roller is opened. If it is above the minimum quantity, all input data is cleared and the processing routine is returned to the supply key depression flow. When the supply pinch roller is opened, a bundle of one hundred notes can be inserted. This insertion is detected by photosensor P14 and in response to the detection signal, gate G10 is opened by energizing solenoid S8.

Figure 24A:
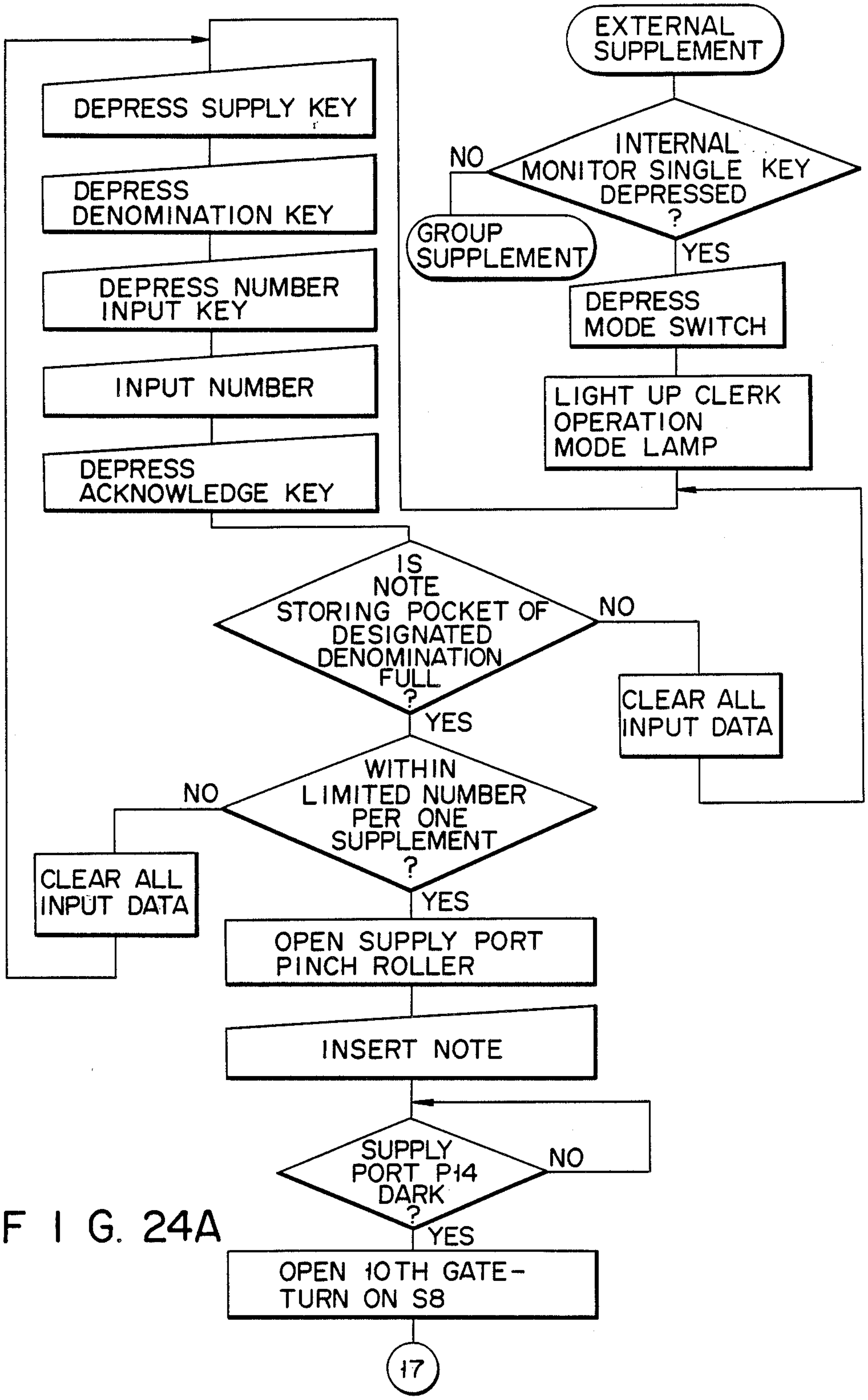
FIGS. 24A to 24F are flowcharts of the external supplement mode.
Figure 24B:
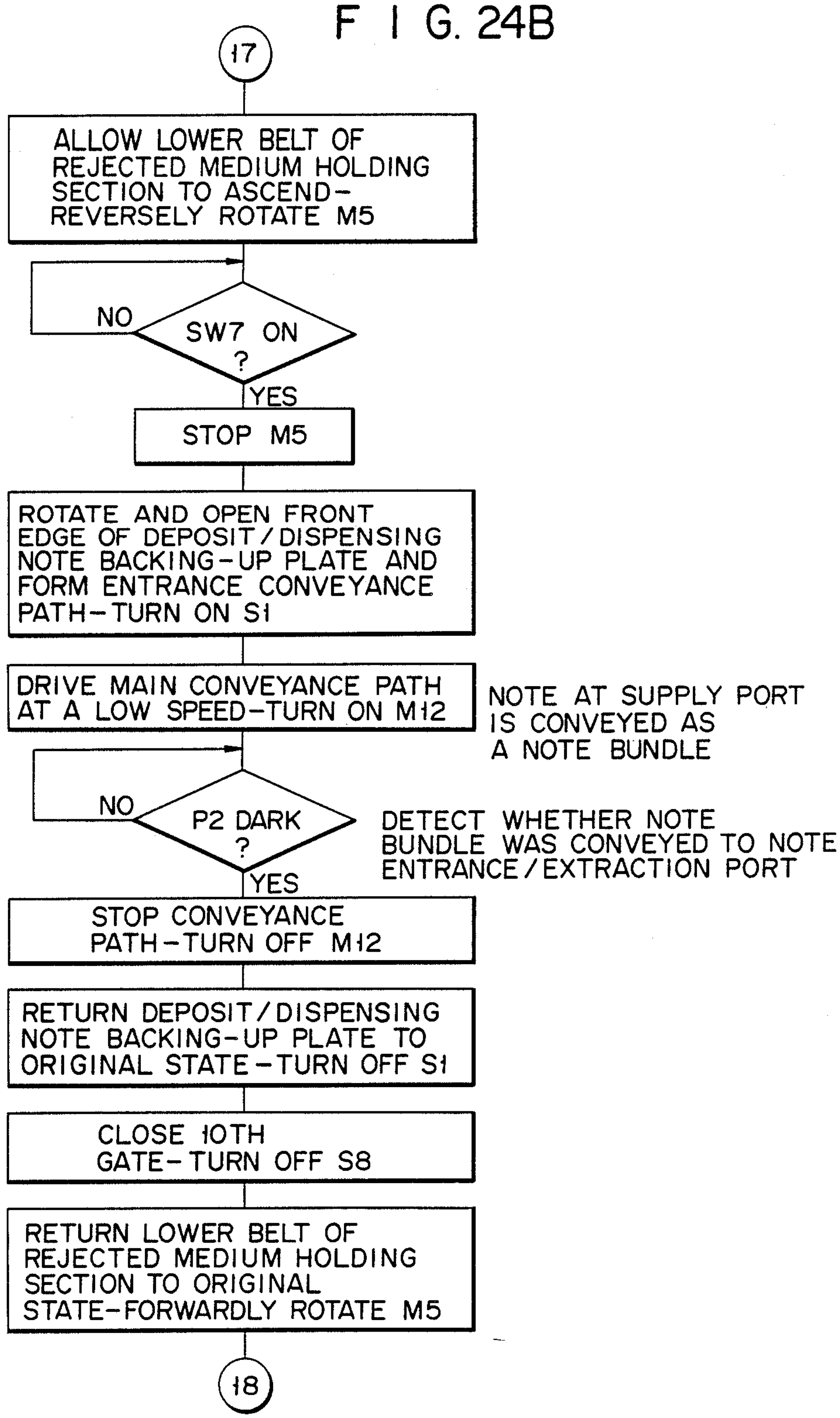

Next, as shown in the flow of FIG. 24B, motor M5 is reversely rotated to elevate lower belt 24a of rejected medium holding section 24. When detector SW7, for detecting the upper stop positions of the upper and lower belts, is turned on, motor M5 stops. Solenoid S1 is turned on to form the entrance of the conveyance path, by rotating and opening the front edge of backing-up plate 17 of hopper 13. Motor M12 is turned on and the main conveyance path is driven at a low speed.

Figure 23:
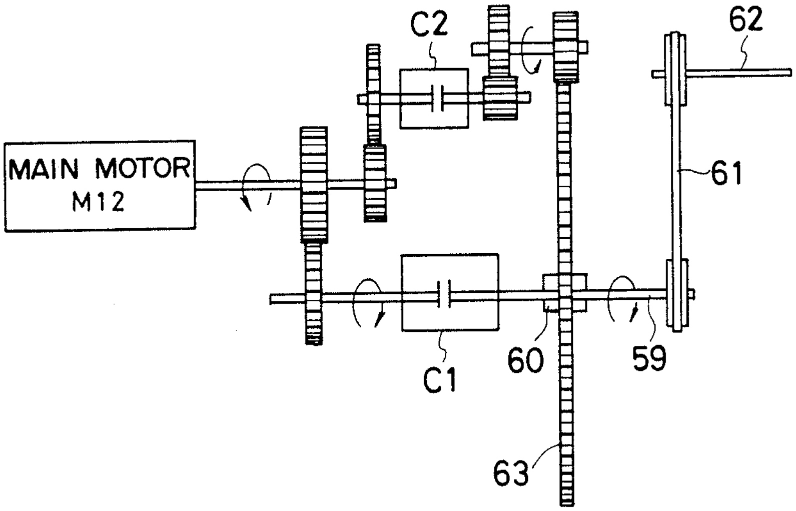
FIG. 23 is a diagram of a drive mechanism of a main conveyance path.

The above low speed drive will now be described on the basis of the switching mechanism of FIG. 23. When electromagnetic clutch C1 is turned off and electromagnetic clutch C2 is turned on, while main motor M12 is forwardly rotating, the rotational force of motor M12 is transferred to a reduction gear 63 through the gear and clutch C2 on the upper side in the diagram. The rotational force of reduction gear 63 is directly transferred to an output shaft 59, and rotates a conveyance drive shaft 62 through a belt 61. In this case, the rotational speed of motor M12 is reduced by three stages of gearing, so that conveyance drive shaft 62 rotates at about 1/10 of the rotational speed of motor M12. The conveyor belt is driven at a low speed via the low speed rotation of drive shaft 62. The note bundle is conveyed by this low speed drive.

When electromagnetic clutch C1 is turned on and electromagnetic clutch C2 is turned off by the forward rotation of motor M12, the rotational force of motor M12 is substantially directly transferred to output shaft 59 through the gear and clutch C1 on the lower side in the diagram. Thus, output shaft 59 and conveyance drive shaft 62 both rotate at a high speed; i.e., the main conveyor belt runs at a high speed. In this case, the notes are conveyed one by one.

When the note bundle, (which is conveyed at a low speed along the main conveyance path) enters hopper 13 through gates G3 to G6, rejected medium holding section 24, gate G10, and backing-up plate 17, and is stored in hopper 13, photosensor P2 detects the note bundle. In response to this detection, motor M12 is turned off and the main conveyance path stops running. Thereafter, since solenoids S1 and S8 are turned off, backing-up plate 17 is returned to its original position and gate G10 is closed. Further, motor M5 is forwardly rotated and lower belt 24b, of rejected medium holding section 24, is returned to its original position. When middle stop position detector SW8 is turned on, motor M5 stops. Next, clutch C1 and motor M12 are turned on and the main conveyance path is driven at a high speed. Motor M2 is forwardly rotated to push down backing-up plate 17 of hopper 13. By forwardly rotating motor M3 in this manner, the notes are conveyed one by one to the main conveyance path. At this time, if the apparatus is not in the discriminating mode (to discriminate the supply note), solenoid S2 is turned on and gate G1 is rotated to the right to form the paths to thousand yen note storing pocket 26, and ten thousand yen note storing pocket 25. In this case, since the ten thousand yen note has been designated, as mentioned above, solenoid S9 is turned on to switch gate G7 to the left. At this time, solenoid S12 is turned off and gate G8 is switched to the right, so as not to form a path to thousand yen note storing pocket 26. Any ten thousand yen note conveyed is sequentially stored in ten thousand yen note storing pocket 25. When photosensor P2 detects the "bright" state, i.e., the absence of any remaining note, the processing routine advances to the flow of FIG. 24D and motor M2 is reversely rotated to elevate backing-up plate 17 of hopper 13. When switch SW4 is turned on, motor M2 stops. When switch SW4 detects the stop position, motor M3 is turned off to stop the fetching of notes. Clutch C1 is then turned off and main motor M12 stops. At this time, the conveyance of the supply notes into storing pocket 25 is finished and the number of supply notes, i.e., the denomination designation input number is added to the number of remaining notes in the designated storing pocket (ten thousand yen note storing pocket 25). The total number is then stored in memory. Thereafter, the storing operation shown in the flow of FIG. 12 is executed. After completion of the storing operation, the mode switching button of keyboard 5c, of internal monitor 5 shown in FIG. 5, is pressed, so that the apparatus is returned to the ordinary transaction mode. This mode return can be confirmed by the lighting up of the LED corresponding to the ordinary transaction mode of display panel 5a.

Figure 24C:
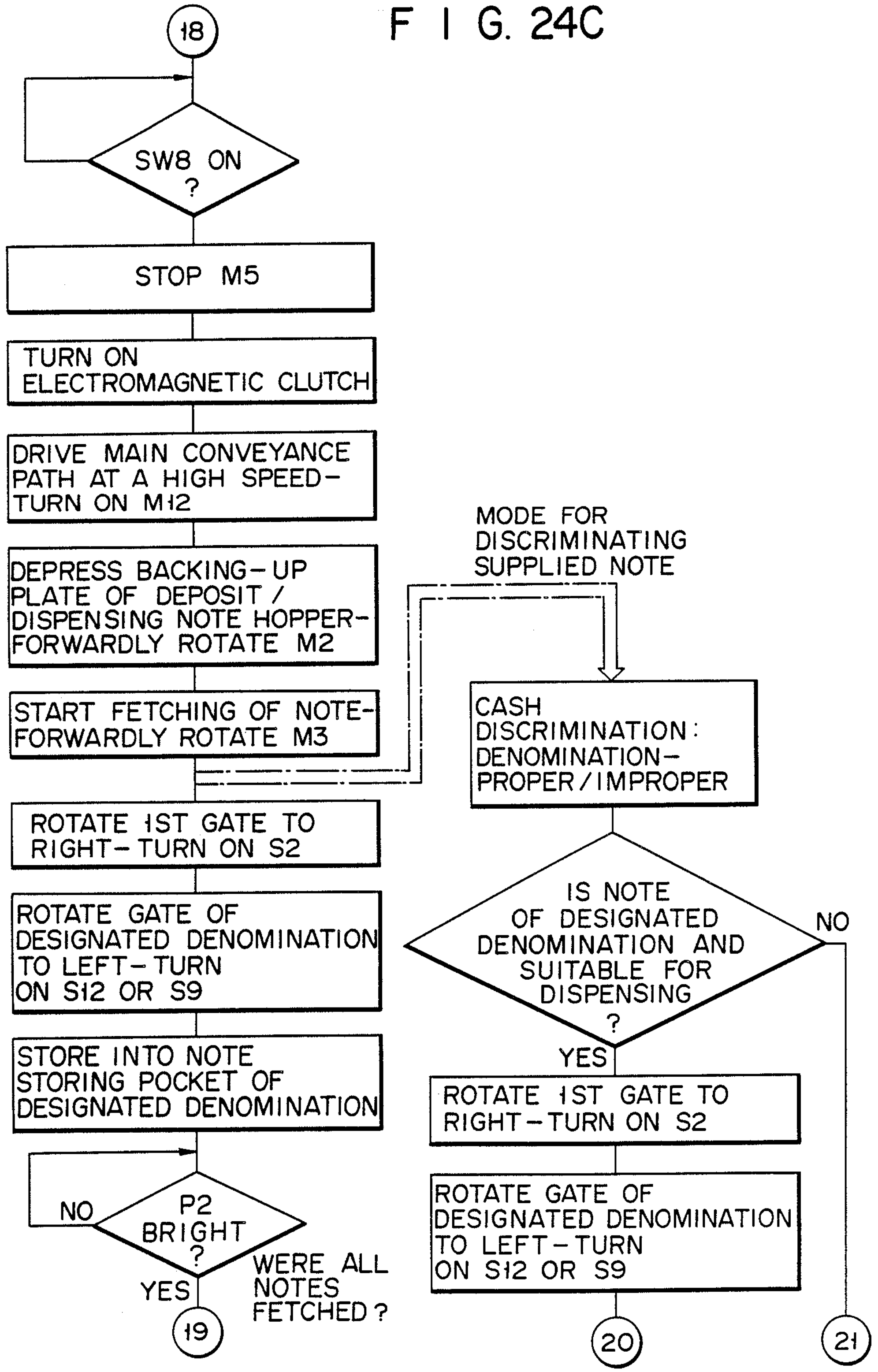
Figure 24D:
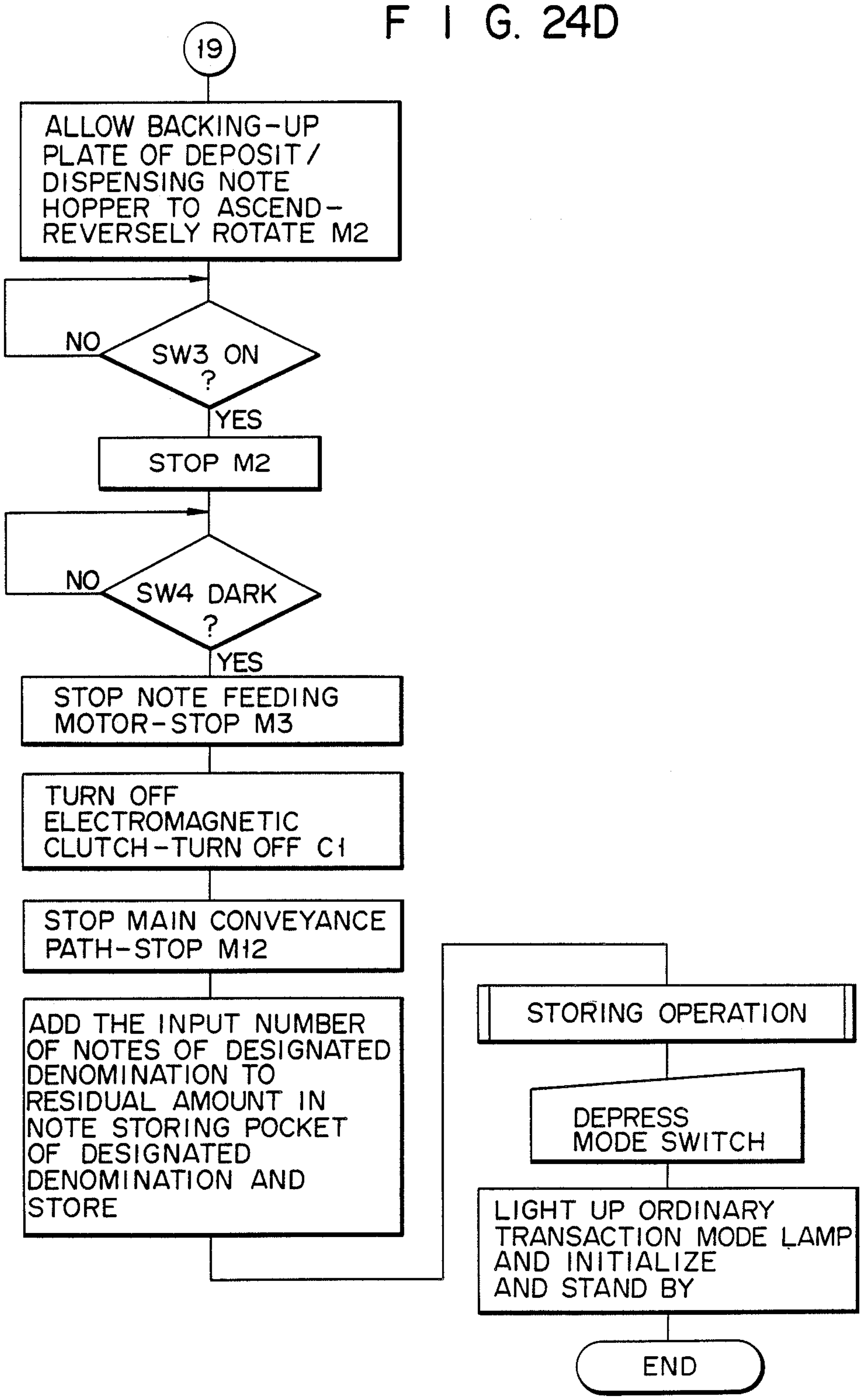
Figure 24E:
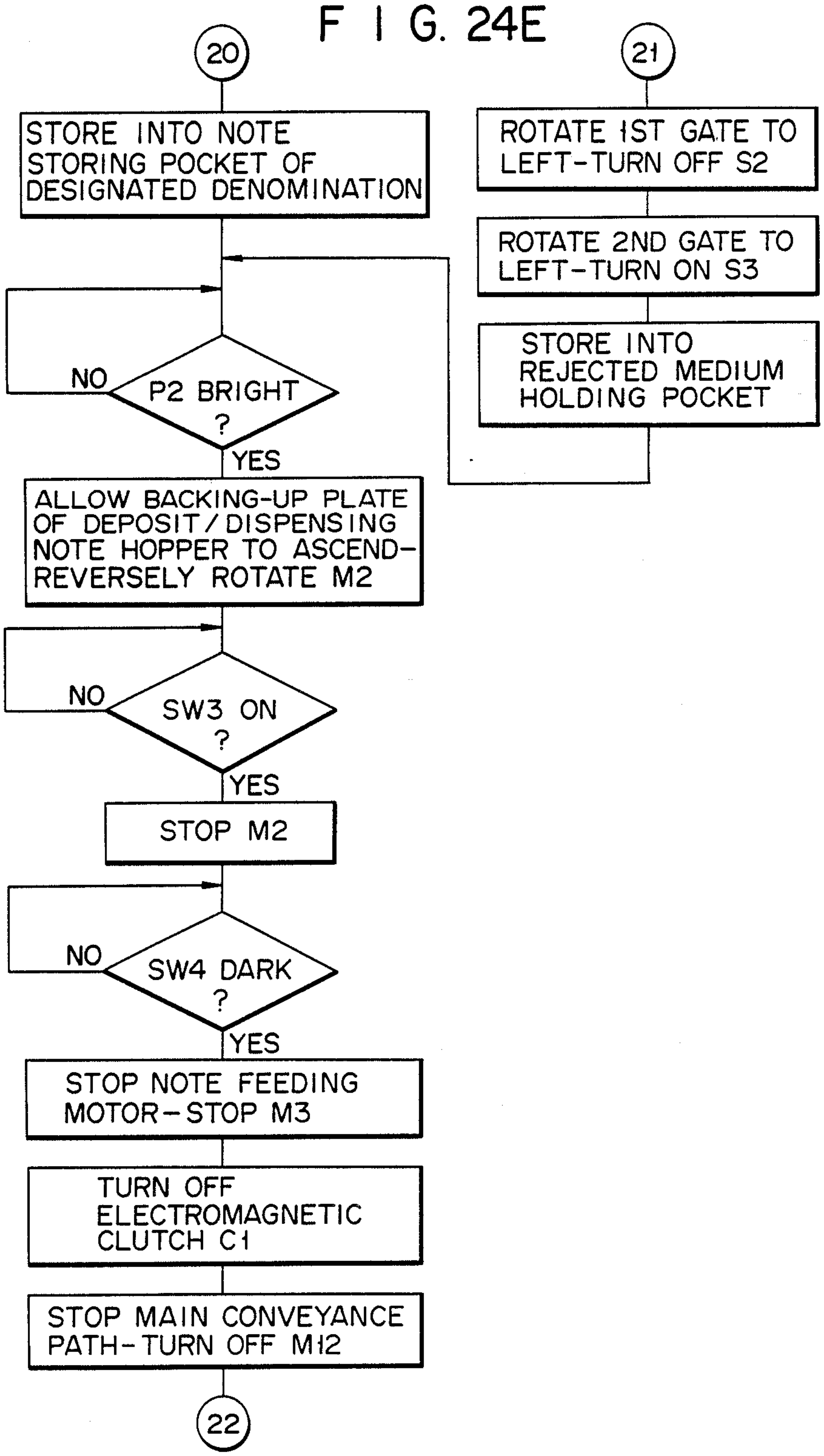
Figure 24F:
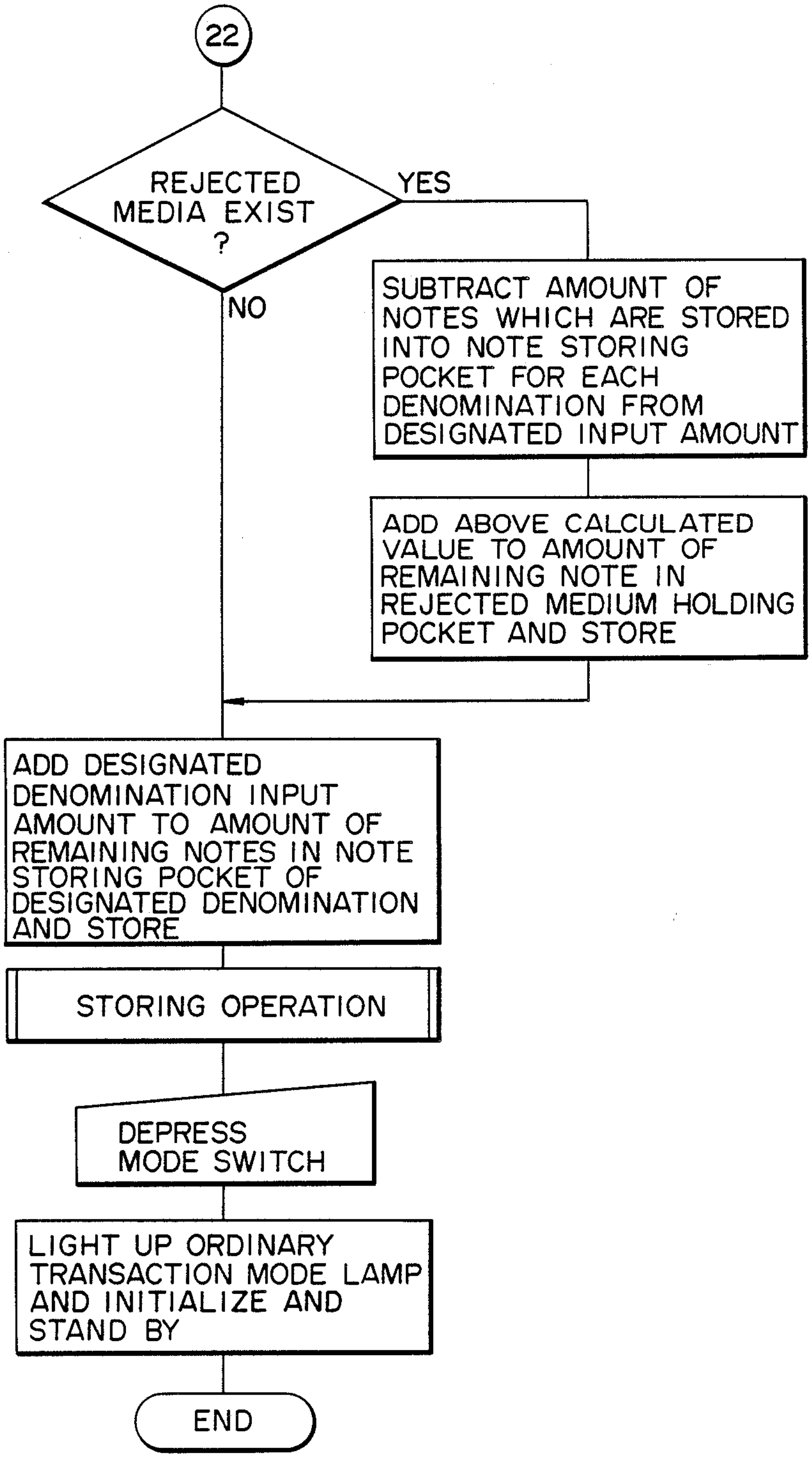
Figure 25:
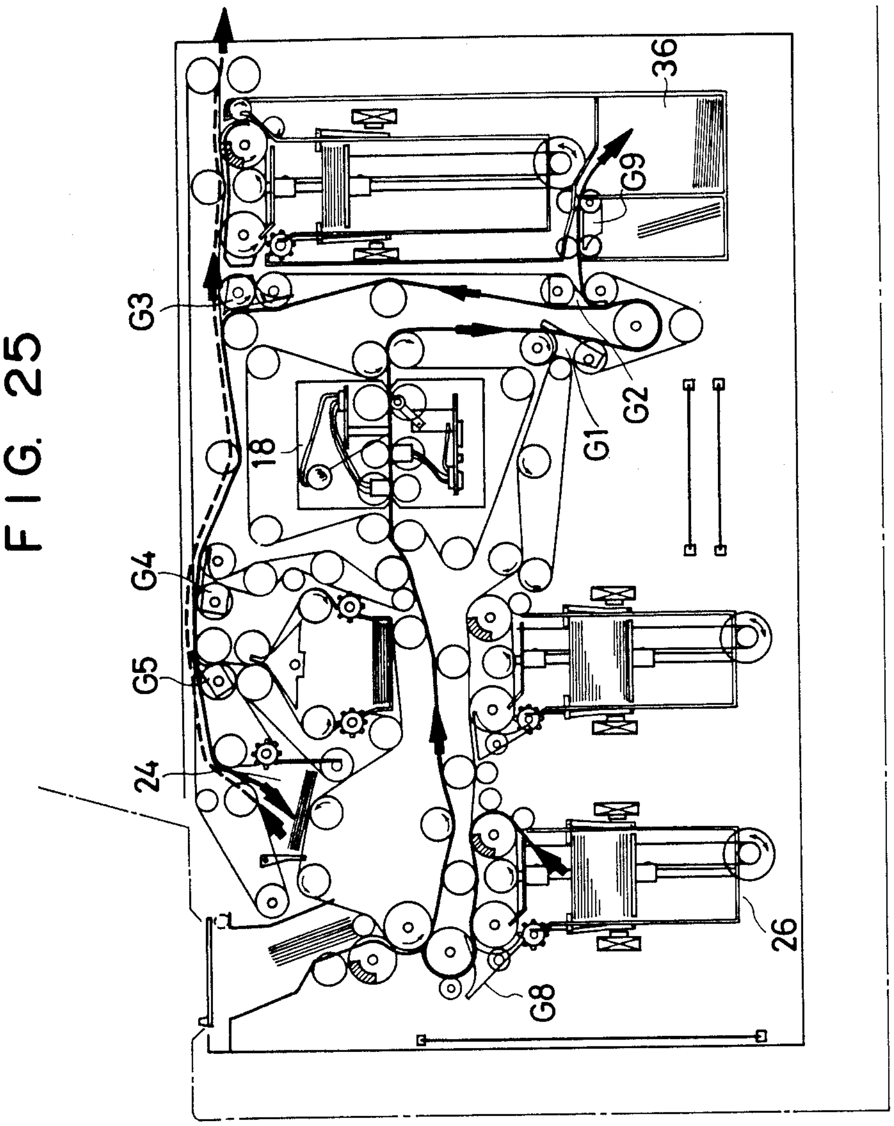
FIG. 25 is a schematic structural diagram of the transaction apparatus, showing the flow of the note in the partial sucking-up mode.
Figure 26A:
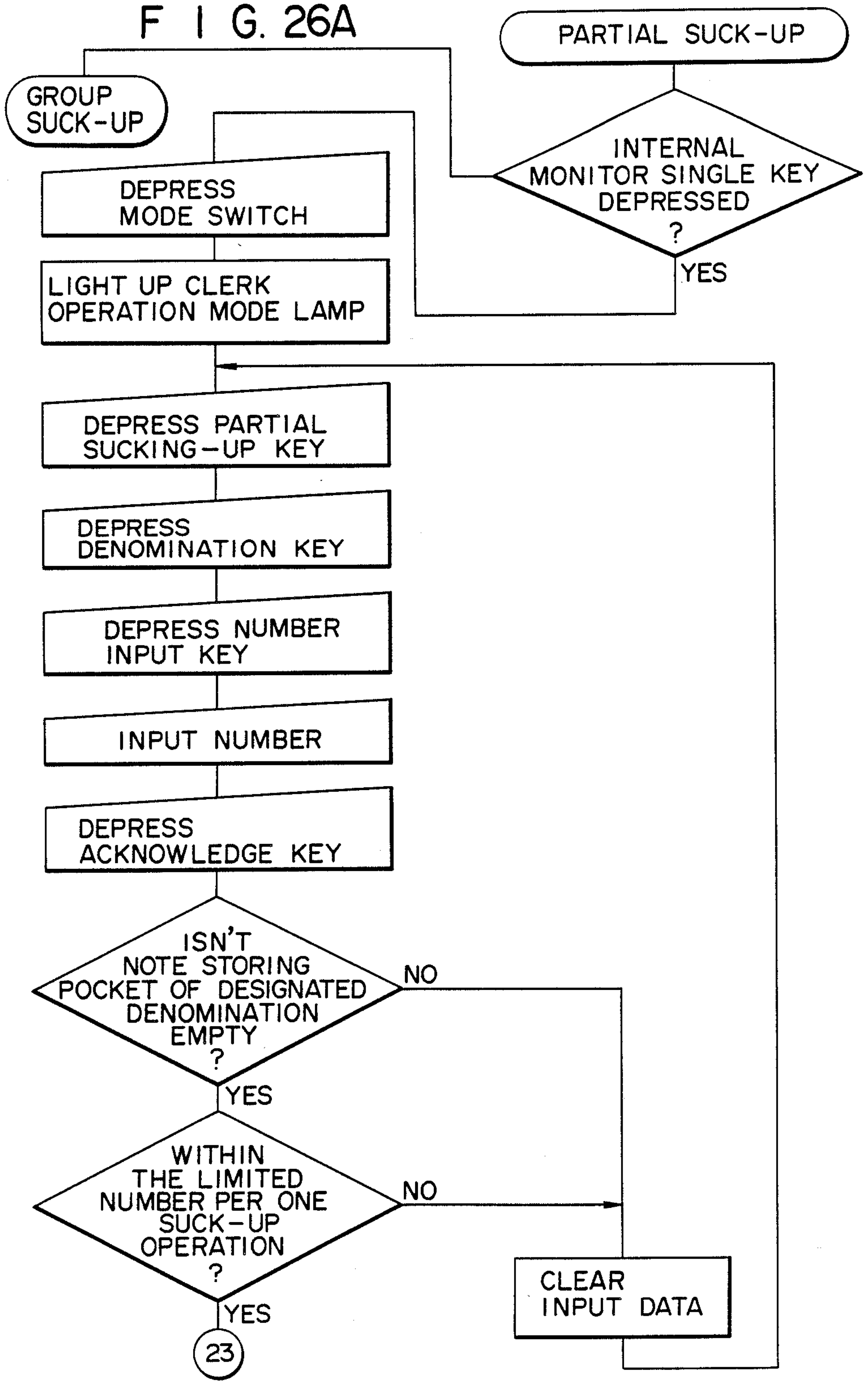
FIGS. 26A to 26F are flowcharts of the partial sucking-up mode.
Figure 26B:
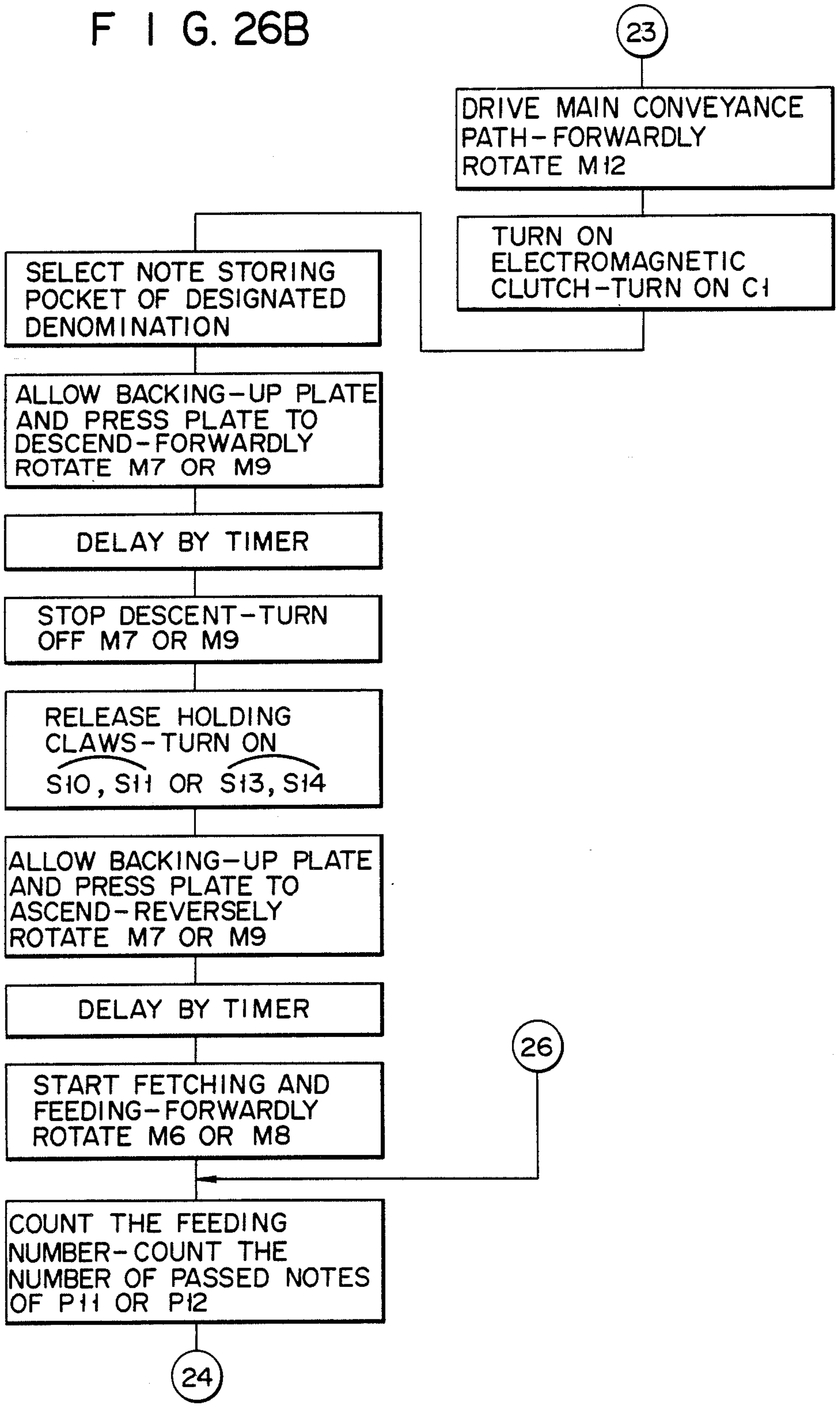
Figure 26C:
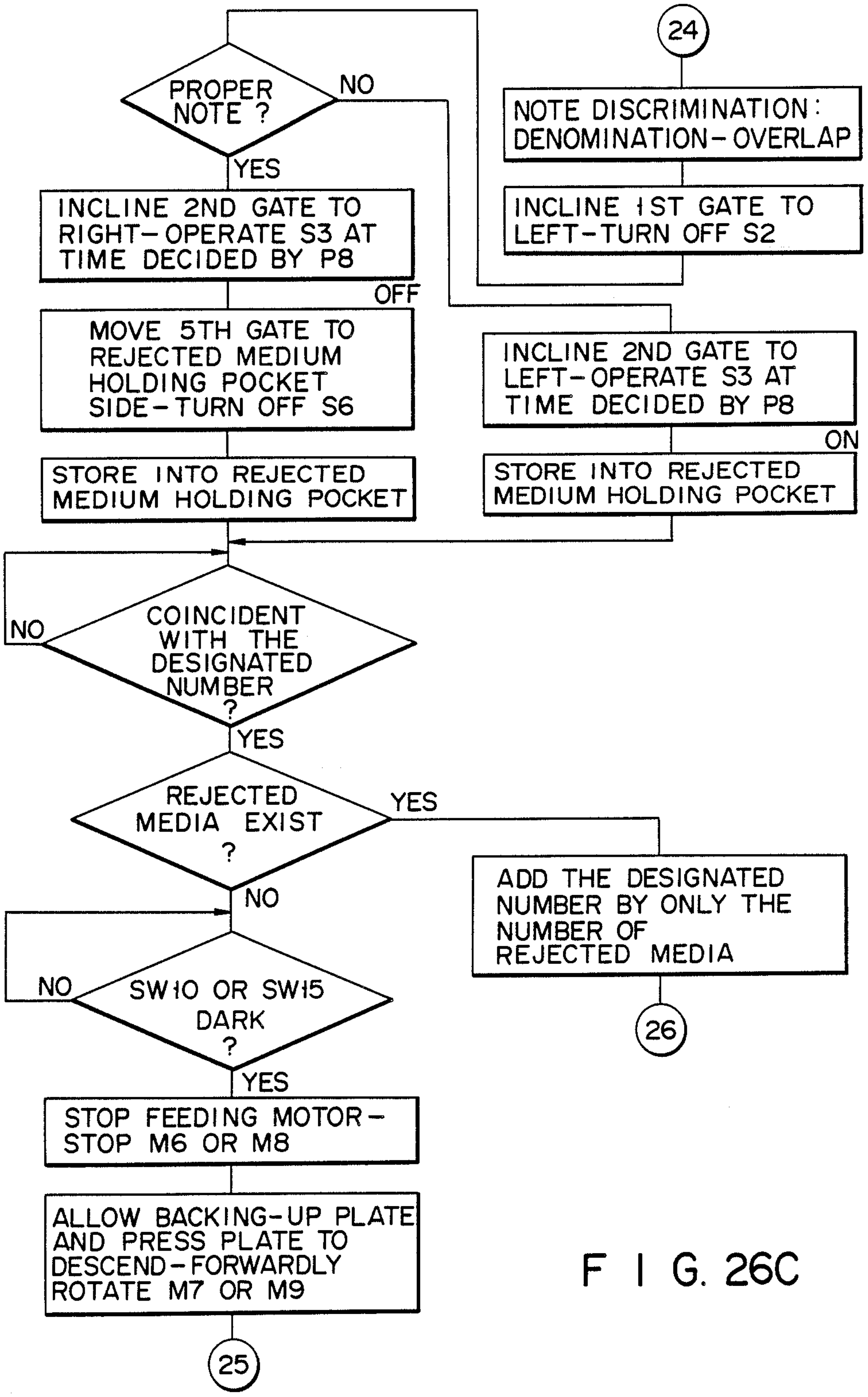
Figure 26D:
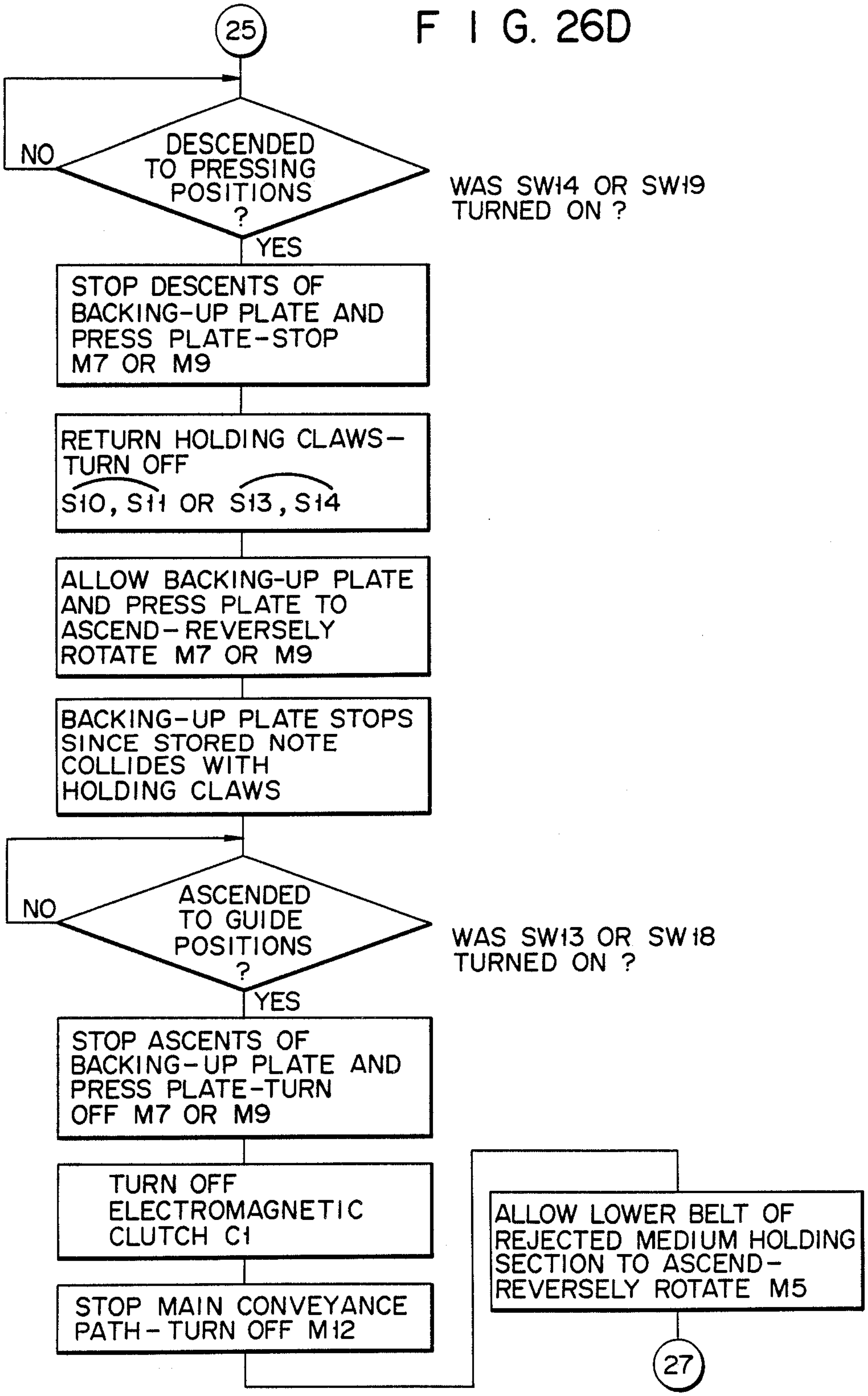
Figure 26E:
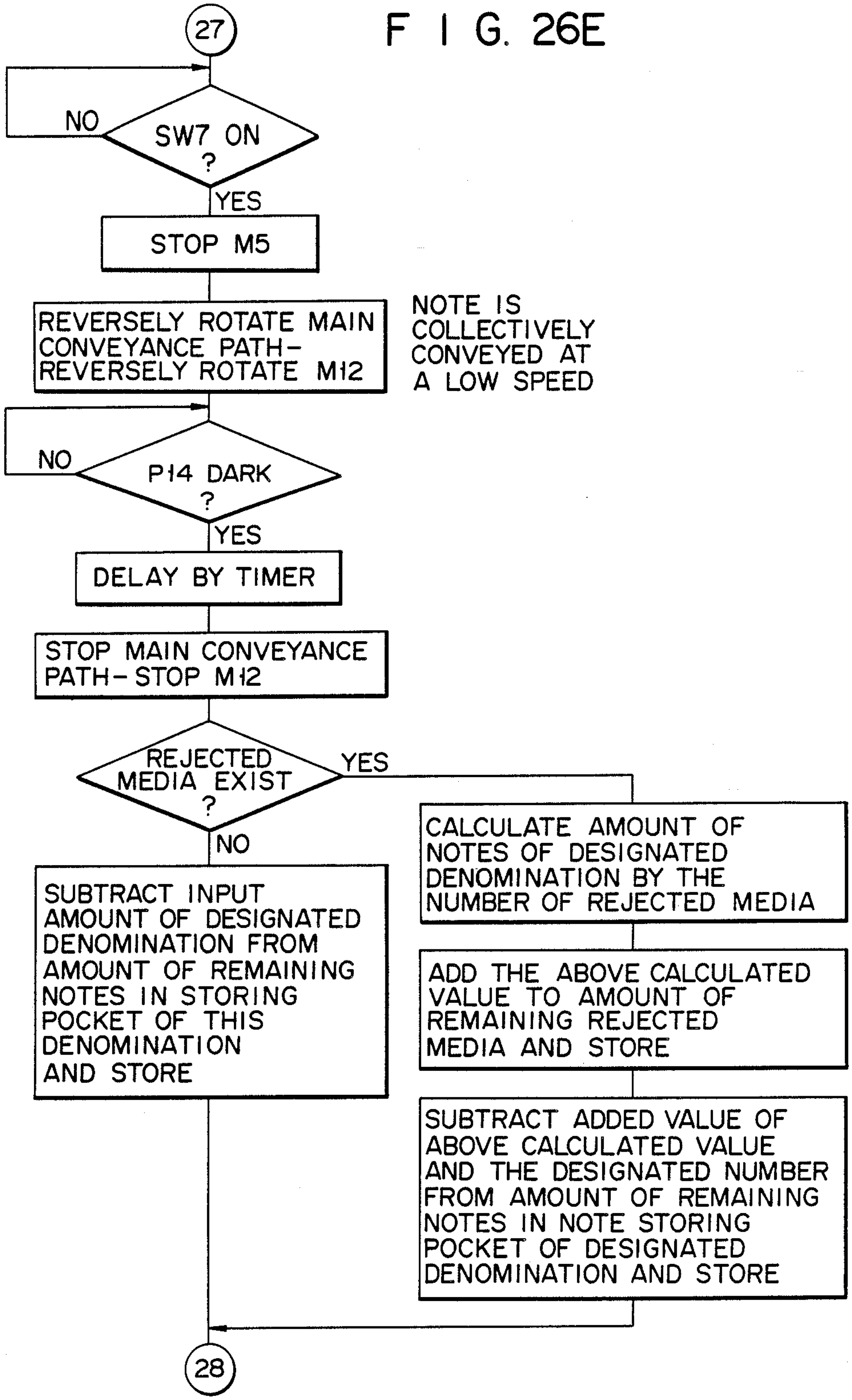
Figure 26F:
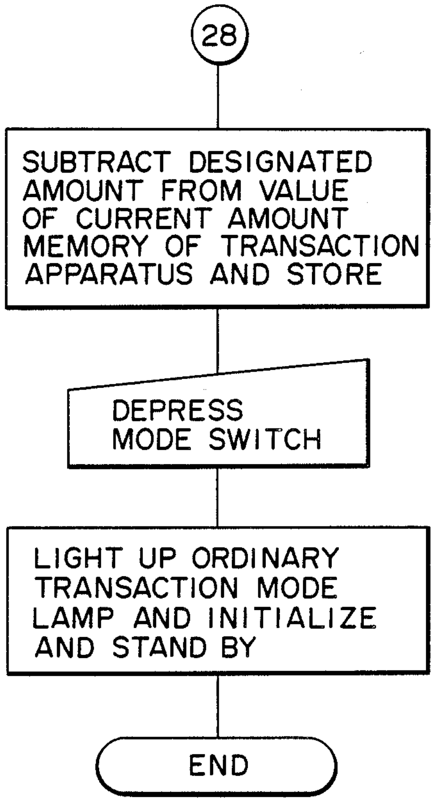

In the case of discriminating the supply note in the flow of FIG. 24C, the supply note is discriminated by note discriminating section 18. If it is determined that the supply note is of the designated denomination and is suitable for dispensing and acknowledged to be so, on the basis of the discrimination, solenoid S2 is turned on and gate G1 is rotated to the right to form the paths to thousand yen note storing pocket 26 and ten thousand yen note storing pocket 25. In this case, since the ten thousand yen has been designated, as mentioned above, solenoid S9 is turned on to switch gate G7 to the left. At this time, solenoid S12 is turned off and gate G8 is switched to the right so as not to form the path to thousand yen note storing pocket 26. Thereafter, as shown in FIG. 24E, any ten thousand yen note conveyed is sequentially stored into ten thousand yen note storing pocket 25.

If any note which was not acknowledged in the discrimination of the supply note is present, solenoid S1 is turned off and gate G1 is rotated to the left to form the path into rejected medium holding section 36. Further, solenoid S3 is turned on and gate G2 is rotated to the left. Thus, the rejected medium is stored in rejected medium holding section 36.

After all of the supply notes in hopper 13 are extracted, and photosensor P2 detects the "bright" state, motor M2 is reversely rotated to elevate backing-up plate 17 of hopper 13. When switch SW3 is turned on, motor M2 stops. When switch SW4 detects the stop position, motor, M3 turns off to stop the fetching of notes. Clutch C1 is turned off and main motor M12 stops. The processing routine advances to the flow of FIG. 24F and a check is made to see if any rejected media are present or not. If no rejected medium is present, the amount of notes stored in ten thousand yen note storing pocket 25 is subtracted from the designated input amount. The result of this subtraction is added to the amount of remaining notes in the rejected medium holding section. Then, the designated denomination input amount is added to the amount of remaining notes in the designated storing pocket (ten thousand yen note storing pocket 25) and the added value is stored in the memory. If no rejected medium is present, the designated denomination input amount is directly added to the amount of notes remaining in the designated storing pocket (ten thousand yen note storing pocket 25) and the added value is stored in memory. Thereafter, the storing operations shown in the flows of FIGS. 11A to 11J are executed. After completion of the storing operations, the mode switching button of keyboard 5c, of internal monitor 5 in FIG. 5, is pressed and the apparatus is returned to the ordinary transaction mode. This mode return can be confirmed by the lighting up of the lamp corresponding to the ordinary transaction mode of display panel 5a.

In the foregoing note supply from outside, there are two cases where the supply note is discriminated and where it is not discriminated. This point will now be described. In the case where the supply note is not discriminated, for example, in the conventional note dispenser unit, the sealed note bundle is pulled out on a hundred unit basis by the cashier and the clerk who handles the deposit processes the hundred sheets of sealed note bundle as they are, without checking them. This is because the clerk is confident that the sealed note bundle is absolutely correct. There is no need to check the note bundle when adopting an attitude similar to this. In contrast, when discriminating supply notes, the process which relies on the work of a human being is executed in a manner such that only the notes determined to be proper (i.e., authorized), (by being positively recognized by the ATM) can be accepted, and thereby any mistakes are completely eliminated.

The above-mentioned idea of the note supply is based on the experience that when a single ATM is used in the recycle mode, it has been found that the thousand yen note storing pocket frequently becomes empty but rarely becomes full; therefore, a simple supply port is provided and enables the note supply to be supplemented when the number of thousand yen notes drops. Accordingly, in the next embodiment, an explanation will be made with respect to the function, such as in the case where local supply/demand imbalances occur among a plurality of ATMs, with respect to the season, time, and location, the note is sucked up from the relatively full ATM, on a hundred unit basis, and supplied to another ATM. This embodiment will be described with reference to FIGS. 25 and 26A to 26F.

Such a partial sucking-up operation mode is designated by internal monitor 5 as well; i.e., a check is made to see if exchanging switch 5f has been switched to the single mode or not. If YES, the mode switching key (to switch between the ordinary transaction mode and the clerk operation mode) of keyboard 5c is pressed. The lamp corresponding to the clerk operation mode of display panel 5a is lit up. Next, the partial sucking-up key is pressed and thereafter, the denomination is designated by pressing the ten thousand yen key or thousand yen key. By pressing the Number of Notes input key, the number of notes sucked up is inputted by ten-key 5d. This number is displayed on segment display panel 5b. If the denomination and number of notes are correct, the acknowledgment key is pressed. At this time, a check is made to see if the note storing pocket of the designated denomination is empty or not. If it is empty, all input data is cleared and the processing routine is returned to the depression flow of the partial sucking-up key. If NO, a check is made to see if the number of notes lies within the minimum quantity (e.g., 100) per sucking-operation or not. If NO, all input data is cleared and the processing routine is returned to the depression flow of the partial sucking-up key. If YES, motor M12 is forwardly rotated and the main conveyance path is driven. Electromagnetic clutch C1 is turned on and the main conveyance path is driven at a high speed. The storing pocket of the designated denomination, for example, thousand yen note storing pocket 26 (or ten thousand yen note storing pocket 25) is selected. Motor M7 (M9) is forwardly rotated for only the period of time set by the timer to allow backing-up plate 38 and press plate 39 of storing pocket 26 to slightly descend. After the elapse of the set time period of the timer, motor M7 (M9) stops and solenoids S10 and S11 (S13, S14) are turned on, and holding claws 42 and 43 are released. Motor M7 (M9) is reversely rotated in this state and backing-up plate 38 and press plate 39 are elevated. When these plates ascend to predetermined positions, the timer is made operative and motor M6 (M8), is forwardly rotated to start the feeding and conveyance of the note. Through the forward rotation of motor M6 (M8), feeding roller 14a rotates, thereby feeding the notes one by one. At this time, photosensor P11 (P12) detects the passing of any notes and the number of notes passed is counted in response to the detection signal from the sensor. A note extracted from storing pocket 26 (25) is conveyed to note discriminating section 18 by the main conveyance path. The denomination and overlap of the note conveyed are discriminated by note discriminating section 18. When the extracted note is determined to be the proper (i.e., authorized) type, via this discrimination, gate G2 is inclined to the right and solenoid S3 is turned off, to form the path into temporary holding section 23. If the extracted note is not the proper type, solenoid S3 is energized, to move gate G2 to the left, thereby leading the improper note as a rejected medium, into rejected medium storing pocket 36. The gate switching timing at this time is determined by the detection signal indicating the passing of the note which is emitted from photosensor P8. When a proper note is detected by photosensor P9, rotary solenoid S6 is energized, so as to rotate to the left, thereby switching gate G5 to the temporary holding section side. Therefore, the note is sequentially conveyed into rejected medium holding section 24. When the number of notes extracted from the storing pocket reaches the designated number, a check is made to see if some rejected media are present or not. If any rejected media are present, the number of rejected media is added to the designated number and the processing routine is returned to feeding note counting flow of FIG. 26B. If no rejected medium is present, a check is made to see if photosensor SW10 (SW15), for detecting the stop position of the feeding motor, has detected the stop position or not (darkness detection). If YES, motor M6 (M8) stops. Due to the forward rotation of motor M7 (M9), backing-up plate 38 and press plate 39 descend. When these plates descend to the pressing positions, switch SW14 (SW19) is turned on. Motor M7 (M9) stops in response to the detection of the pressing positions, and the descent of backing-up plate 38 and press plate 39 is stopped. At this time, solenoids S10 and S11 (S13, S14) are turned off and the holding claws are returned to the storing pocket. Motor M7 (M9) is again reversely rotated, and backing-up plate 38 and press plate 39 are elevated. When the stored note collides with the holding claws, backing-up plate 38 stops. When press plate 39 ascends to the guide position and detector SW13 (SW18) is turned on, motor M7 (M9), for elevating backing-up plate 38 and press plate 39, stops. Electromagnetic clutch C1 and motor M12 are sequentially turned off and the main conveyance path is stopped. Motor M5 is reversely rotated to elevate lower belt 24*a*, of rejected medium holding section 24. When photointerrupter SW7, for detecting the upper stop position of the belt, is turned on, motor M5 stops. Motor M12 is reversely rotated in this state. In this case, clutch C1 is turned off and clutch C2 is turned on in the switching mechanism of FIG. 23. Therefore, the reverse rotational force of main motor M12 is transferred to reduction gear 63, through the upper gear and clutch C2, and drive shaft 62 is reversely rotated at a low speed. Consequently, the main conveyance path is reversely driven at a low speed, and the note of rejected medium holding section 24 is collectively conveyed in an external direction, as indicated by the broken line. When photosensor P14, provided near a supply port 2*a*, detects (darkness detection) the note bundle being conveyed, motor M12 is turned off after expiration of a period of time set by the timer, and the main conveyance path stops driving. If no rejected medium is detected in the note discrimination section, the amount of inserted notes of the designated denomination (thousand yen note) is subtracted from the amount of remaining notes in the storing pocket for this denomination (i.e., thousand yen note storing pocket) and the result of the subtraction is stored in memory. If any rejected media are present, the amount of notes of the designated denomination (thousand yen note), the same as the number of rejection times is calculated. The result of the calculation is added to the amount of remaining notes in the rejected medium storing pocket and the added value is stored in memory. The added value of the calculated value and the designated number is subtracted from the amount of remaining notes in the storing pocket of the designated denomination, and the result is stored in memory.

After the amount of remaining notes in the storing pocket has been obtained by the above calculation, the designated amount is subtracted from the current amount memory of the transaction apparatus, and the result, namely, the total amount in the ATM, is stored in memory. After completing this process, the mode switching button of keyboard 5*c*, of internal monitor 5, is pressed and the processing routine is returned to the ordinary transaction mode. At this time, the ordinary transaction mode lamp lights up and transaction apparatus 2 is returned to the initial state.

Figure 27:
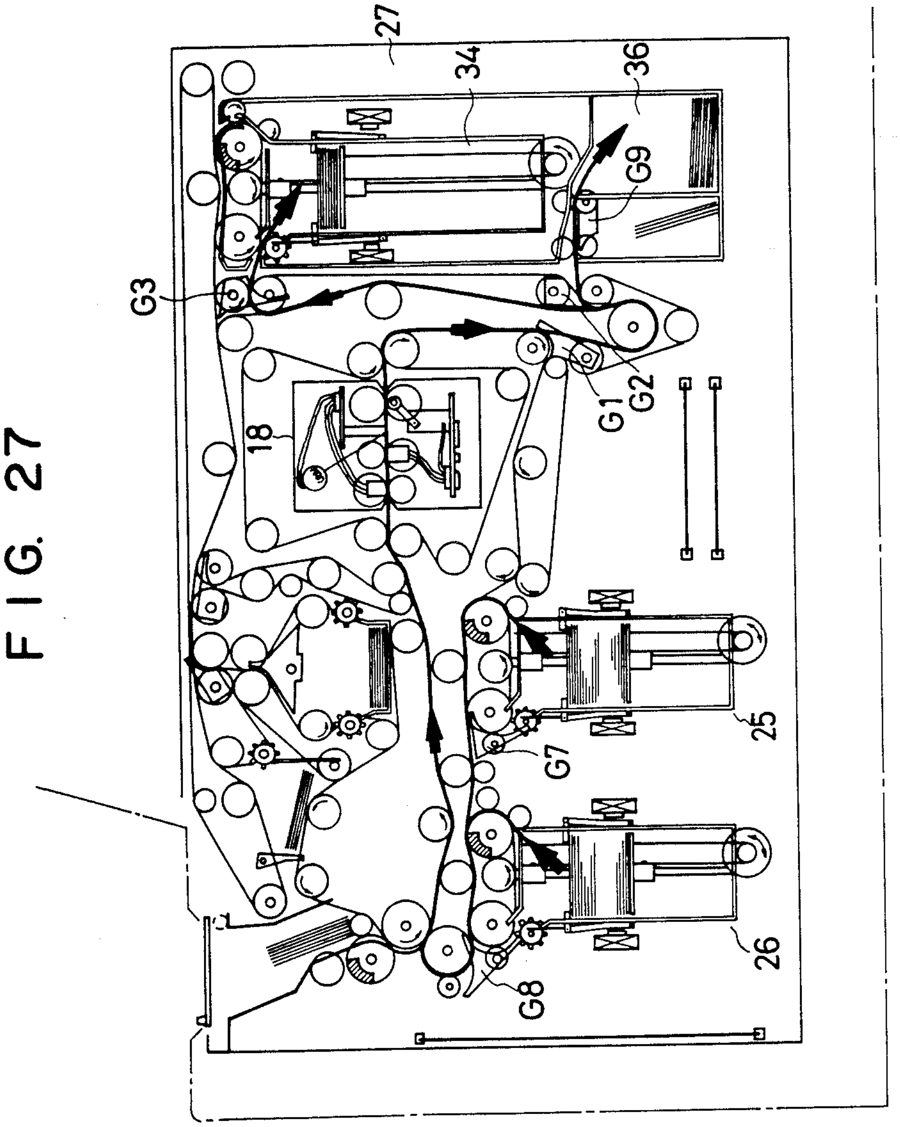
FIG. 27 is a schematic structural diagram of the transaction apparatus, showing the flow of the note in the checking mode.
Figure 28A:
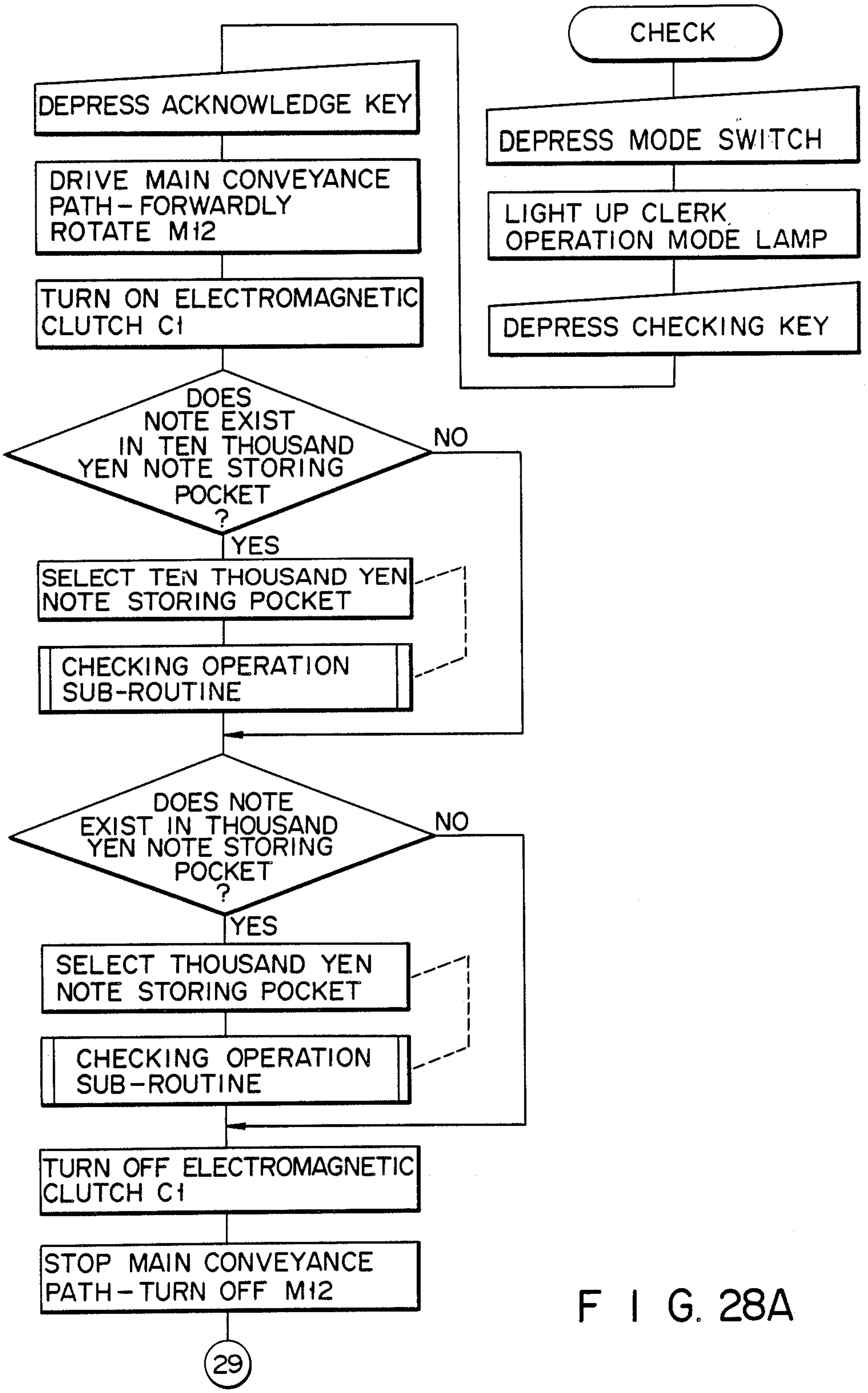
FIGS. 28A to 28C are flowcharts of the checking mode.

FIG. 27 shows the flow of the note ¥ in the checking mode, in which the deposit and dispensable notes are liquidated and the notes in the ten thousand yen note storing pocket 25 and thousand yen note storing pocket 26 are transferred to the batch storing pocket. This checking mode will be described with reference to flowcharts of FIGS. 28A to 28C. According to these flowcharts, the mode switching key (switching between the ordinary transaction mode and the clerk operation mode) of keyboard 5*c*, of internal monitor 5, is first pressed. The cleark operation mode lamp of display panel 5*a* lights up. Next, the checking key is pressed and the acknowledge key is also pressed. At this time, motor M12 is forwardly rotated and the main conveyance path is driven. Clutch C1 is turned on and the main conveyance path is driven at a high speed. A check is made to see if any note ¥ is present in ten thousand yen note storing pocket 25 or not. If YES, storing pocket 25 is selected. Thereafter, the checking operation for the ten thousand yen note is executed in accordance with flowcharts of FIGS. 29A to 29C. This checking operation will be explanined hereinafter.

After completing the checking operation of the ten thousand yen note, a check is made to see if any note ¥ is present in thousand yen note storing pocket 26 or not. If YES, storing pocket 26 is selected. The checking operation is then executed for the thousand yen note.

Figures 28C, 29A:
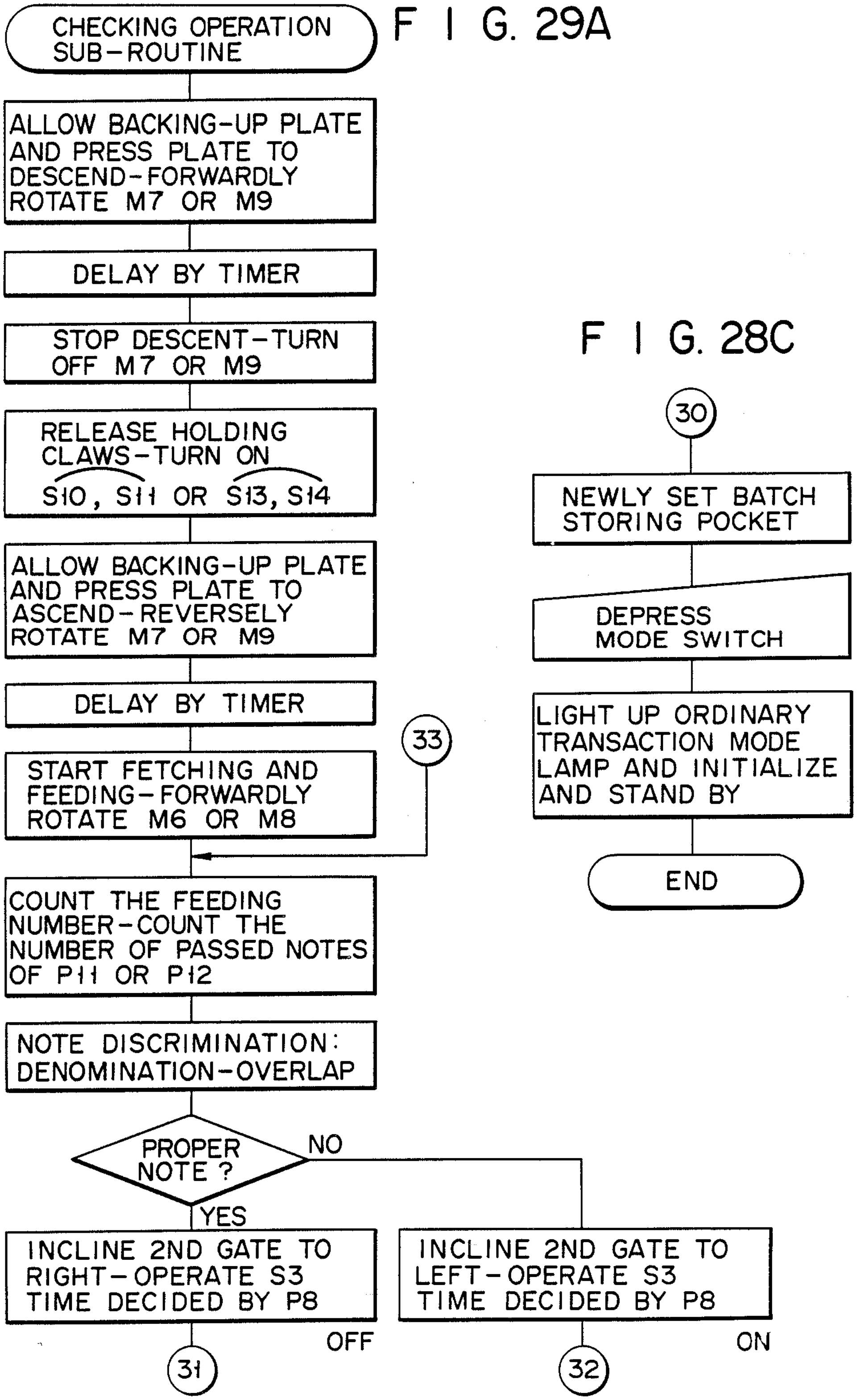
FIGS. 29A to 29C are diagrams of a subroutine for the checking operation.

In the checking operations of the ten thousand yen notes and thousand yen notes, as shown in FIG. 29A, motor M7 (M9) is first forwardly rotated to allow backing-up plate 38 and press plate 39 to descend slightly. The reason for this descent is to cancel the state whereby the stored notes are pressed into contact with holding claws 42 and 43, (due to the upward force of backing-up plate 38), and to easily remove the holding claws from the stored note bundle without damaging the notes ¥. The amount of descent of backing-up plate 38 is set by the timer. After expiration of a period of time set by the timer, motor M7 (M9) stops, and solenoids S10 and S11 (S13, S14) are turned on, and holding claws 42 and 43 are released. In this state, motor M7 (M9), is reversely rotated, and backing-up plate 38 and press plate 39 are elevated. When these plates are elevated to predetermined positions, the timer is made operative and motor M6 (M8) is forwardly rotated to start the feeding and conveyance of the note. Through the forward rotation of motor M6 (M8), feeding roller 14*a* rotates, so that the notes are conveyed one by one. At this time, photosensor P11 (P12) detects the passing of any note, and the number of passing notes is counted via the detection signal emitted by the sensor. A note extracted from storing pocket 25 (26) is conveyed to note discriminating section 18 by the main conveyance path. The denomination and overlap of conveyed notes are discriminated by note discriminating section 18. If it is determined, by the discrimination process, that the extracted note is proper (i.e., authorized), solenoid S3 is turned off, to incline gate G2 to the right, thereby forming the path to gate G3. If the note is not proper, solenoid S3 is energized to move gate G2 to the left, thereby leading the improper note, as a rejected medium, into rejected medium storing pocket 36. The gate switching timing is determined by the note detection signal emitted by photosensor P8.

Gate G3 is inclined to the left, to lead the note ¥ into batch storing pocket 34. Gate G3 is driven by energizing plunger solenoid S4. In this way, the proper note is sequentially stored in batch storing pocket 34. The rejected media pass through gate G9 when they are conveyed into rejected medium storing pocket 36, through gate G2. However, since gate G9 is made operative only in the recovery operation, the extracted rejected media are conveyed into rejected medium storing pocket 36 as they are.

A check is made to see if storing pockets 25 and 26 become empty or not. This emptiness detection is achieved by checking whether emptiness detecting switches SW11 and SW16 have been turned on or not. If the storing pockets are not empty, a check is made to see if the number of notes which are extracted from each storing pocket coincides with a predetermined number or not. If YES, a check is made to see if photointerrupter SW10 (SW15), for detecting the stop position of the feeding motor, has detected the stop position or not (darkness detection). If YES, feeding motor M6 (M8) stops. At this time, batch storing pocket 34 is selected and the storing operation is started. This storing operation is executed in a manner similar to the flow of FIG. 11.

When the designated storing pocket becomes empty, solenoid S4 is turned off to return gate G3 to the right. If it is not empty, the processing routine is returned to the "amount of cash dispensed" count flow of FIG. 29A.

Figure 29B:
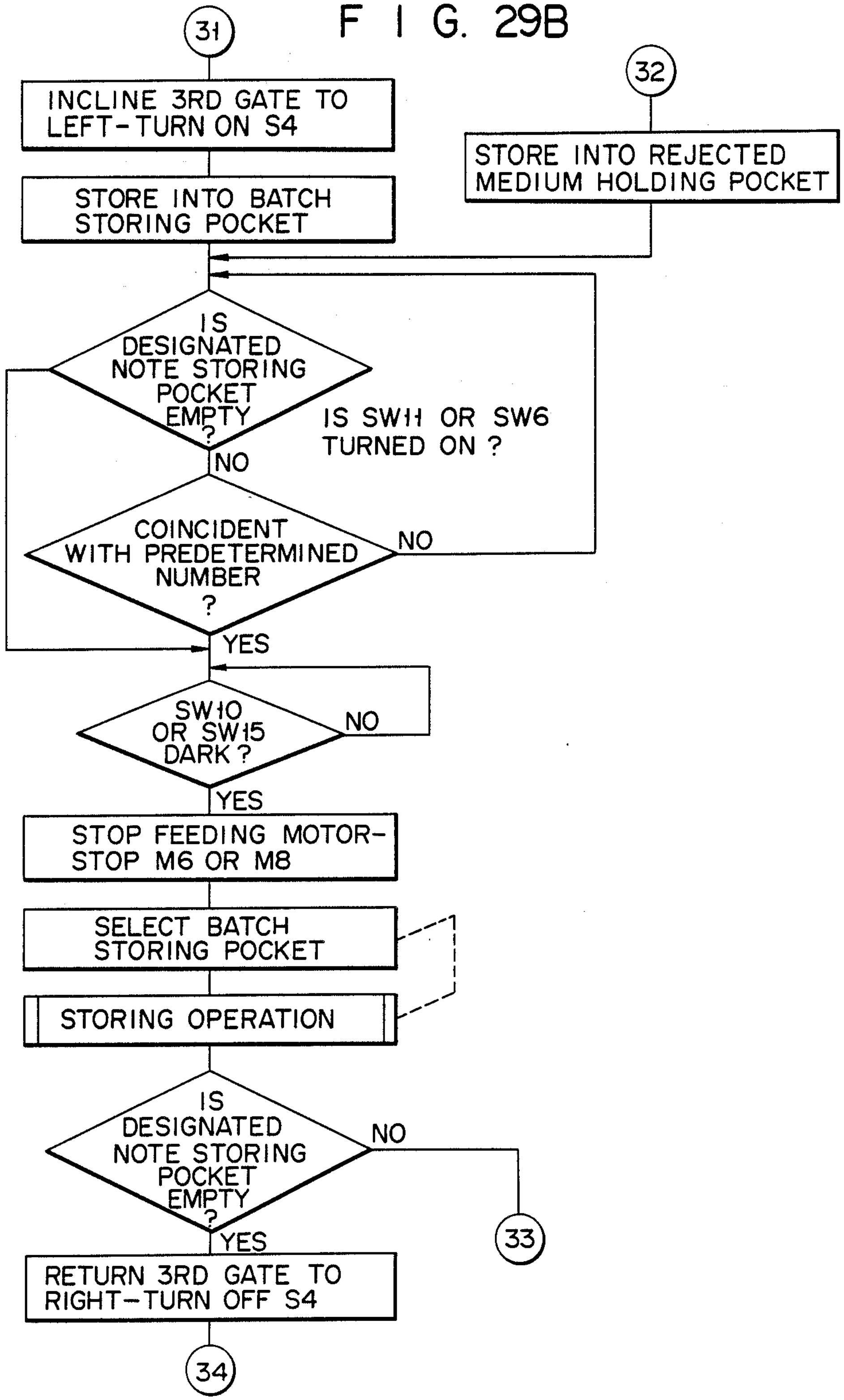
Figure 29C:
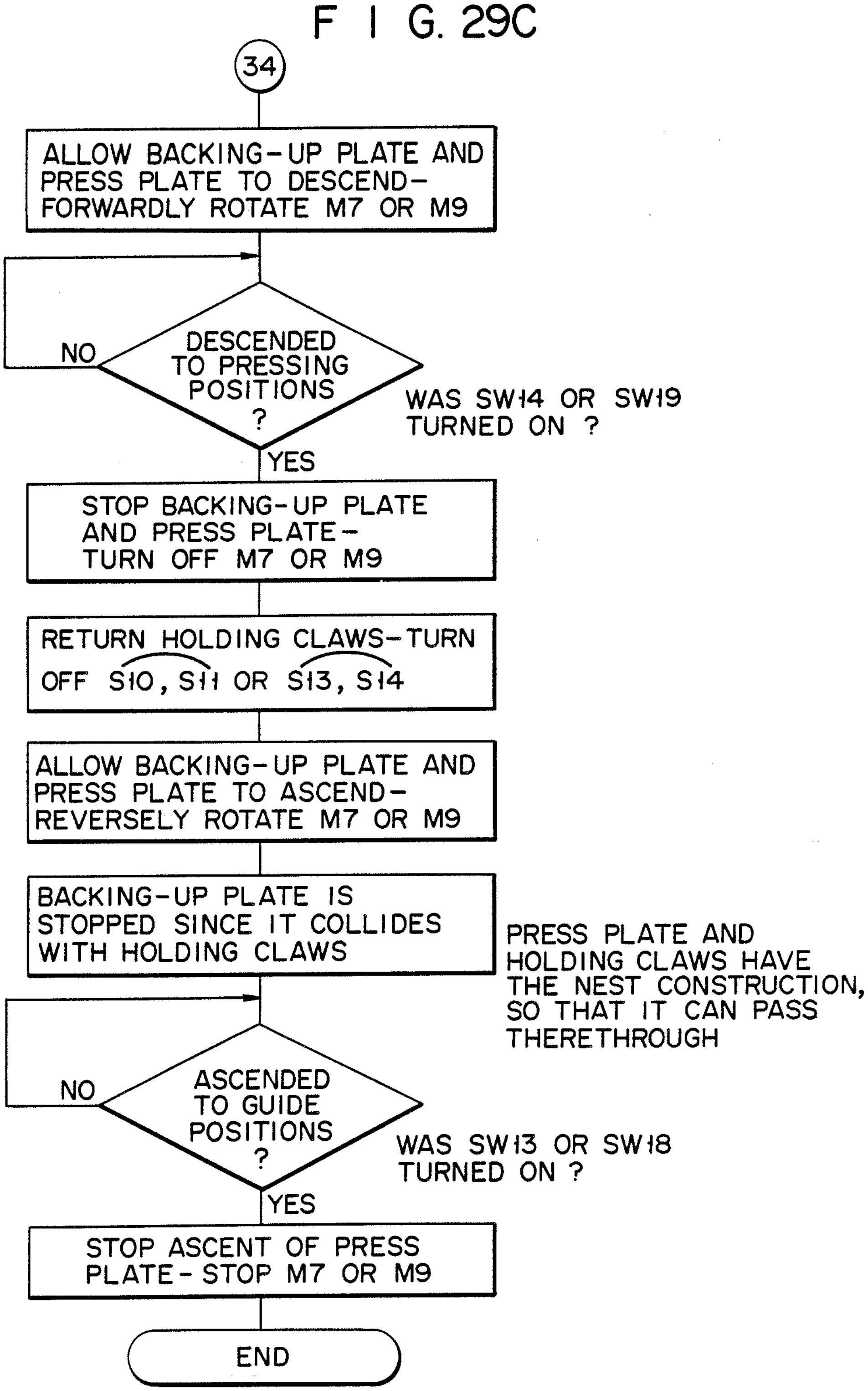

In the flow of FIG. 29C, backing-up plate 38 and press plate 39 descend via the forward rotation of motor M7 (M9). When these plates descend to the pressing positions, switch SW14 (S19) is turned on. In response to the detection of the pressing positions, motor M7 (M9) is turned off and the descent of backing-up plate 38 and press plate 39 is stopped. At this time, solenoids S10 and S11 (S13, S14) are turned off and the holding claws are returned into the storing pocket. Motor M7 (M9) is again reversely rotated and plates 38 and 39 are elevated. When the stored note collides with the holding claws, backing-up plate 38 stops. When press plate 39 ascends to the guide position, switch SW13 (SW18) is turned on. Thus, motor M7 (M9), for elevating backing-up plate 38 and press plate 39, stops. The checking operation is thereby completed.

Figure 28B:
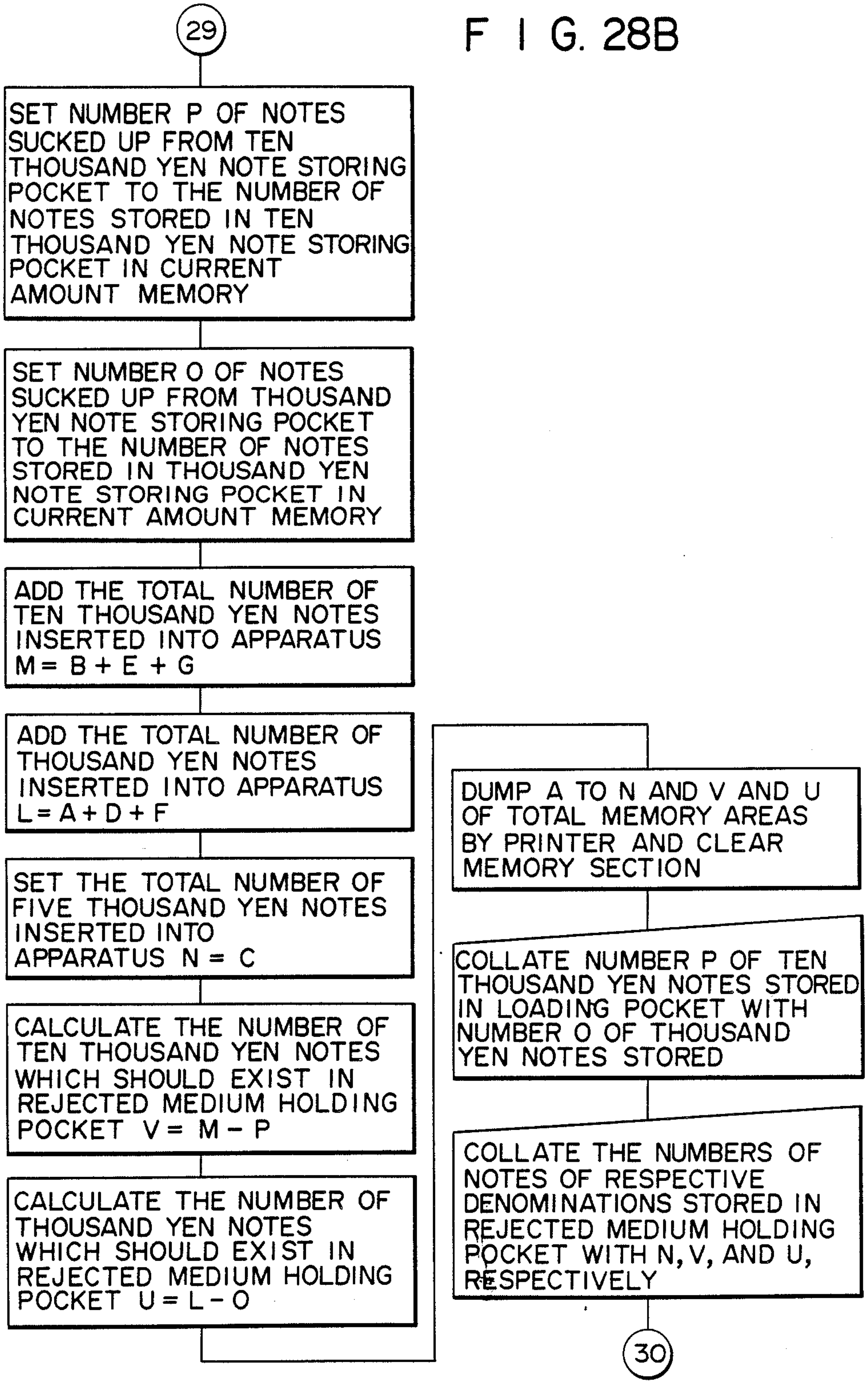

After completion of the checking operation, clutch C1, and also main motor M12 are turned off. Thus, the conveyance path stops driving. Next, the number P of notes sucked up from the ten thousand yen note storing pocket is set to the number of notes stored in the ten thousand yen note storing pocket in the current amount memory, on the basis of the content (FIG. 31) of memory section 7, as shown in FIG. 28B. Further, the number 0 of notes sucked up from the thousand yen note storing pocket is set to the number of stored notes in the thousand yen note storing pocket in the current amount memory. The total number of ten thousand yen notes inserted to the apparatus is added ($B=A+E+F$). Also, the total number of thousand yen notes inserted to the apparatus is added ($L=A+D+F$). Moreover, the total number of five thousand yen notes inserted to the apparatus is set ($N=C$). The number of ten thousand yen notes which should exist in rejected medium storing pocket 36 is calculated ($V=L-P$). Also, the number of thousand yen notes which should exist in pocket 36 is calculated ($U=L-O$). The values of A to N in the total amount memory areas and the values of V and U are dumped by the printer and the contents of the memory section are cleared. The number P of ten thousand yen notes stored and the number 0 of thousand yen notes stored in the loading pockets are collated. The number of notes of each denomination stored in the rejected medium pockets and the values of N, V, and U are collated. If those values coincide in the collating operations, a new batch storing unit is set to transaction apparatus 2. Namely, batch storing unit 27 is exchanged for a new batch storing unit. The mode switching button is pressed and the processing routine is returned to the ordinary transaction mode. The ordinary transaction mode lamp lights up and the transaction apparatus is returned to the initial state and enters the standby mode.

Figure 31:
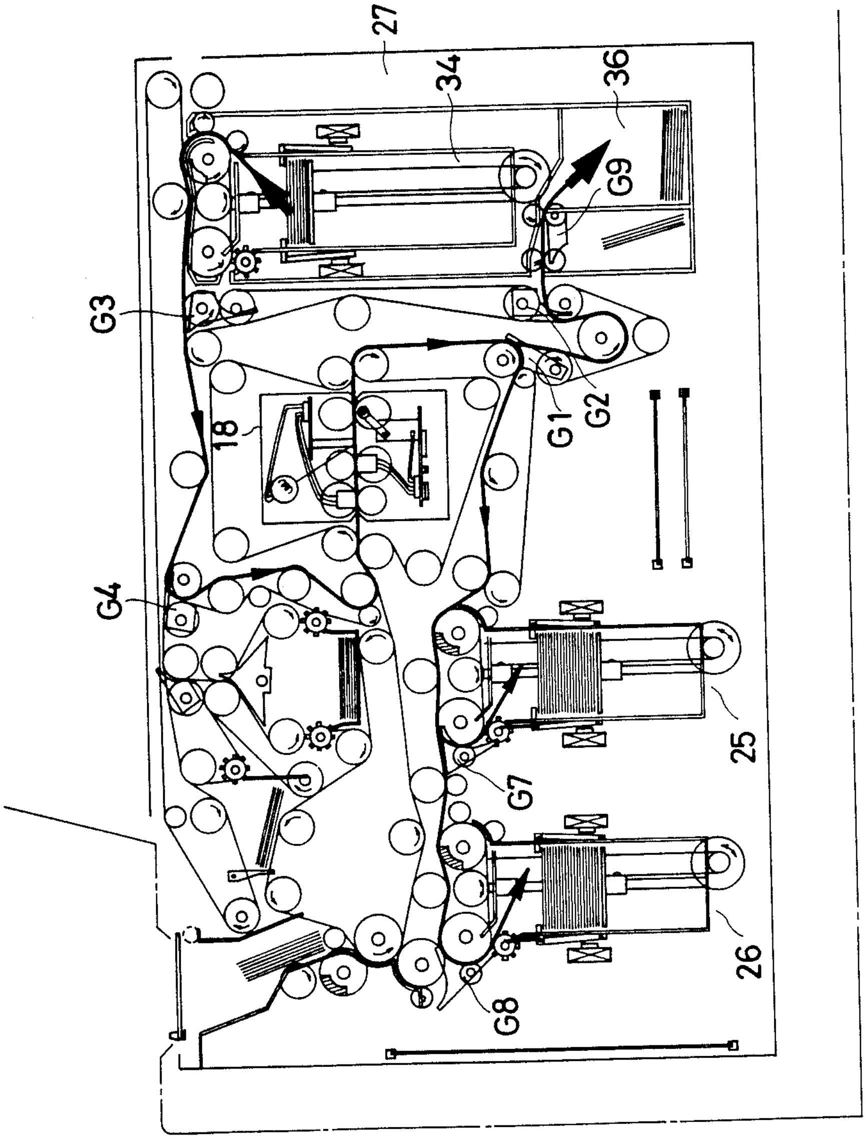
FIG. 31 is a schematic structural diagram of the transaction apparatus, showing the flow of the note in the loading mode.
Figure 32A:
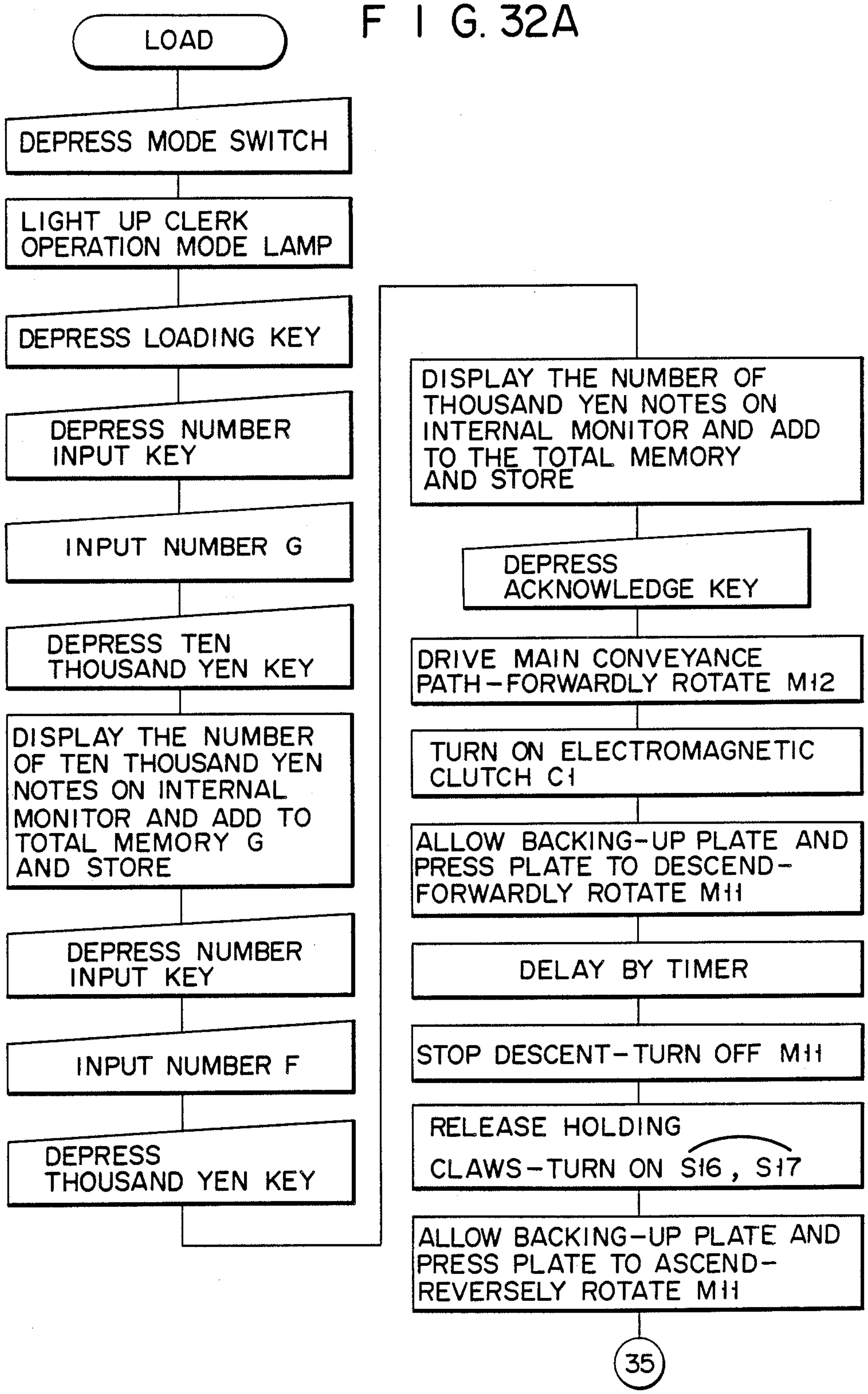
FIGS. 32A to 32E are flowcharts of the checking mode.

FIG. 31 shows the flow of notes in the case where the notes ¥ stored in batch storing pocket 34 of batch storing section 27, are loaded into the note storing pocket of each denomination, namely, into ten thousand yen note storing pocket 25 and thousand yen note storing pocket 26. In this loading routine, the mode is first changed similar to the supplement and check and the like; namely, as shown in the flow of FIG. 32A, the mode switching key of keyboard 5c, of internal monitor 5, is pressed and the clerk operation mode is set. At this time, the clerk operation mode lamp of display panel 5a lights up. Next, the loading key is pressed and the loading mode is set. The Number of Notes input key is pressed to set the number of ten thousand yen notes which are loaded, and this loading number is entered via the ten-key. Further, when the ten thousand yen key is pressed, the number of ten thousand yen notes is displayed on segment display panel 5b, of internal monitor 5, and the input number is added to the value of total amount memory G. To set the number of thousand yen notes which are loaded, the Number of Notes input key is pressed and the number is entered via the ten-key. Further, by pressing the thousand yen key, the number of thousand yen notes is displayed on segment display panel 5b, of internal monitor 5, and the input number is further added to the value of total amount memory F. When the acknowledge key is pressed, motor M12 is forwardly rotated and the main conveyance path is driven. Clutch C1 is turned on and the main conveyance path is driven at a high speed. Motor M11 is forwardly rotated for only a period of time set by the timer, to allow backing-up plate 38 and press plate 39 to descend slightly. After expiration of a period of time set by the timer, motor M11 stops. Further, solenoids S16 and S17 are turned on, and holding claws 42 and 43 are released. In this state, motor M11 is reversely rotated, and backing-up plate 38 and press plate 39 are elevated. When these plates 38 and 39 ascend to predetermined positions, the timer is made operative and motor M10 is forwardly rotated to start the feeding and conveyance of the note. Through the forward rotation of motor M10, feeding roller 14a rotates, so that the notes are extracted one by one from batch storing pocket 34. At this time, photosensor P13 detects the passing of any note and the number of passing notes is counted via the detection signal emitted by the sensor. Solenoid S5 is turned on and gate G4 is inclined to the left. In this way, the notes ¥ are conveyed into note discriminating section 18. The denomination and overlap of the conveyed notes are discriminated by note discriminating section 18. If it is determined, by the discrimination process, that the extracted note is proper (i.e., authorized), solenoid S2 is turned on to incline gate G1 to the right, thereby forming the paths to ten thousand yen note storing pocket 25 and thousand yen note storing pocket 26. If the extracted note is not proper, solenoid S2 is turned off and solenoid S3 is turned on to incline gates G1 and G2 to the left, thereby leading the improper note, as a rejected medium, into rejected medium storing pocket 36. The switching timing of gate G1 is determined by the note detection signal emitted by photosensor P8.

A check is made to see if the denomination of the note ¥ conveyed into the storing pocket corresponding to the designated denomination, is a thousand yen note or a ten thousand yen note. When it is a ten thousand yen note, solenoid S9 is turned on to incline gate G7 to the left, thereby leading the ten thousand yen note into ten thousand yen note storing pocket 25. The switching timing of gate G7 is determined by the detection of the note ¥ by photosensor P11. In the case of a thousand yen note, solenoid S12 is turned on to incline gate G8 to the left, thereby leading the thousand yen note into thousand yen note storing pocket 26. The switching timing of gate G8 is determined by the detection of the note ¥ by photosensor P12. The number of ten thousand yen notes, and thousand yen notes stored, are counted via the note detection signal by photosensors P11 and P12, respectively.

The notes, distributed as described above, are stored in ten thousand yen note storing pocket 25, thousand yen note storing pocket 26, and rejected medium storing pocket 36, respectively. Each time a note is stored, checks are made to see if batch storing pocket 34 is empty or not, and to see if the count value of the notes stored coincides with a predetermined number or not. If either one of the answers in these checking steps is YES, a check is then made to see if photointerrupter SW20 detects the "dark" state, namely, if it detects the stop positions of the feeding and conveyance motors of the batch storing pocket or not. If YES, feeding motor M10, of the batch storing pocket, is stopped. At this time, rejected medium holding section 24 or ten thousand yen note storing pocket 25 is selected for the storing operation and the storing operation is started for the selected storing pocket. When batch storing pocket 34 becomes empty, storing operations are simultaneously started for both ten thousand yen note storing pocket 25 and thousand yen note storing pocket 26. These storing operations are executed in accordance with the flow of FIG. 11.

Figure 32B:
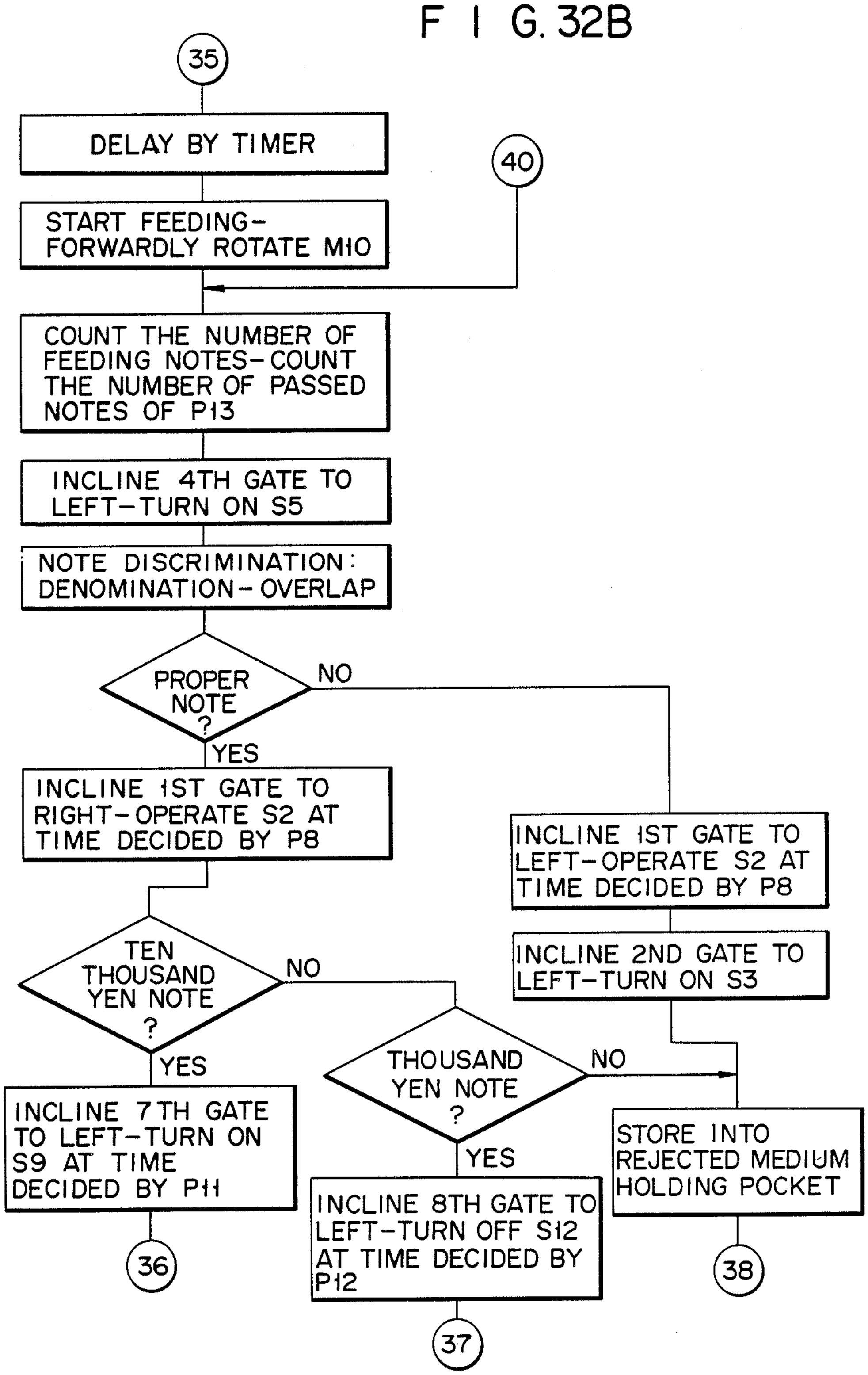
Figure 32C:
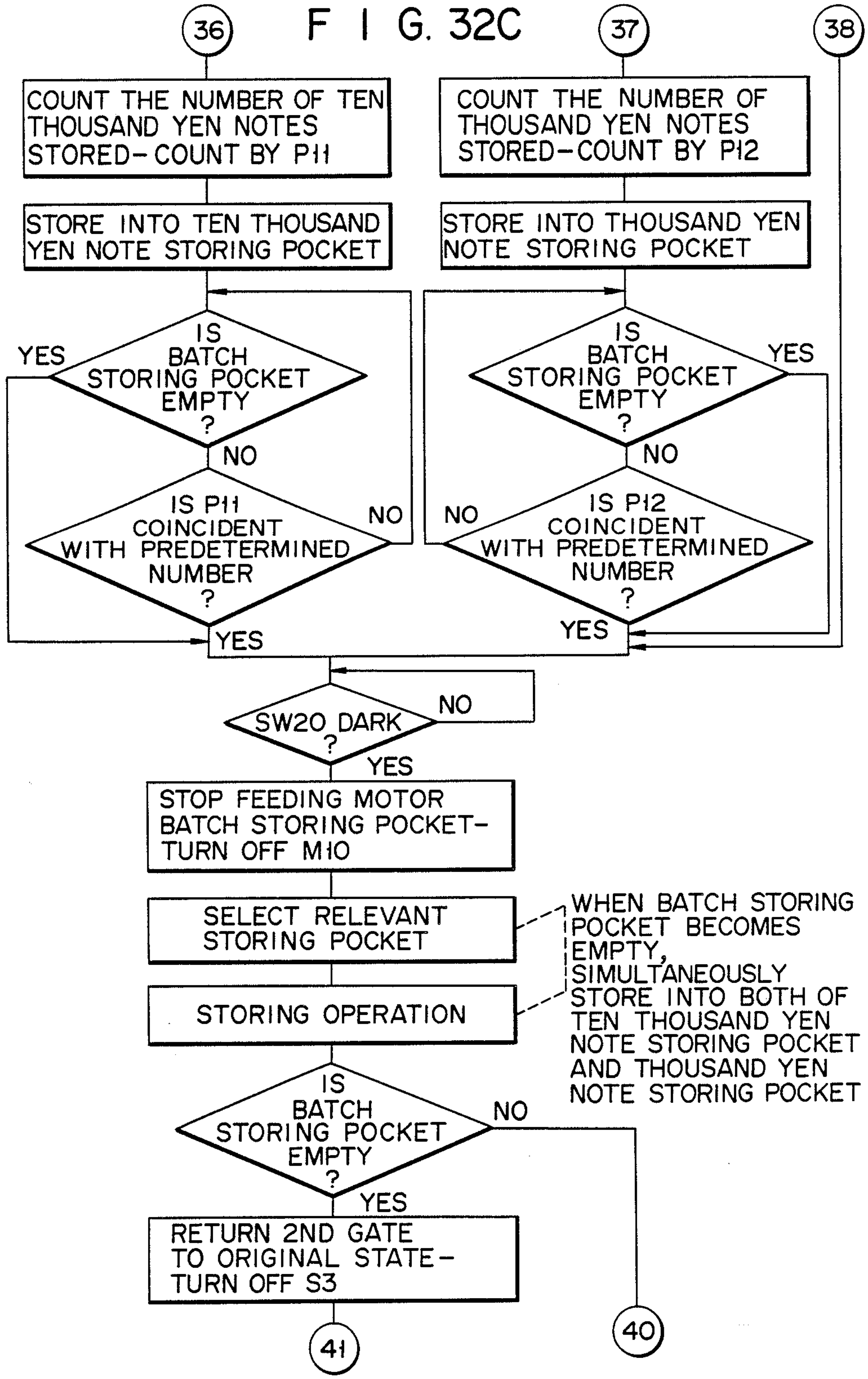
Figure 32D:
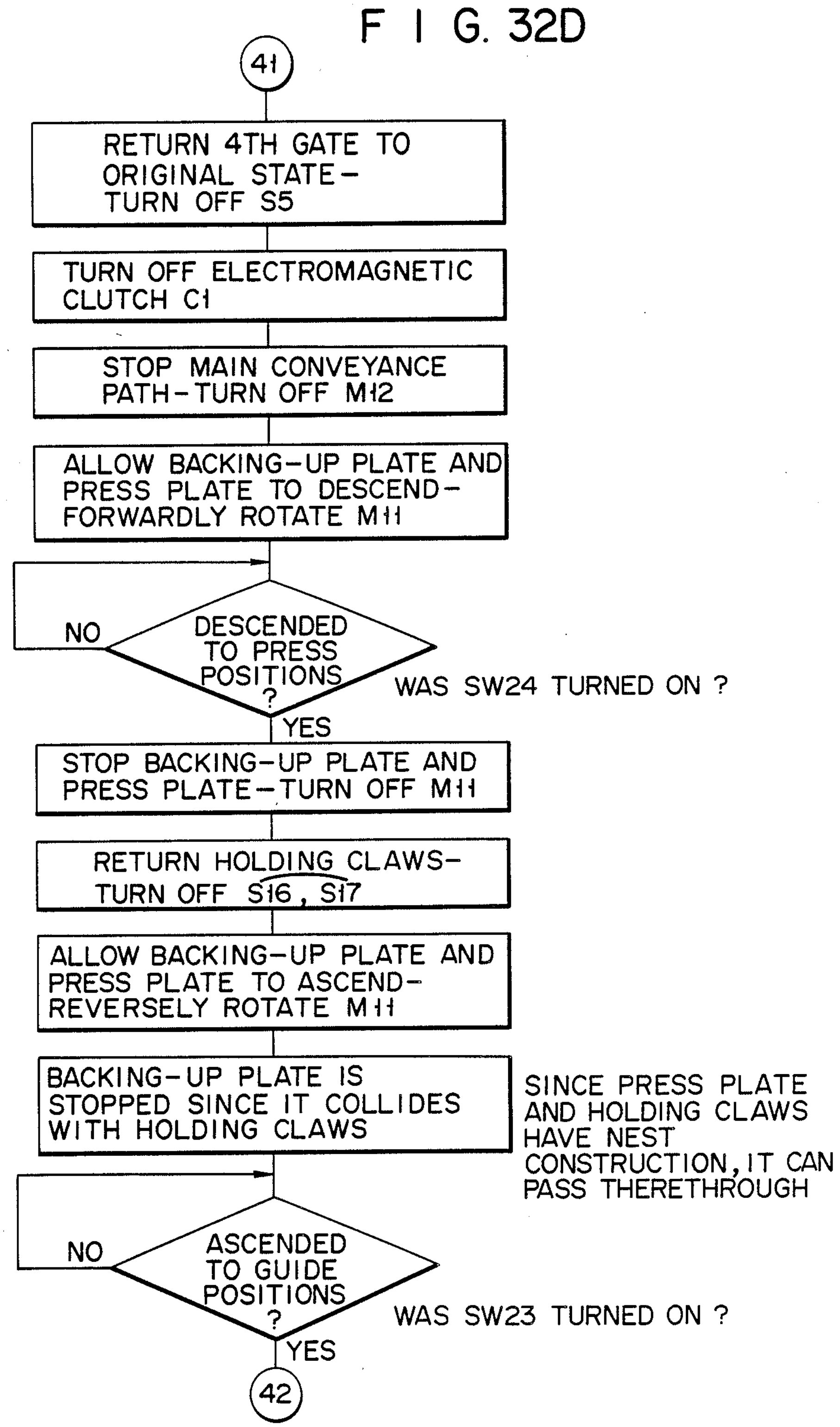
Figure 32E:
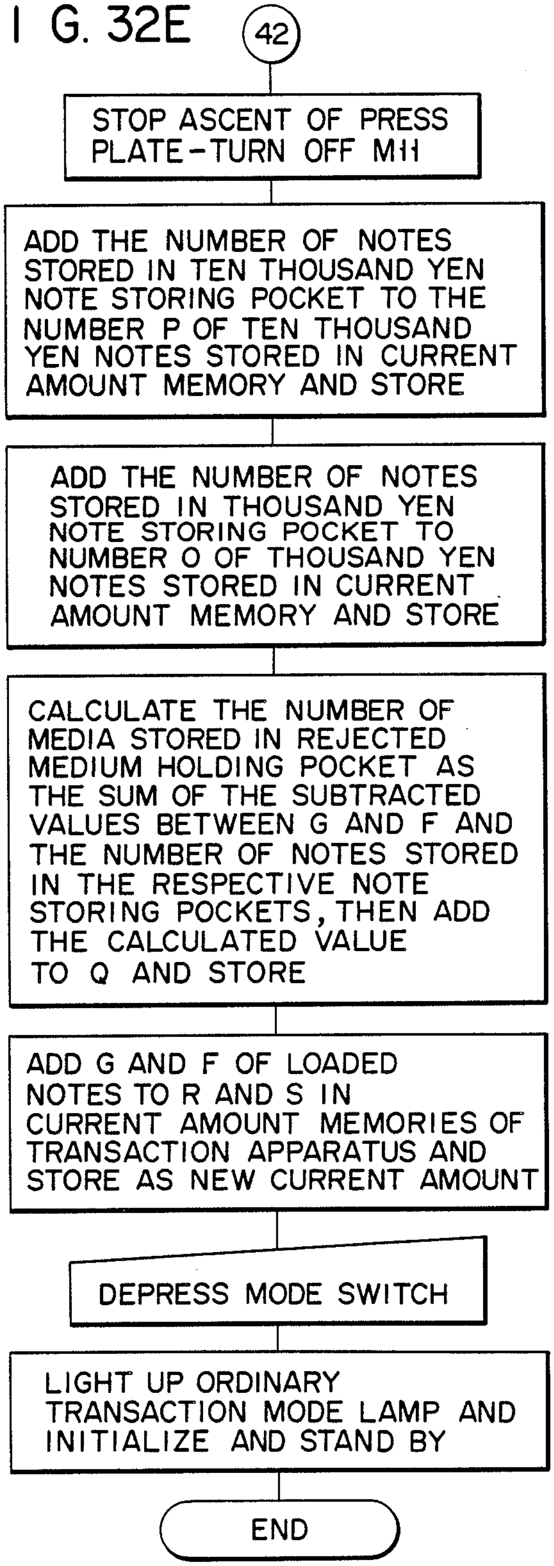

When batch storing pocket 34 becomes empty, solenoid S3 is turned off and gate G2 is returned to its original position. Unless it is empty, the processing routine is returned to the flow of FIG. 32B. Further, solenoid S5 is turned off to return gate G4. Clutch C1 is turned off and motor M12 is turned off and the main conveyance path is stopped. Next, motor M11 is forwardly rotated and backing-up plate 38 and press plate 39 descend. Switch SW24 is turned on when press plate 39 descends to the pressing position. In response to the detection of the pressing position, motor M11 stops and backing-up plate 38 and press plate 39 stop descending. At this time, solenoids S16 and S17 are turned off and the holding claws are returned into the storing pocket. Motor M11 is again reversely rotated, and backing-up plate 38 and press plate 39 are elevated. When the stored note collides with the holding claws, backing-up plate 38 stops. When press plate 39 ascends to the guide position and switch SW23 is turned on, motor M11, for elevating backing-up plate 38 and press plate 39, stops.

The number of notes stored in the ten thousand yen note storing pocket is added to the number P of ten thousand yen notes stored in the current amount memory and the result is stored in memory. The number of notes stored in the thousand yen note storing pocket is added to the number 0 of thousand yen notes stored in the current amount memory and the result is stored in memory. The number of media stored in the rejected medium storing pocket is calculated as the sum of the value of the subtraction between the number g of ten thousand yen notes inserted, and the number of notes stored in ten thousand yen note storing pocket 25, and the value of the subtraction between the number f of thousand yen notes inserted and the number of notes stored in thousand yen note storing pocket 26. The calculated value is added to memory Q and stored in memory. The values of g and f are added to the values of deposit/dispensing current amount memories R and S, respectively. Thus, the new current amount is obtained and stored. After completion of this process, the mode switching button is pressed, and the transaction apparatus is returned to the ordinary transaction mode.

Figure 33:
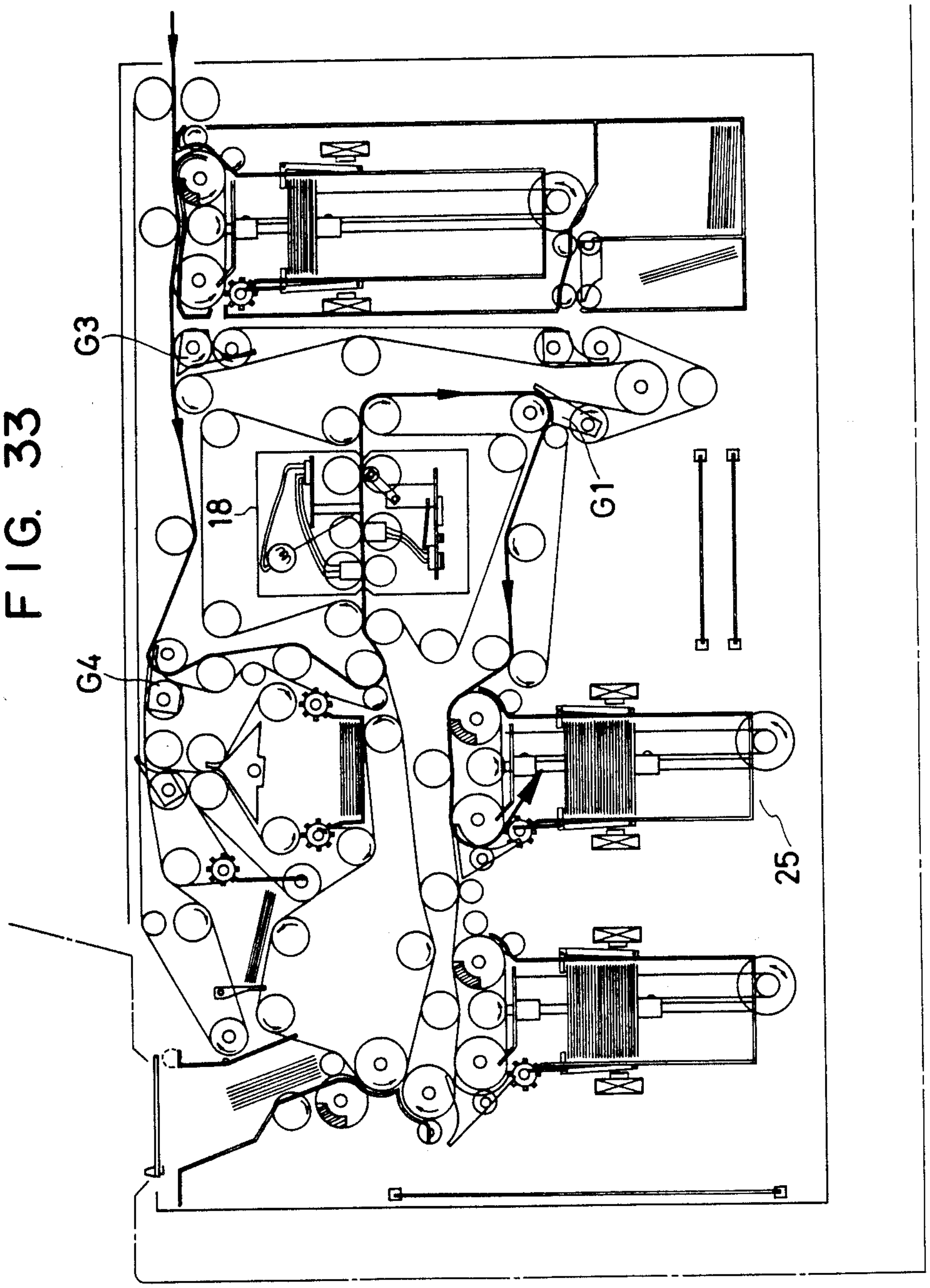
FIG. 33 is a schematic structural diagram of the transaction apparatus, showing the flow of the note in the external supplement mode.

Referring now to FIG. 33, the solid line with arrows indicates the flow of the note where the note is supplemented on a unitary basis (i.e., one by one) by automotive truck instrument for group-recycling 11. According to this embodiment, truck instrument 11, which automatically runs behind ATM 1 is connected to transaction apparatus 2, so that supplementation of notes, on a unitary basis, is started. It is possible to use the instrument, disclosed in Japanese patent application No. 97915/1984, for example, as the automotive truck instrument for supplying notes on a unitary basis; for instance, when a ten thousand yen note is supplied to transaction apparatus 2 from automotive truck instrument 11, is is led to note discriminating section 18, through gates G3 and G4, as indicated by the solid line with arrows. The note extracted from note discriminating section 18 is conveyed to ten thousand yen note storing pocket 25 through gate G1, and stored therein by gate G7.

Figure 34:
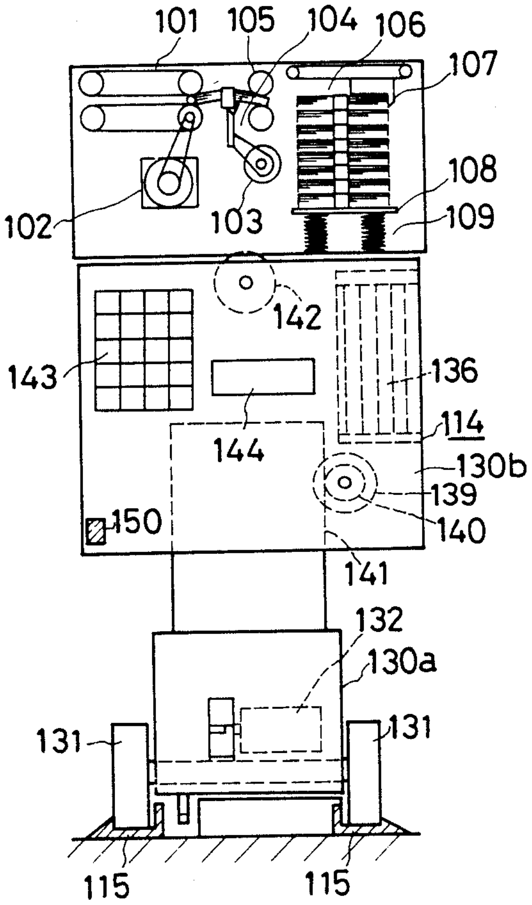
FIG. 34 is a schematic structural diagram of a group recycling apparatus.

Although the group-recycle is performed on a note by note basis in the embodiment of FIG. 33, the supplementary notes can be conveyed as a note bundle. In such a case, the note bundle is conveyed by way of a route similar to that in the embodiment of FIG. 22, and the notes are supplemented. An automatic note bundle supply apparatus, shown in FIG. 34, is used as automotive truck instrument 11 for group-recycling. This apparatus comprises a movable truck 114, having a lower unit **130*a*, and an upper unit 130*b*. A drive truck 131, which is driven by a motor 132, and can automatically run on rails 115, is attached to lower unit 130*a*. Upper unit 130*b* is mounted over lower unit 130*a*. Upper unit 130*b* can vertically ascend and descend to lower unit 130*a* via an elevating motor 139, a pinion gear 140, and a rack gear 141, which are interlocked with motor 139. A recycle type control device 136, an operating keyboard 143, and a liquid crystal display 144 are built into upper unit 130*b*. Further, a light communication type transceiver 150 is provided for upper unit 130*b*. Transceiver 150 performs the light communication with the transceivers provided for respective ATMs, and transmits and receives control signals for automatic run, stop, and the like, of movable truck 114 of automotive truck instrument 11**.

A movable note box unit 100, which can be moved back and forth by a movement drive motor 142, is provided over upper unit **130*a*. Note box unit 100 is equipped with a conveyor belt 101 which is forwardly and reversely rotated by a motor 102. The note bundle is conveyed to conveyor belt 101 by a bending rubber roller 105. A cutter 104, which is driven by a rotary solenoid 103, is arranged between conveyor belt 101 and rubber roller 105 in order to cut the seal of the note bundle. In the cutting operation of the seal, the note bundle is bent upwardly due to the pushing force of rubber roller 105, and the seal is cut by cutter 104 as a result of being bent. For this purpose, conveyor belt 101 and rubber roller 105 are independently driven. Sealed note bundles (each consisting of one hundred, or one thousand notes for supplementation) 106 are put on a backing-up plate 108. Plate 108 is pressed upwardly by an elevating spring 109, and eight note bundles each consisting of 100 notes can be placed there. A note bundle pushing-out claw 107 is driven, to feed out note bundles 106, one by one, to rubber roller 105**.

When automotive truck instrument 11 is moved to an ATM which requires the note supply, the note bundle, for example, a ten thousand yen note one, is supplied from the movable note box unit to this ATM through a rear supply port *2a*, of transaction apparatus 2, with the seal of the note bundle cut. The note bundle supplied from supply port *2a* is conveyed to deposit/dispensable note hopper 13 by the conveyor belt which runs at a low speed, as shown in FIG. 23. The notes of the note bundle at hopper 13 are fed in one by one and conveyed to ten thousand yen note storing pocket 25, via note discriminating section 18.

In the case of the partial sucking-up, checking, or loading mode, the note is received from or transferred to the movable note box unit, on a hundred unit basis. In this case, one hundred notes can be inserted as a bundle into the movable note box unit.

In the foregoing transaction apparatus, there is the possibility that a note may jam on the conveyance path while it is being conveyed. In such a case, if it is intended to eliminate the jam by opening the inside of the transaction apparatus, unmanned automatization cannot be accomplished. However, according to the present invention, the jam can be also automatically overcome. This is because the invention has the following three characteristics in the conveyance system: namely, (1) the notes can be conveyed as a bundle; (2) the note bundle is conveyed at a low speed; and (3) the note bundle can be conveyed at a low speed in both forward and reverse directions. The jam can be automatically overcome by use of these features.

Although the jam generally occurs near the gate, a note detector (or note sensor), comprising a photo sensor or the like, to detect the passing of the note and thereby to determine the operation timing of the gate, is provided in front of the gate. This sensor is used to detect the choking of the gate by a note, i.e., a jam at the gate. That is, although the note being conveyed passes through the sensor for a predetermined time, if the note chokes the gate and remains in the position of the sensor, the sensor's note detection time period is prolonged. Therefore, the occurrence of the jam can be determined on the basis of this detection time period. There is also another method of jam detection, called a shift control. According to this method, a check is made to determine whether the note is conveyed between two adjacent sensors in a predetermined period of time. According to this method, the jam is not detected when the photosensor detects the "dark" state, but is decided when the note which has passed through the preceding sensor hasn't reached the next sensor within a predetermined period of time. Therefore, jam detection corresponds to the detection of the "bright" state.

Figure 35:
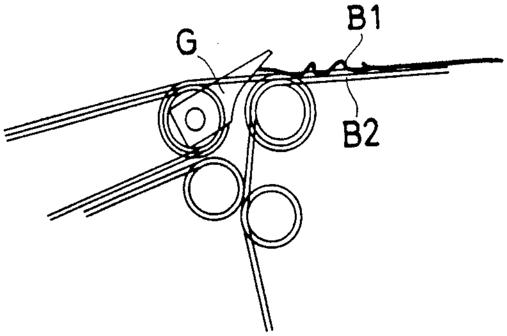
FIGS. 35 to 38 are diagrams of a conveyance path for explaining the automatic elimination of jams.
Figure 36:
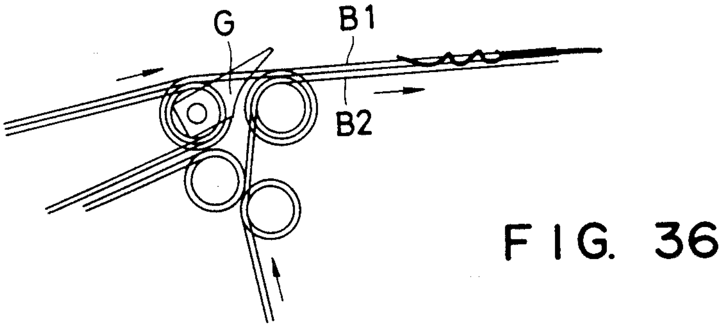
Figure 37:
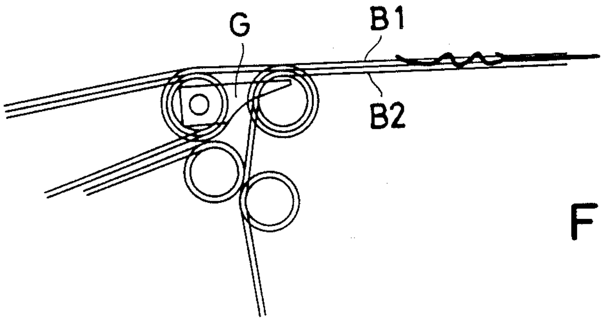
Figure 38:
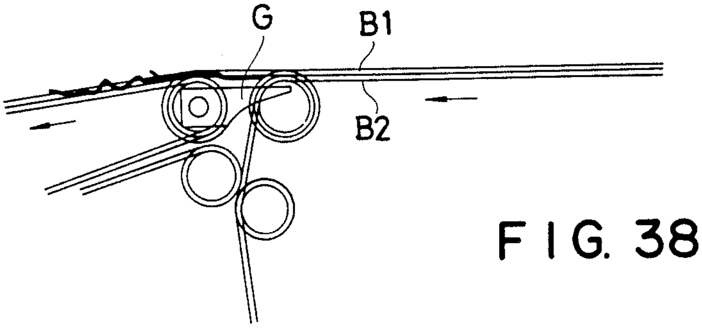

FIGS. 35 to 38 show the occurrence of a jam and its elimination. FIG. 35 shows the state where cash, sandwiched by upper and lower conveyance belts B1 and B2, and conveyed, collides with gate G, so that a few notes choke the gate. At this time, the occurrence of the jam is detected by the sensor. In response to this jam detection, conveyor belts B1 and B2 are driven in the reverse direction for a predetermined time and the note is moved backward of gate G (FIG. 36). In this case, the reverse rotation time is set to the necessary minimum time. Next, gate G is moved downward from the conveyor belts (FIG. 37). Conveyor belts B1 and B2 are again driven in the note conveying direction (FIG. 38). At this time, the jammed note passes through the gate and is conveyed, so that the jam can be automatically eliminated.

With respect to jamming, in the case of a deposit transaction, if a jam occurs before the depositor completes the deposit transaction, the gate is directed toward the note entrance/extraction port. Conversely, in the case of the dispensing transaction, if the jam occurs before the dispensing transaction is completed, the gate operates so as to collect the note into the rejected medium holding pocket. However, after the state shown in FIG. 36, if it is desired to convey the jammed note in the direction of gate G, i.e., downward, as in the diagram, the conveyance system is structured so that a one hundred sheet note bundle can pass through. Therefore, even if the state of gate G is not changed as well, the jammed note can pass smoothly through gate G.

In the above embodiment, the sensors are arranged at respective positions to detect the conveyance state of the note. However, the gate timings are decided by one sensor for the adjacent gates, e.g., gates G4, G5, and G6. By use of a common sensor in this manner, the cost can be reduced. However, sensors may be separately provided for these adjacent gates.

What is claimed is:

1. A recycle type transaction apparatus comprising:

note entrance/extraction port means for depositing and dispensing notes;

note bundle conveyance means which receives a plurality of notes as a note bundle from outside and conveys said note bundle to said note entrance/extraction port means;

note discriminating means for discriminating the note which is conveyed from said note entrance/extraction port means;

note storing pocket for each denomination, for storing said note discriminated by said note discriminating means for every denomination; and note feeding means for feeding the note, in said note storing pocket for each denomination, to said note entrance/extraction port means as a dispensable note.

2. A recycle type transaction apparatus according to claim 1, wherein said conveyance means has a conveyance path which is selectively driven in a note receiving direction to convey the note to said note entrance/extraction port means, and in a direction opposite to said note receiving direction.

3. A recycle type transaction apparatus according to claim 1, wherein said conveyance means has a holding section to hold the note which was fed out one by one of said note storing section for each denomination, and discriminated by said note discriminating means, and means for collectively conveying the note in said holding section to the outside.

4. A recycle type transaction apparatus according to claim 1, wherein said conveyance means has a conveyance path to convey said note bundle to said note entrance/extraction port means and also to convey the cash from said note storing section for each denomination to said note entrance/extraction port means in order to dispense the note.

5. A recycle type transaction apparatus according to claim 4, wherein said conveyance means has means for aligning the obverse and reverse of the note which is conveyed, by said conveyance path.

6. A recycle type transaction apparatus according to claim 4, wherein said conveyance means includes: external note receiving means which receives the note from the outside; means for feeding said note supplied from said external note receiving means to said note discriminating means; and means for returning the note, which was determined to be a rejected medium by said note discriminating means, to said external note receiving means.

7. A recycle type transaction apparatus according to claim 4, wherein said conveyance means has means for distributing the note, which was determined to a rejected medium by said note discriminating means, to a rejected medium holding pocket.

8. A recycle type transaction apparatus according to claim 1, further comprising: a batch note storing section for collectively storing each kind of note; and means for depositing and dispensing the note to and from both the outside and said note storing section for each denomination.

9. A recycle type transaction apparatus according to claim 8, wherein the conveyance path of the note to said batch note storing section and the note conveyance path from the outside are commonly used.

* * * * *